(12) United States Patent
Martinengo

(10) Patent No.: US 10,928,262 B2
(45) Date of Patent: Feb. 23, 2021

(54) SENSOR DEVICE, IN PARTICULAR A PRESSURE SENSOR

(71) Applicant: ELTEK S.p.A., Casale Monferrato (IT)

(72) Inventor: Giorgio Martinengo, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 210 days.

(21) Appl. No.: 16/094,212

(22) PCT Filed: Apr. 19, 2017

(86) PCT No.: PCT/IB2017/052243
§ 371 (c)(1),
(2) Date: Oct. 17, 2018

(87) PCT Pub. No.: WO2017/182962
PCT Pub. Date: Oct. 26, 2017

(65) Prior Publication Data
US 2019/0094095 A1    Mar. 28, 2019

(30) Foreign Application Priority Data
Apr. 22, 2016 (IT) .................. 102016000042011

(51) Int. Cl.
*G01L 19/06* (2006.01)
*G01L 19/14* (2006.01)
*G01L 9/00* (2006.01)

(52) U.S. Cl.
CPC ............ *G01L 19/06* (2013.01); *G01L 9/0041* (2013.01); *G01L 9/0051* (2013.01)

(58) Field of Classification Search
CPC ..... G01L 9/00; G01L 9/41; G01L 9/51; G01L 19/00; G01L 19/04–06; G01L 19/14
See application file for complete search history.

(56) References Cited

U.S. PATENT DOCUMENTS

2011/0174080 A1\* 7/2011 Zorzetto ................ G01L 19/06
  73/756
2012/0011937 A1\* 1/2012 Bigliati ............... G01L 19/0672
  73/756
(Continued)

FOREIGN PATENT DOCUMENTS

WO  2008/078184  7/2008
WO  2009/153737  12/2009
WO  2013/139832  9/2013

OTHER PUBLICATIONS

International Search Report and Written Opinion of the ISA for PCT/IB2017/052243 dated Jul. 18, 2017, 10 pages.

*Primary Examiner* — Nguyen Q. Ha
(74) *Attorney, Agent, or Firm* — Nixon & Vanderhye P.C.

(57) ABSTRACT

A pressure-sensor device (1) comprises: a pressure-sensitive component (5, 5a, 6), having a sensor body (5) that includes an elastically deformable membrane part (5a) and at least one detection element (6) suitable for detecting a deformation of the membrane part (5a); a supporting structure (2, 3) for supporting the pressure-sensitive component (5, 5a, 6), having a passageway (15) for a fluid of which a pressure is to be measured. The supporting structure (2, 3) comprises: a supporting body (2) with respect to which the sensor body (5) is positioned in such a way that its membrane part (5a) is exposed to the fluid exiting the passageway (15), the supporting body (2) having at least one through cavity (14), a compressible body (16), which is configured for compensating possible variations of volume of the fluid. The supporting body (2) has a first body portion (2c) comprising a transverse wall (22) of the through cavity (14), defined in which is at least one first passage (23a-23b) and at least one second passage (24), the at least one first passage (23a-23b) belonging to the passageway (15) for the fluid. The compressible body (16) is an element over-moulded with respect (Continued)

to the supporting body (2), that has respective opposite portions (20, 21) which extend in positions corresponding to opposite sides of the transverse wall (22), and which are connected to one another via at least one intermediate portion (16*a*) of the compressible body (16) that that extends through the at least one second passage (24). The first body portion (2*c*) is shaped to define at least one step or one projection or one relief (25; 28) which determines at least one of: a cross-sectional narrowing of the at least one second passage (24), configured to define a corresponding cross-sectional reduction of the at least one intermediate portion (16*a*) of the compressible body (16), and a development of the at least one intermediate portion (16*a*) of the compressible body (16) which is generally tortuous or comprises a number of stretches substantially angled to each other.

18 Claims, 36 Drawing Sheets

(56) References Cited

U.S. PATENT DOCUMENTS

| | | | |
|---|---|---|---|
| 2014/0013853 A1* | 1/2014 | Wohlgemuth | G01L 13/025 73/716 |
| 2016/0054192 A1* | 2/2016 | Kachenko | G01L 19/04 73/715 |
| 2017/0089793 A1* | 3/2017 | Fetisov | G01L 19/0046 |
| 2017/0350778 A1* | 12/2017 | Gadini | G01L 19/143 |

* cited by examiner

Fig. 48
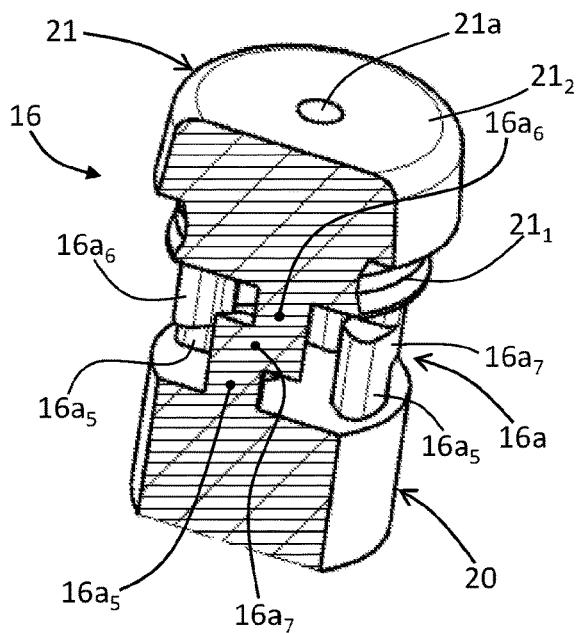
Fig. 49
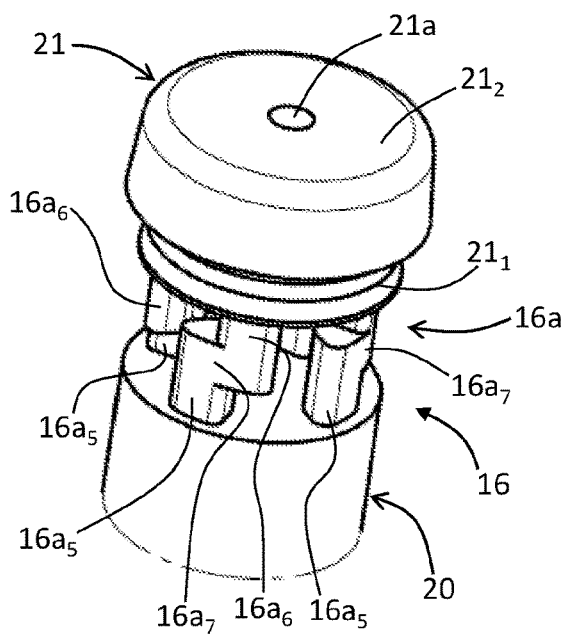
Fig. 50

SENSOR DEVICE, IN PARTICULAR A PRESSURE SENSOR

This application is the U.S. national phase of International Application No. PCT/IB2017/052243 filed Apr. 19, 2017 which designated the U.S. and claims priority to IT Patent Application No. 102016000042011 filed Apr. 22, 2016, the entire contents of each of which are hereby incorporated by reference.

FIELD OF THE INVENTION

The present invention relates to pressure-sensor devices and has been developed with particular reference to sensor devices that comprise a pressure-sensitive element having an elastically deformable membrane, associated to which is an element for detecting deformation of the membrane.

PRIOR ART

A sensor device having the characteristics referred to in the preamble of claim 1 is known from WO2008/078184 A2 filed in the name of the present Applicant.

The above document describes a pressure-sensor device, the sensitive component of which has a sensor body with a blind cavity, the bottom of which is formed by a membrane part. The membrane part is elastically deformable and associated thereto is a detection element, such as a bridge of resistive or piezoresistive elements. The device has a casing made of a number of parts, amongst which a supporting body for the sensor body. The supporting body is axially traversed by a cavity, the inlet end of which is in a position corresponding to a hydraulic attachment portion of the casing, the outlet end of the through cavity facing, instead, the cavity of the sensor body, i.e., of its membrane part.

In certain applications, devices of the type referred to above operate in conditions of very low temperature, and it may occasionally occur that the fluid the pressure of which is to be detected freezes, thus increasing in volume. Given that the membrane part of the sensor body is usually relatively thin and delicate, it is important to adopt solutions that may prevent its failure and/or damage to the corresponding detection element following upon increase in volume of the fluid due to freezing. The aforesaid prior document consequently proposes association to the supporting body of one or more compressible compensation bodies, i.e., elements suitable for compensating possible increases in volume of the fluid following upon freezing thereof.

The solution known from WO2008/078184 A2 envisages the use of "external" compensation elements, i.e., ones mounted on the outside of the supporting body, substantially at the cavity of the sensor body, i.e., in the proximity of its membrane part, or else "internal" compensation elements, i.e., ones directly inserted in the through cavity of the supporting body, at a certain distance from the membrane of the sensor body, where the aforesaid compensation elements each have a through axial duct, which provides a respective part of the passageway for the fluid undergoing detection.

The aforesaid document also suggests the possibility of forming an internal compensation element and an external compensation element in a single compressible body. This single compressible body is, by its nature, compliant (yielding), and this enables mounting thereof on the supporting body, with a corresponding part inside its through cavity and another part on the outside of this cavity, so as to project into the cavity of the sensor body. According to possible variant embodiments described in WO2008/078184 A2, the aforesaid single body may also be configured as part overmoulded on the supporting body of the device. In these known solutions, the through cavity of the supporting body has an intermediate transverse wall defining a narrowing or restriction of the cavity itself, necessary for guaranteeing anchorage of the aforesaid single body.

In the devices produced according to WO2008/078184 A2, in which an internal compensation element and an external compensation element are formed in a single body, the pressurized fluid at inlet to the device exerts a direct thrust at the lower end and/or on some walls of the internal compensation element. Given that the compressible body is made of a relatively yielding material—such as a silicone—these axial and/or radial thrusts of the fluid may determine over time a displacement of at least part of the yielding material towards the sensitive element, i.e., a sort of extrusion of at least part of the compressible body that forms the two compensation elements. For instance, the present Applicant has found that, in particular conditions—such as high pressures of the fluid in the system to which the sensor is connected (e.g., in the case of the phenomenon known as "water hammer") that may occasionally occur—the thrust of the fluid at high pressure may exceed the limit of compression of the compressible element, the internal structure of which may be compacted to the point where it is displaced at least in part as a result of the thrust of the fluid, in turn transferring the thrust onto other internal areas of the structure of the sensor.

The above displacement or extrusion of at least a part of the internal-compensation body gives rise to a deformation of the yielding material in regions close to the sensitive element, thereby causing a thrust of the material itself directly on the membrane part, with consequent alterations of the reliability of measurement of the device or failure of the membrane part itself. The problem is exacerbated in the case where the operating temperatures, i.e., the ambient temperature and/or the temperature of the fluid, are relatively high, given that in these conditions the material of the compensation element tends in itself to increase in volume and/or increase its yielding.

In various embodiments described in the aforesaid prior document, the device is moreover built so as to define, along the passageway of the fluid the pressure of which is to be detected, one or more capillary passages, or in any case passages having a reduced section. Provision of these passages is aimed at imposing beforehand, with relative precision, one or more regions in which the fluid will start to freeze, with the possibility then of causing freezing in the areas of the passageway for the fluid having a wider section, i.e., in a direction opposite to the membrane portion of the sensitive component. Provision of these capillary passages complicates production of the device, for example on account of the fact that to its supporting body there must be associated additional purposely shaped inserts. Notwithstanding the presence of these passages with reduced section, the pressurized fluid in any case exerts a direct thrust on the membrane of the sensitive element. For this reason, in the case of freezing of the fluid within the corresponding passageway, the increase in volume of the fluid following upon freezing thereof determines a significant thrust in an axial direction towards the membrane, with consequent risks of damage.

Aim and Summary of the Invention

In view of the foregoing, the present invention is aimed at providing a pressure-sensor device of the type referred to above, in which the risks of alteration of the measurement and/or of damage to the sensing membrane are eliminated, or at least reduced further.

In the above context, a main aim of the present invention is to provide a pressure-sensor device of the type referred to above, where the thrust exerted by the pressurized fluid on a compressible body that is overmoulded or co-moulded and/or defines two compensation elements does not cause any deformation and/or extrusion of the yielding material that forms the aforesaid compressible body, such as to adversely affect the reliability of detection of the device.

An auxiliary aim of the present invention is to provide a pressure-sensor device of the type referred to above, where the thrust exerted by the icy fluid does not cause deformations or damage such as to adversely affect the reliability of detection of the device and/or does not cause failure of its membrane.

Another auxiliary aim of the present invention is to provide a pressure-sensor device of the type referred to above that can be produced in a simple, fast, and economically advantageous way.

One or more of the aforesaid aims is achieved, according to the present invention, by a pressure-sensor device having the characteristics specified in the annexed claims. The claims form an integral part of the technical teaching provided herein in relation to the invention.

A pressure-sensor device according to the invention has a body that houses or supports a pressure-sensitive element, associated to which is at least one compressible body designed to compensate any possible increase in volume of the fluid undergoing detection.

The aforesaid body, defined hereinafter for simplicity also as "supporting body", has a through cavity and at least a first body portion thereof is provided with detent means, in particular at a wall transverse with respect to the through cavity. The aforesaid body portion, or the transverse wall, is traversed by at least one first passage that, together with a duct defined at least in part by the at least one compressible body, belongs to the passageway for the fluid the pressure of which is to be detected. The compressible body is an element overmoulded or co-moulded with respect to the supporting body and preferably has respective opposite portions which extend at opposite sides of the transverse wall, wherein said opposite portions are connected to each other by means of at least one restricted portion of the compressible body that extends through at least one second passage defined in the transverse wall. The at least one restricted portion is preferably in an intermediate position with respect to compensation elements having greater sizes, formed by a single compressible body.

The aforesaid portion of the supporting body is preferably shaped so as to define at least a step, or a projection, or relief, which determines at least one of:
  a narrowing of section of the at least one second passage, configured for defining a corresponding reduction of section of the at least one intermediate portion of the compressible body, and
  a generally tortuous development of the at least one intermediate portion of the compressible element, in particular comprising a number of stretches substantially angled with respect to one another.

These characteristics, i.e., the definition of suitable means for arrest and/or retention of the position of the compressible body, enable to avoid the risks tied to possible extrusion or displacement of the overmoulded or co-moulded compressible body. The cited narrowing determines a corresponding restriction of the thickness of the connection portion that joins the two opposite portions of the compressible body, limiting thereby the effects of a possible extrusion or displacement of the material. The same applies to the case of a second passage that is as a whole tortuous or has stretches angled with respect to one another. The aforesaid step (or projection or radial or transverse relief) likewise determines the presence of at least one surface upon which the corresponding intermediate portion of the compressible body partially comes to bear, thereby further countering possible extrusion of the material that constitutes it.

Additionally, in this way, the compressible body may conveniently be overmoulded on or co-moulded with the supporting body and withheld in position. For this purpose, in advantageous embodiments such as the ones referred to in claim 12, the transverse wall may define a plurality of second passages, through which there extend respective intermediate portions of the compressible body, to the advantage of the moulding operations (the flow of the material is more convenient), of the quality of connection between the two portions of the compressible element which are in opposite positions with respect to the transverse wall, and of fixing in position with respect to the supporting body.

At least one second passage for the material that provides a corresponding intermediate portion of the single compressible body is preferably defined in a peripheral position with respect to a first passage of the transverse wall, designed, instead, for the fluid the pressure of which is to be detected; the at least one second passage could, however, be defined in some other position, for example a central position with respect to the at least one passage for the fluid undergoing detection.

As indicated in claim 2, the compressible body may be overmoulded such as to define at least one of a first compensation element, set at least partially within the through cavity of the supporting body upstream of the transverse wall, and a second compensation element, set downstream of the transverse wall, in a position close to the membrane of the sensitive element, wherein the first and/or the second compensation element each define at least one duct for the fluid, or else delimits at least one duct for the fluid together with a corresponding part of the supporting body. In the case of freezing of the fluid, the first compensation element enables compensation of the increase in volume of the fluid in the preponderant part of the passageway, whereas the second compensation element makes a compensation in the most critical point, i.e., in the proximity of the membrane. The protection is maximum in the case of coexistence of both of the compensation elements, as in embodiments of the type referred to in claim 3, wherein the two opposite portions of the compressible element provides the aforesaid first and second compressible elements, overmoulded as a single compressible body.

In various embodiments, such as those referred to in claim 4, the first body portion of the supporting body comprises at least one projecting or cantilever wall of the through cavity, set downstream of the transverse wall, which extends towards the inside of the through cavity itself so as to define at least in part the aforesaid step (or projection or relief). This characteristic simplifies definition of the above step, preventing the presence of undercuts or recesses and thereby simplifying production of the supporting body, in particular when this is a moulded body of plastic material. As an alternative or in addition to the aforesaid projecting wall, the transverse wall may include a narrowing of section for the same purposes indicated above.

Preferably, as indicated in claim 5, the first body portion of the supporting body is shaped so as to define the at least one step or projection or relief in a position corresponding to at least one end region of the at least one second passage: this simplifies construction of the passage itself, in particular when the supporting body is a moulded body. Very advantageously, the first body portion of the supporting body may be shaped to define at least two steps (or projections or radial or transverse reliefs) in opposite end regions of the second passage. In this way, possible effects of extrusion or displacement of the material that forms the two compensation elements are further countered, while simplicity of construction of the supporting body remaining the same.

The simplicity of construction of the supporting body, in particular when this body is obtained by moulding of plastic material, is maximum when each second passage is obtained through cavities which each have a respective bottom and are staggered with respect to one another but intersect, defining prevalently lateral openings, for example as in the case of the embodiments of claim 7. An embodiment of this sort, in addition to being simple, enables effective definition of a generally tortuous development of the at least one intermediate portion of the compressible element, in particular comprising a number of stretches substantially angled with respect to each other.

In various embodiments, such as those indicated in claim 8, the at least one first passage for the fluid has at least one respective inlet and at least one respective outlet, which are arranged so as to define a tortuous path for the fluid. The aforesaid tortuous path considerably reduces the direct thrust of the fluid on the membrane of the sensitive element, in particular when the fluid is icy, and the consequent risks of the prior art deriving from possible freezing of the fluid itself. In embodiments of this type, and as indicated in claim 9, it is preferable that the at least one inlet of the first passage is in fluid communication with the outlet end of the duct of the first compensation element and/or the at least one outlet of the first passage is in fluid communication with the inlet end of the duct of the second compensation element.

The at least one inlet and the at least one outlet of the at least one first passage preferably extend according to respective substantially parallel axes. An embodiment of this sort, in addition to being simple, enables effective definition of a tortuous path for the fluid. For this reason, advantageously, also the at least one first passage, or each first passage, may be formed by at least two cavities provided with bottom, which are staggered with respect to one another and intersect laterally.

By and large, the same advantages may be obtained also in embodiments of the type referred to in claim 10, i.e., where the at least one first passage has at least two inlets connected to one and the same outlet, or else one inlet connected to at least two outlets. For such cases, a first compensation element upstream of the transverse wall of the through cavity and/or a second compensation element downstream of the aforesaid wall may be provided with one or two respective cavities, as indicated in claim 11.

In preferential embodiments, such as those referred to in claim 13, the through cavity of the supporting body is shaped so as to define, downstream of the transverse wall, a housing portion, partially housed within which is a compensation element close to the sensitive component. In this way, the quality of positioning of the aforesaid compensation element is increased and any lateral expansion thereof following upon freezing and dilation of the fluid are limited. Preferably, a wall that peripherally delimits the aforesaid housing has one or more reliefs that perform the function of retention of the compensation element.

In various embodiments, such as those referred to in claim 14, the peripheral surface of the through cavity of the supporting body is shaped so as to define one or more reliefs, which advantageously perform a function of retention of the first compressible element and/or second compressible, further countering possible extrusion phenomena. The aforesaid reliefs, which themselves provide detent means for a compressible body, may be used to advantage also in the absence of a wall transverse to the through cavity of the supporting body.

In various embodiments, such as those referred to in claim 15, the pressure-sensor device comprises means for causing adhesion or bonding between at least one surface part of the supporting body and at least one corresponding surface part of a compressible body. These means, which themselves perform a function of detent or retention for a compressible body, may be advantageously used also in the absence reliefs and/or of a wall transverse to the through cavity of the supporting body.

BRIEF DESCRIPTION OF THE DRAWINGS

Further aims, characteristics, and advantages of the invention will emerge clearly from the ensuing detailed description, which is provided with reference to the annexed drawings and in which:

FIGS. 43-50 are views similar to those of FIGS. 2, 3, 6, 4, 5, 8, 9, and 10, respectively, regarding a further embodiment of the invention;

DESCRIPTION OF EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", and the like, that may be present in various points of the present description, do not necessarily refer to one and the same embodiment, but may, instead, refer to different embodiments. Moreover, particular conformations, structures, or characteristics defined in the framework of the present description may be combined in any adequate way in one or more embodiments that may even differ from the ones represented. The reference numbers and spatial references (such as "upper", "lower", "up", "down", etc.) refer to the examples appearing in the figures and are used herein merely for convenience and hence do not limit the sphere of protection or the scope of the embodiments.

Figure 1:
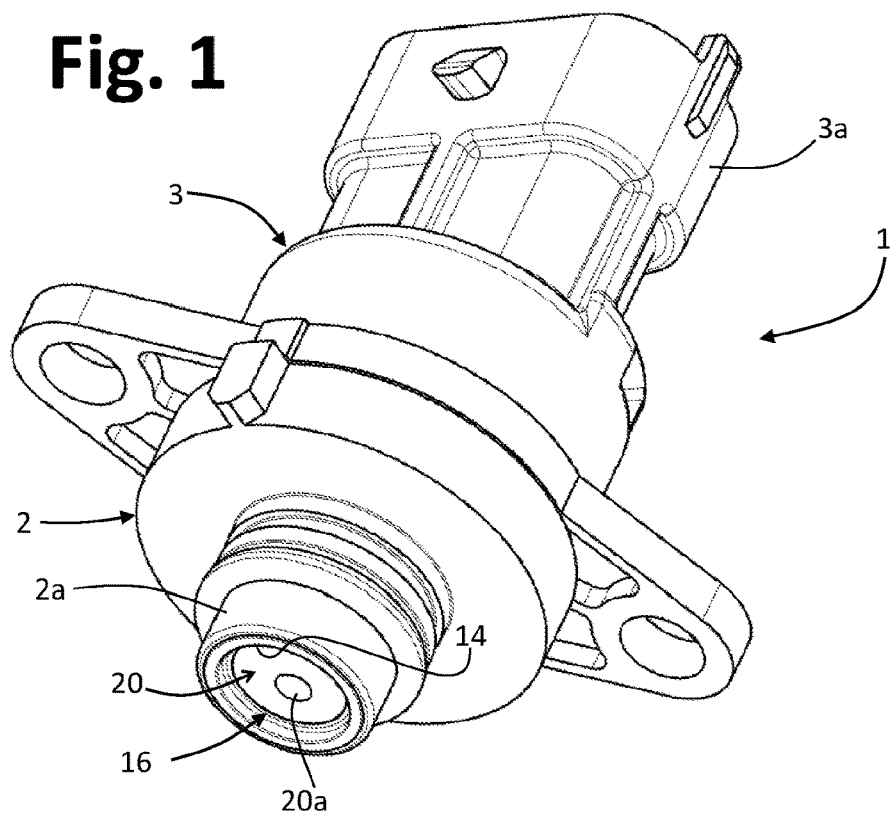
FIG. 1 is a schematic perspective view of a pressure-sensor device according to one embodiment of the invention.
Figure 2:
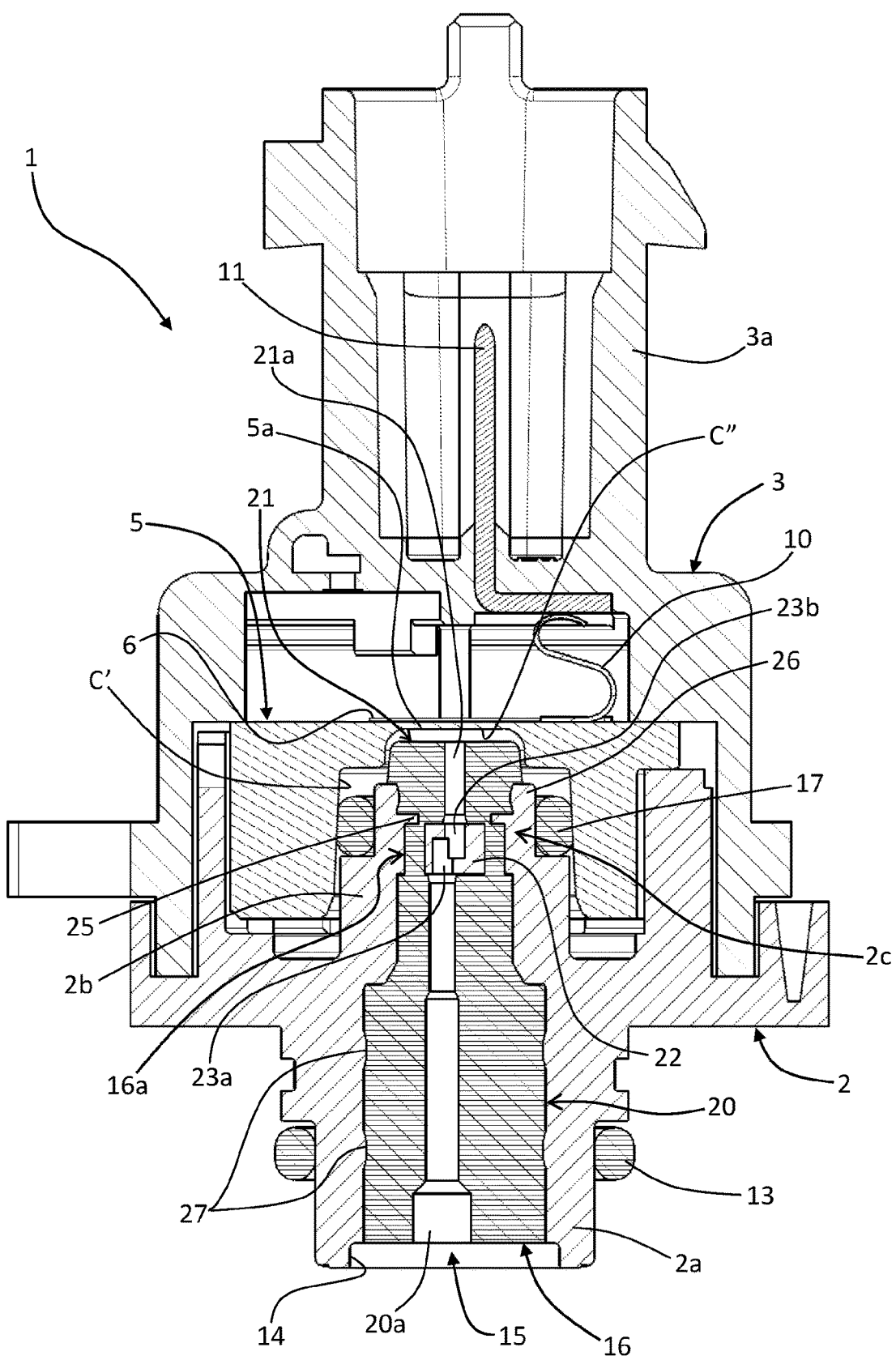
FIG. 2 is a schematic longitudinal sectional view of the device of FIG. 1.

In FIGS. 1 and 2, designated as a whole by 1 is a pressure-sensor device according to one embodiment of the invention. The device 1 has a housing or supporting structure, designed to house and/or support a pressure-sensitive component. The aforesaid structure is preferably configured like a casing, as in the examples illustrated, having an electrical-connection portion and a hydraulic-connection portion.

In the case exemplified, the housing or supporting structure, also defined hereinafter as "casing" for simplicity, comprises two main parts, amongst which a first body 2, defined hereinafter also as "supporting body", preferably performing also hydraulic-connection functions, and a second body 3, defined hereinafter also as "closing body", preferably performing housing and/or closing functions and electrical-connection functions. In various embodiments, the parts 2 and 3 contribute to defining a casing that protects the sensitive component from the external environment, albeit providing at least one passageway for a fluid of which a pressure is to be measured, and possibly one or more further passages towards the external environment, for example to have available a reference pressure or to enable venting of air.

The bodies 2 and 3 are coupled together, preferably in a fluid-tight way, so as to define a space within which the pressure-sensitive component is housed. As may be seen in FIG. 2, in the example illustrated, the sensitive component has a sensor body 5 with a membrane part 5a, which is elastically deformable as a function the pressure of the fluid being measured. In what follows, for simplicity, the part 5a will be defined also as "membrane". The membrane 5a may be obtained integrally in the sensor body 5 or else be configured as a distinct part associated to the sensor body 5, for example via welding or gluing (for instance, as in the case exemplified in FIG. 60).

As per the known technique, the sensitive component 5 has associated at least one element designed to detect deformation of the membrane part 5a. The aforesaid detection element, designated by 6 only in FIG. 2, may comprise a plurality of resistors or piezo-resistive elements, for example in bridge configuration, preferably provided on the side of the membrane 5a that is not exposed to the fluid the pressure of which is to be measured. In other embodiments (not represented), the detection element 6 may comprise electrodes and/or capacitive elements, such as two facing electrodes, preferably at least one of which is located on a side of the membrane 5a not exposed to the fluid.

In various embodiments, the sensor body 5 is monolithic, preferentially made of a ceramic material (e.g., alumina) so as to define a blind cavity, having a peripheral surface and a bottom surface, with the latter that belongs to the membrane 5a (in particular, to the inner side of the latter). In various preferred embodiments, the blind cavity of the sensor body 5 has an intermediate narrowing or variation of section so as to define a lower cavity portion C', which is wider, and an upper cavity portion C'', which is narrower. An embodiment of this sort proves particularly advantageous in so far as it enables a reduction of the area of the deformable membrane 5a, which in this case provides the bottom of the narrower cavity portion C'' and to which a corresponding element 6 for detecting deformation is in any case associated, in particular in order to withstand higher pressures or thrusts.

In various embodiments, present within the space defined by the casing 2-3 is a circuit that includes electrical and/or electronic components for control and/or treatment and/or processing of a signal generated by the detection element 6. In the case exemplified, the aforesaid circuit (not represented) is provided directly on the sensor body 5, on the upper face of which the aforesaid electrical and/or electronic components are located. For this purpose, it will be appreciated that the area of the upper face of the sensor body 5 that surrounds the membrane 5a is relatively wide and that to the aforesaid area there corresponds a portion of the body 5 that is in any case relatively thick: in this way, in this area, at the upper face of the body 5 there can hence be directly provided the aforesaid electrical/electronic components. Alternatively, the aforesaid circuit or electrical and/or electronic components may be provided on a board (not represented) associated, or fixed, or glued to the aforesaid sensor body 5.

In embodiments of this type, associated to the circuit provided on the sensor body 5 are contacts 10, which electrically connect electrically conductive pads or paths of the circuit itself to respective terminals 11 (just one is visible in FIG. 2) associated to the casing part 3 of the device 1. In various embodiments, the contacts 10 are elastic contacts, in particular made according to the specific teachings referred to in WO 2009/153737 filed in the name of the present Applicant, the contents of which are considered as being incorporated herein. The terminals 11 have a first portion preferably configured for electrical and mechanical coupling to a part of the contacts 10, for example a substantially L-shaped configuration. The casing part 3 defines a tubular portion 3a—which here extends in a generally axial direction of the device 1—within which respective second portions of the terminals 11 extend, to provide an electrical connector.

In other possible embodiments, the circuit for control, and/or treatment, and/or processing of the signals generated by the sensing element 6 is on the outside of the device 1, i.e., connected downstream of the terminals 11 (e.g., integrated in an electronic control unit on board a vehicle on which the device 1 is installed), in which case the contacts 10 have simply the function of connecting the sensing element 6 to the terminals 11. According to further possible embodiments, the aforesaid circuit comprises, instead, a circuit board of its own, set within the casing 2-3, possibly with a corresponding positioning element and/or spacer, for example as described in WO2008/078184 A2.

The supporting body 2 has a hydraulic-connection portion 2a, preferably projecting and having a cylindrical conformation, designed for connection with a line in which the fluid the pressure of which is to be detected passes. Preferentially, on the outside of the hydraulic-connection portion 2a is provided an external sealing element 13, here having an annular shape, for example an O-ring.

The opposite part of the supporting body 2, i.e., its upper face or surface, is configured peripherally—in a way in itself known—for coupling with the casing part 3, for example with a fluid-tight fixing obtained by welding. Branching off from the hydraulic-connection portion 2a is a through cavity, designated by 14, which extends through the body 2, preferably in an axial direction, up to its upper face. In one or more embodiments, the through cavity 14 defines at least in part a passageway for the fluid the pressure of which is to be detected, the aforesaid passageway being designated as a whole by 15 in FIG. 2. As will be seen, at least one part of the aforesaid passageway 15 is defined by a respective compressible body, i.e., a variable-volume compensation body, which is associated to the supporting body 2, preferably made of one or more elastically compressible and/or yielding materials configured for compensating possible variations in volume of the fluid, in particular in the case of freezing thereof.

In preferred embodiments, one and the same compressible body is shaped so as to define a number of elastically compressible compensation elements. A non-limiting example of such a compressible or elastically deformable body is designated as a whole by 16 in FIG. 2. In the example illustrated, the body 16 defines two elements (20, 21) for compensation of possible variations of volume of the fluid, which define respective portions (20a, 21a) of the passageway 15.

The sensor body 5 is mounted on the supporting body 2 in such a way that the lower surface of its membrane 5a is exposed to the fluid at outlet from the passageway 15, in particular facing the outlet of the latter (here defined by an axial duct 21a of the compensation element 21). In preferred embodiments, the device 1 further comprises an internal sealing element, designated by 17, which is set between the supporting body 2 and the sensor body 5, so as to define with these a sensing chamber (not shown). The passageway 15 gives out into the aforesaid chamber, so that the pressure of the fluid can act on the membrane 5a.

In one embodiment, such as the one exemplified, the supporting body 2 has, at its upper face, a central projecting portion, visible also in FIGS. 3 and 5-7, where it is designated as a whole by 2b, traversed by a respective part of the through cavity 14. The internal sealing element 17 extends around the aforesaid portion 2b, preferably at a corresponding external seat or shoulder of the portion 2b itself: in this way, the sealing element 17 provides a radial seal between the portion 2b and the sensor body 5, in particular the peripheral surface of its blind cavity, delimiting with the aforesaid elements the above sensing chamber.

In preferred embodiments, such as the one illustrated in FIG. 2, the compressible body 16 defines at least two different compensation elements 20 and 21, here also defined as "internal" and "external" or else "first" and "second", respectively. The aforesaid terms, "internal" and "external", refer to arrangements of the compensation elements 20 and 21 that have been represented and/or are preferential, where the compensation elements are located prevalently or at least in part on the inside and on the outside, respectively, of the body 2; these terms are used herein merely for convenience.

The body 16, i.e., each of the compressible bodies 20 and 21, is preferentially made of a polymer or an elastomer, preferably a silicone material, such as a silicone elastomer or a liquid silicone rubber (LSR) or fluoro liquid silicone rubber (FLSR), preferably a bicomponent material or a bicomponent silicone, in particular of the type designed to be overmoulded or co-moulded via injection.

The internal compensation element 20, which extends at least in part within the through cavity 14, has a preferably generally cylindrical and/or frustoconical shape, or a tubular or annular shape. The element 20 delimits at least one respective part of the passageway 15: for this purpose, in various embodiments, the element 20 has at least one duct, which extends in an axial direction, such as the duct designated by 20a; as will be seen, on the other hand, according to other embodiments, the element 20 may be shaped for delimiting a duct for the fluid together with a surface or wall of the supporting body 2.

The external compensation element 21 is set, instead, in a position generally facing the membrane 5a of the sensor body 5 and extends at least in part on the outside of the through cavity 14, in particular at the top of the projecting portion 2b of the supporting body 2, in a position relatively close to the membrane itself. Also the external compensation element 21 preferably delimits at least one respective part of the passageway 15. For this purpose, in various embodiments, the element 21 is provided with a through duct, which extends in an axial direction, designated by 21a and preferably forms a terminal stretch of the passageway 15 (not, however, excluded from the scope of the invention is the presence of a projection or a terminal tubular insert of the portion 2b, surrounded by the element 21, as in WO2008/078184).

As may be noted in FIG. 2, the external compensation element 21 is preferentially located within the blind cavity of the sensor body 5, with part of its peripheral surface relatively close to a corresponding part of the peripheral surface of the aforesaid blind cavity, and with its upper surface relatively close to the lower surface of the membrane 5a.

The preferential use of a sensor body 5 with two cavity portions C' and C" having a different cross section enables provision of a wider lower cavity portion C', in which it is possible to obtain more conveniently an internal radial seal, via the sealing element 17, and provision of a more restricted upper cavity portion C", which is able to contain a smaller amount of fluid and is hence subject to lower mechanical stresses in the event of freezing and/or expansion of the fluid. In this way, freezing of the smaller amount of fluid that can be contained in the cavity portion C" may be more conveniently compensated by the element 21. For this purpose, in embodiments of the type exemplified in FIG. 2, it is preferable for the external compensation element 21 to extend at least in part within the upper portion C" of the blind cavity of the body 5 so as to reduce further the volume that can be occupied by the fluid.

The supporting body 2 has a first body portion, which is shaped so as to define at least one first passage of the through cavity 14, in particular a passage defining a narrowing of the through cavity itself, where the compensation elements 20 and 21 are located upstream and downstream of the aforesaid portion, respectively. The aforementioned first body portion, designated as a whole by 2c, comprises a transverse wall 22 of the through cavity 14, which is in a position relatively close to the sensitive component 5, in particular in the proximity of the upper end of the through cavity 14 opposite to the hydraulic-connection portion 2a. In various embodiments, the first body portion 2c is located in an intermediate position of the projecting part 2b of the body 2. Preferably, the upper end of the element 20 is in contact with the lower side of the wall 22, whereas the base end of the element 21 is in contact with the upper side of the wall 22.

Figure 3:
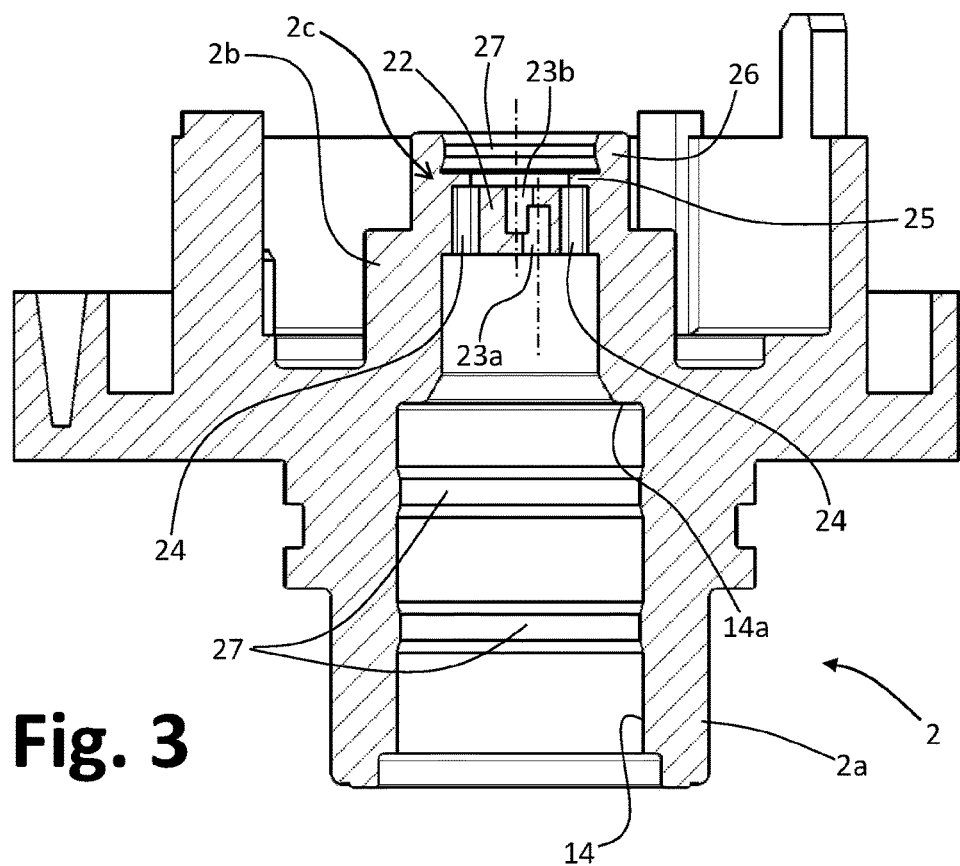
FIG. 3 is a schematic longitudinal sectional view of a part of the body of the device of FIG. 1.

As may be appreciated also in FIG. 3, the transverse wall 22 is traversed by at least one respective first passage that forms a respective part of the passageway 15 and includes at least one respective inlet 23a for the fluid and at least one respective outlet 23b for the fluid. It should be noted that the terms "inlet" and "outlet" are used for convenience in so far as they may refer, for example, to the albeit minimal displacements of the fluid that occur in the device in order to transfer the corresponding pressure towards the sensing membrane; in practical use, in fact, the fluid inside the device is substantially in static conditions.

In various preferred embodiments, the at least one inlet 23a and the at least one outlet 23b of the aforesaid first passage have relative positions such that the fluid undergoing measurement is prevalently induced to follow a tortuous path, at the area of the wall 22. For this purpose, in various preferred embodiments, the at least one inlet 23a and the at least one outlet 23b are staggered with respect to one another.

In various embodiments, such as the one represented in FIG. 2, the inlet 23a and the outlet 23b extend according to respective axes that are substantially parallel to one another. For this purpose, in preferred embodiments, the inlet 23a and the outlet 23b are substantially formed by two cavities, each with a respective bottom wall, defined at opposite sides of the transverse wall 22, which open downwards and upwards, respectively. The aforesaid cavities, preferably substantially cylindrical or with a profile that is at least in part curved, are arranged so as to intersect in a lateral direction in order to be in fluid communication with one another and thereby define the aforesaid substantially tortuous path for the fluid. The aforesaid cavities will be defined hereinafter for simplicity also as "blind cavities".

An embodiment of this sort proves particularly advantageous when the supporting body 2 is made of a single piece of moulded plastic material, in particular injection moulded material (albeit possibly being made of another material, such as a metal stamped or machined using a machine tool). For this purpose, the body 2 is preferably made of a polymer or a copolymer or a thermoplastic material, such as a polyamide PA or a polyphthalamide PPA or a mixture or combination of both (PA and PPA). The supporting body 2, albeit made of a polymer, preferably has a structure and/or parts with a thickness and/or shape such as to be substantially rigid and/or able to withstand mechanical thrusts and/or stresses, such as mechanical thrusts and/or stresses due to a pressure and/or an expansion of the fluid contained in the device.

The fact that the passage 23a-23b that traverses the transverse wall 22 is obtained by two blind cavities that open in opposite directions and that intersect one another prevents the presence of undercuts or recesses, and hence considerably simplifies moulding of the body 2 and the corresponding equipment.

In various embodiments, such as the one exemplified so far, the outlet 23b is in a substantially central position of the transverse wall 22, i.e., substantially coaxial to the through cavity 14 as a whole: in this way, the through duct 21a of the compensation element 21—which here constitutes a terminal stretch of the passageway 15—may be defined in a substantially central position of the element 21 itself and may directly face the central area of the membrane 5a of the sensitive element. On the other side, instead, the inlet 23a is in an eccentric position with respect to the outlet 23b, and for this purpose the axial duct 20a of the compensation element 20 is shifted with respect to the axis of the element itself. Hence, as may be appreciated, in the embodiment exemplified in FIG. 2, the inlet 23a is in fluid communication with the outlet end of the through duct 20a of the compensation element 20, whereas the outlet 23b is in fluid communication with the inlet end of the through duct 21a of the compensation element 21, the two ducts 20a and 21a being staggered with respect to one another.

In operation of the device 1, the fluid undergoing measurement reaches the inside of the device 1 through the hydraulic-connection portion 2a, from which the through cavity 14 of the supporting body 2 branches off. The fluid thus occupies the duct 20a of the compensation element 20, the passage 22a-22b defined in the transverse wall 22, and the duct 21a of the compensation element 21.

In this way, the fluid occupies the sensing chamber defined between the top of the projecting part 2b of the body 2, the sealing element 17 and the inner surfaces of the cavities C'-C". The pressure of the fluid in the aforesaid chamber determines bending or elastic deformation of the membrane 5a of the sensitive element, the extent of which is detected by the detection element 6. The electrical signal determined by the aforesaid detection element 6 represents the pressure of the fluid, according to a technique in itself known.

In the event of freezing of the fluid contained within the aforementioned sensing chamber, ducts 20a, 21a, and passage 23a-23b, there occurs an expansion or increase in volume of the fluid itself, which is compensated prevalently by the deformation of the elements 20 and 21 and in part by the deformation of the sealing element 17. In various preferred embodiments, the presence of the tortuous path determined by the mutually staggered positions of the inlet 23a and of the outlet 23b of the intermediate wall 22 prevents the increase in volume in an axial direction of the icy fluid contained in the passageway 15 from exerting a significant thrust on the membrane 5a of the sensitive element 5. For this purpose, it should be considered that the length of the duct 21a is preferably shorter than the length of the duct 20a, the former being in particular less than half of the second.

The increase in volume in an axial direction is hence greater for the fluid contained in the duct 20a of the element 20 and in the inlet 23a, which constitute a preponderant part of the passageway 15 of the fluid. However, the axial increase in volume of this part of the fluid is countered upwards by the bottom of the blind cavity that forms the inlet 23a. Instead, the increase in volume in an axial direction of the fluid contained in the outlet 23b and in the duct 21a of the element 21 is more limited, given that these constitute a lesser part of the passageway 15. In this way, then, the thrust upwards determined by the increase in volume of the icy fluid within the outlet 23b and the duct 21a is modest and such as not to determine risks of failure of the membrane 5a.

Figure 7:
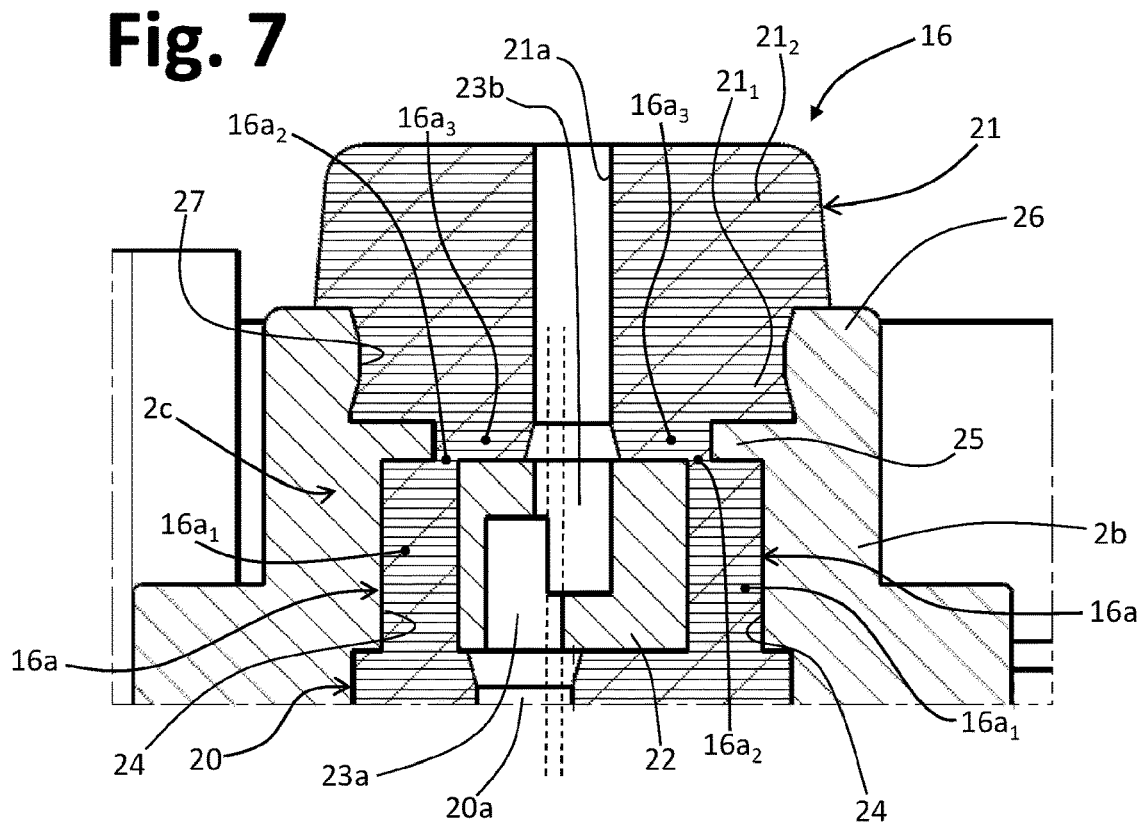
FIG. 7 is a partial and schematic cross-sectional view of a portion of the device of FIG. 1.

In various embodiments, notwithstanding the staggered arrangement of the inlet and outlet, the passage 23a-23b in any case includes an albeit minimal axial stretch—represented dashed in FIG. 7—determined by the intersection of the two cavities that provide the aforesaid inlet and outlet. The cross-sectional dimension of the aforesaid axial stretch is in any case very limited and such as not to affect appreciably the function of protection just described above, in particular being such as not to allow any displacement or extrusion towards the membrane 5a of a possible column of icy fluid in the duct 20a.

In preferred embodiments of the invention, the single deformable body 16 that forms the compensation elements 20 and 21 is a body overmoulded on the supporting body 2, or co-moulded therewith. More in general, in accordance with the invention, the body 16 is an overmoulded or co-moulded element having respective opposite portions that extend at opposite sides of the transverse wall 22, where the aforesaid opposite portions—here exemplified by the elements 20 and 21—are connected together by means of at least one intermediate portion.

It is pointed out that, in the present description and in the attached claims, and where not otherwise specified, the generic term "overmoulding" and its derivatives are to be understood as designating at least two different moulding techniques, and especially the technique of overmoulding in a strict sense and the technique of co-moulding. In overmoulding in a strict sense, a first component previously obtained (e.g., the supporting body 2) is inserted in a mould, where there is then injected in the molten or liquid state at least one material designed to provide a second component (e.g., the compressible body 16) on the first component. Instead, in co-moulding, in a particular mould there is first injected in the molten or liquid state at least one material designed to form the first component, after which a part of the mould is replaced—frequently in an automatic way—with a different part, and, in the new mould thus formed, still housing the first component, at least one material is injected in the molten or liquid state to form the second component on the first component (alternatively, the aforesaid part of the mould may be turned over, instead of replaced, in such a way that a different portion thereof forms part of the moulding impression).

In practice, then, in the first case the first component is obtained apart, introduced into the mould, and moulded thereon is the second component, possibly with the use of an adhesion promoter (primer) distributed over at least part of the first component, whereas in the second case both components are obtained, one after another, in at least part of one and the same moulding equipment, preferably overmoulding the second component soon after, in particular after a few tens of seconds or a few seconds, when the first component is still hot or has not yet reached room temperature. In this way, also obtained are preferably structural or chemical bonds and/or a better adhesion between the first and second components. In either case, however, one component is moulded on the other. Exemplified in the present description is the case of overmoulding of a first component (such as a compressible body) on a second component (such as a housing or supporting body), but the invention may be equally applied to the case of co-moulding of the two components in question (including the case of overmoulding or co-moulding of a housing or supporting body on or with a compressible body).

In the embodiments in which the elements 20 and 21 are made of a single piece, in particular a single overmoulded compensation element, the corresponding body 16 has at least one intermediate portion, which connects together the first and second compressible elements 20 and 21. In FIG. 2, one of the aforesaid connection portions is designated by 16a. In the aforesaid embodiments, the portion 2c of the supporting body 2, in particular the transverse part 22, is shaped so as to define at least one second passage, and the at least one connection portion 16a of the compressible body 16 extends through the aforesaid second passage. Preferentially, the at least one second passage determines a respective restriction in cross section of the through cavity 14.

In various embodiments, the transverse wall 22 of the body 2 is thus provided with one or more second passages, in addition to the passage 23a-23b. Some of the aforesaid second passages are designated by 24 in FIGS. 3 and 4-6 and are preferentially located in a position peripheral or eccentric with respect to the duct portion 23a-23b of the fluid. Preferentially, a plurality of second passages 24 is provided, arranged around the inlet 23a and the outlet 23b of the intermediate wall 22. In various embodiments, the second passages 24 are arranged according to a circumference or an arc of circumference. Preferentially, the second passages 24 have a cross section or profile at least in part curved or rounded, not necessarily circular.

According to the invention, the body portion 2c is moreover shaped so as to define at least one detent means, such as a step, or a projection, or a radial or transverse relief, designed to counter possible phenomena of displacement or extrusion of the material that forms the compressible body 16 as a result of the pressure of the fluid undergoing detection. For this purpose, in various embodiments, the body portion 2c comprises at least one projecting wall, which is defined downstream of the transverse wall 22 and extends towards the inside of the through cavity 14. Preferably, the aforesaid projecting wall overlies at least partially a corresponding second passage 24, or each second passage 24, as may be evinced, for example from FIGS. 3, 5, and 6, where the projecting wall is designated by 25. The projecting wall 25 is pre-arranged for determining a narrowing or a variation of a corresponding second passage 24, or of each second passage 24, in particular so as to define a corresponding reduction in cross section or a tortuous path of the corresponding intermediate portion 16a of the compressible body 16. This characteristic may in particular be appreciated in FIG. 7. As may be noted, the second passages 24 are prevalently occupied by respective parts $16a_1$ of the material of the connection portions 16a of the compressible body 16.

The presence of the projecting wall 25 that overlies the second passages 24 provides a step that determines a narrowing of the upper section of the passages 16a themselves, this narrowing being occupied by a minimum section $16a_2$ of the material of the connection portions 16a. A part $16a_3$ of the material of the connection portions 16a—which forms in part also a sort of base of the compressible element 21—occupies, instead, the area circumscribed by the projecting wall 25. The part $16a_1$ and the part $16a_3$ are preferably staggered radially or laterally with respect to one another.

Figure 8:
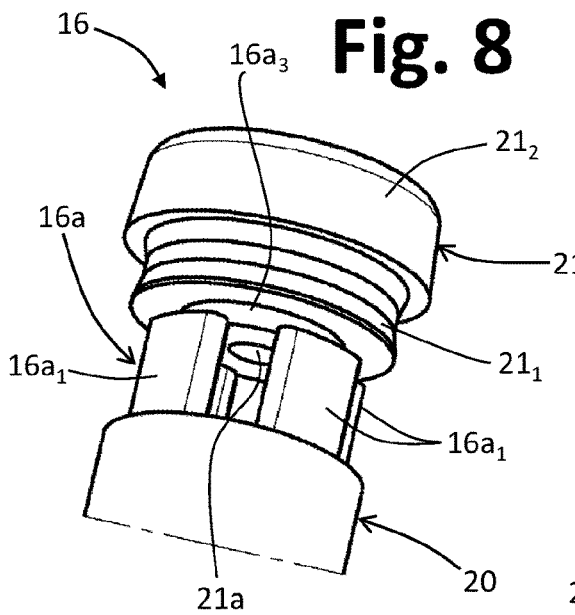
FIGS. 8 and 9 are partial and schematic perspective views of a deformable body of a device according to possible embodiments of the invention.
Figure 9:
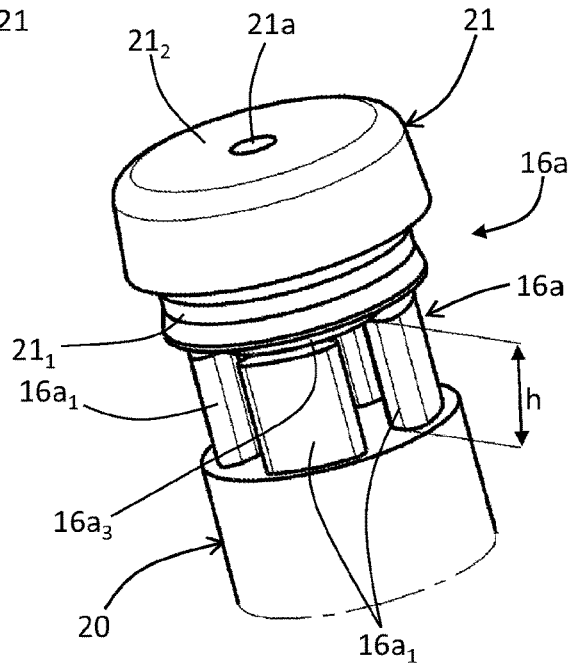
Figure 10:
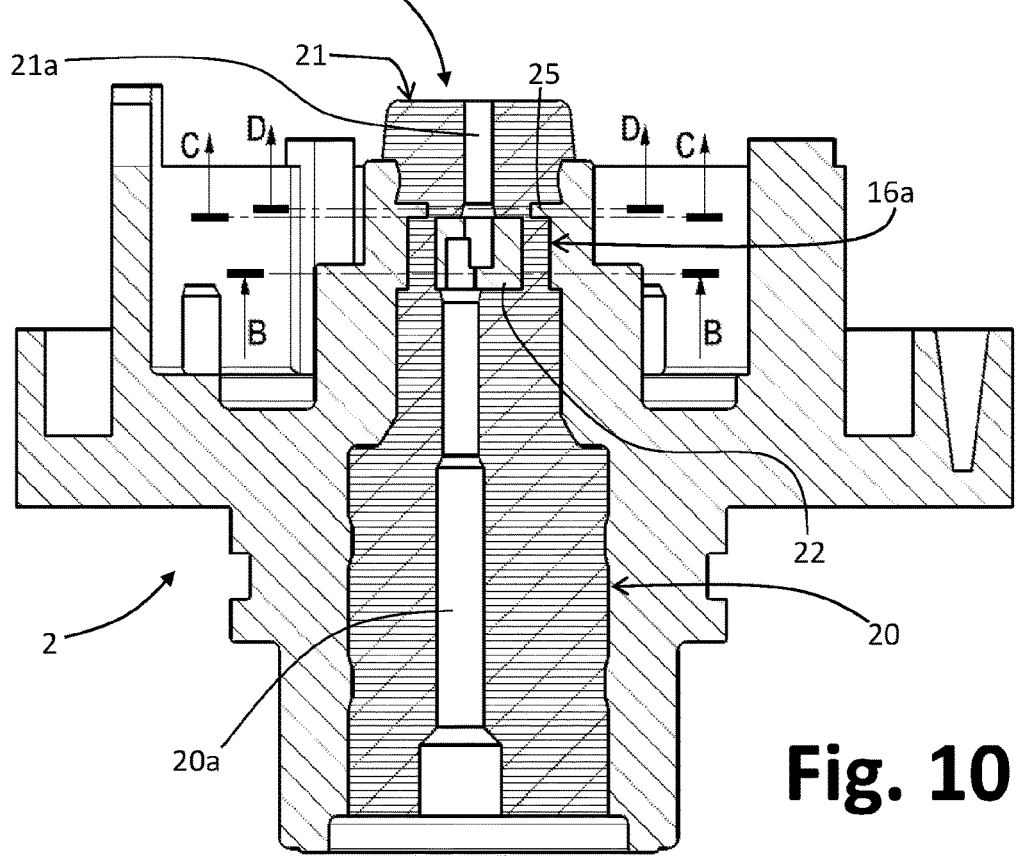
FIG. 10 is a cross section of a part of a body of a device according to the invention, with associated a deformable body of the type illustrated in FIGS. 8-9.
Figure 11:
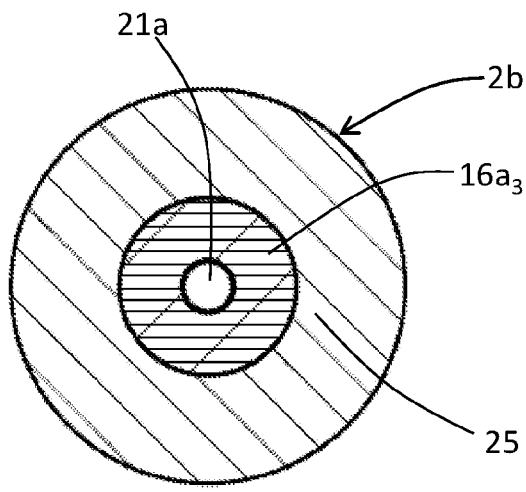
FIGS. 11, 12, and 13 are cross-sectional views according to the lines D-D, C-C, and B-B of FIG. 10, respectively.
Figure 12:
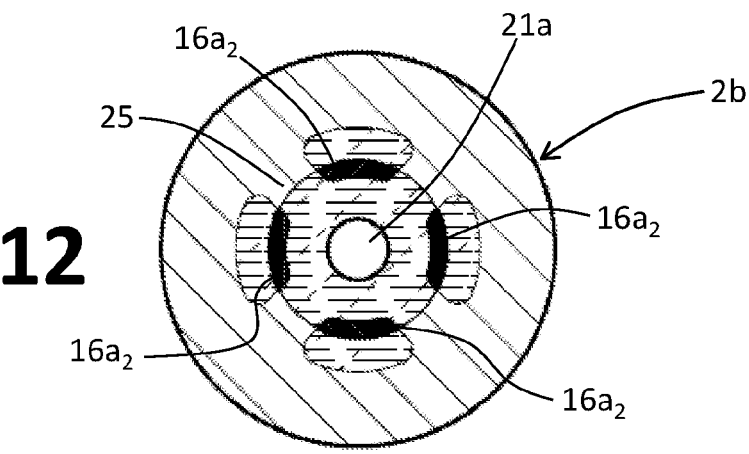
Figure 13:
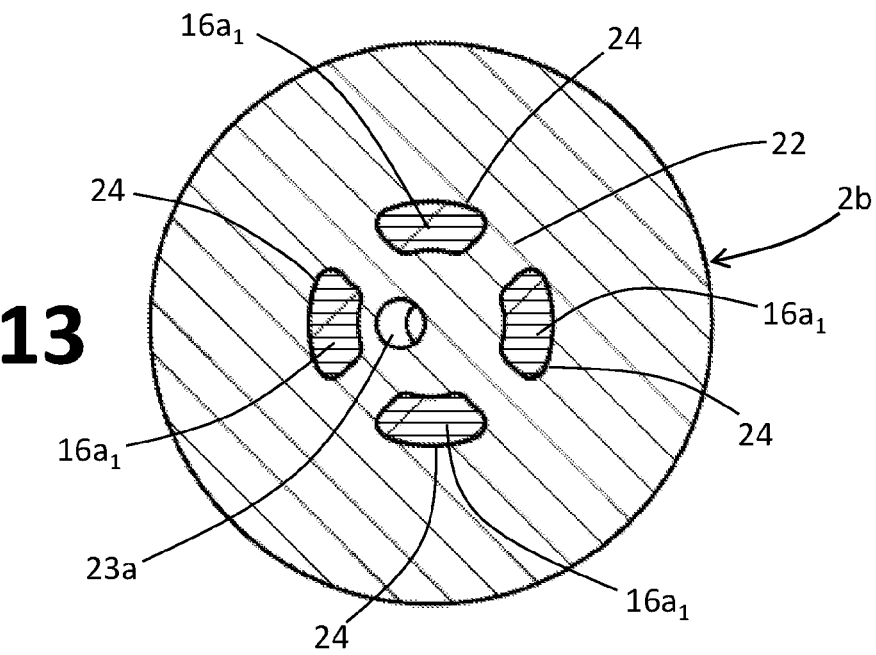

Partially visible in FIGS. 8 and 9 is an example of deformable body 16 that defines the compensation element 20 and the compensation element 21, where the parts $16a_1$ and $16a_3$ of the material of the connection portions $16a$ are highlighted. The aforesaid parts $16a_1$, $16a_2$, and $16a_3$ are moreover visible in the cross-sectional views appearing in FIGS. 11-13.

An arrangement of the type described enables effective limitation of the effects of a possible extrusion or displacement of the material that forms the single body 16 due to the pressure of the fluid at inlet, as explained in the introductory part of the present description. This effect is obtained both thanks to the fact that the lower surface of the projecting wall 25 opposes extrusion upwards of the material constituting the body 16 and because the section of effective passage of the material of the body 16, here represented by the parts designated with $16a_2$, is minimal.

In various preferred embodiments, the transverse wall 22 of the body 2 is an intermediate wall of the through cavity 14, i.e., a wall that is in an intermediate position at the two ends of the through cavity 14, but preferably in a position closer to the end of the through cavity facing the sensitive element. In embodiments of this type, the through cavity 14 or the body portion 2b can be advantageously shaped so as to define, beyond the transverse wall 22, a portion for housing the compressible element 21, clearly visible for example in FIGS. 3, 5, and 6, where the aforesaid housing portion is designated by 26, in particular a hollow cylindrical portion. As may be noted, the housing portion 26 is basically located at the top of the projecting portion 2b.

With reference also to FIG. 7, it may be clearly noted how a lower part of the element 21—designated by $21_1$—is located within the aforesaid portion 26, whereas an upper part of the element 21—designated by $21_2$—is located on the outside of the aforesaid housing portion 26, i.e., within the blind cavity of the pressure-sensitive element.

Preferably, in the operating conditions, in the event of freezing of the fluid contained at least in the upper cavity portion C" of the body 5 of the sensitive element, the aforesaid lower part $21_1$ of the element 21 is constrained peripherally by the portion 26, in particular in order to prevent any radial deformation and/or to provide a better support or fixing of the upper part $21_2$ of the element 21. The upper part $21_2$ of the compensation element 21 can, instead, undergo compression or deformation according to different angles (e.g., either radially or axially), in order to compensate freezing and/or expansion of the fluid contained at least in part in the upper cavity portion C".

Preferably, the upper part $21_2$ of the compensation element 21 extends at least in part also in the lower cavity portion C' in order to compensate also freezing or expansion of the fluid contained in a part of the aforesaid lower portion C', in the area delimited also by the sealing element 17.

From FIG. 3 it may be noted how, in preferred embodiments, the through cavity 14 that traverses the supporting body 2 presents an intermediate narrowing or restriction also in its area that is to house the compressible element 20, this intermediate narrowing being designated by 14a only in FIG. 3: in this way, also the compensation element 20 has two stretches of different diameter, or in any case with different cross-sectional dimensions, preferably having at least one step that opposes extrusion or displacement of the compensation element 20 towards the membrane 5a.

This solution, together with the fact that the element 21 is positioned beyond the transverse wall 22 but connected or fixed with respect to the element 20, guarantees positioning and/or fixing of the deformable body 16 as a whole both in the case of high pressures of the fluid and in the case of violent negative pressures of the fluid or of possible loosening of the material or materials constituting the deformable body 16. Of course, the narrowing 14a proves useful also for the purposes of countering the aforementioned phenomena of extrusion of the material of the body 16 towards the membrane 5a.

In various autonomously inventive embodiments, i.e., even in the absence of a transverse wall of the type designated by 22, the through cavity 14 of the body 2 has a peripheral surface shaped so as to define one or more reliefs that perform the function of retention of the at least one compressible element.

Figure 4:
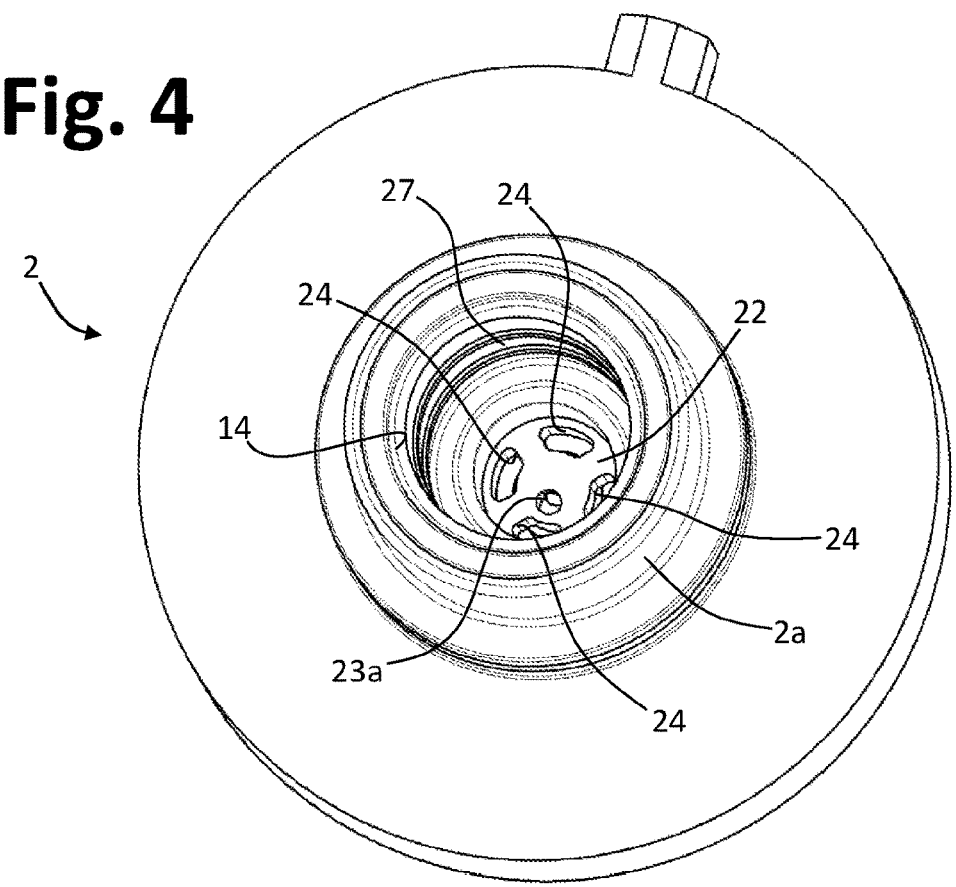
FIGS. 4-6 are perspective views from different angles of a part of the body of the device of FIG. 1, FIG. 6 being partially sectioned.
Figure 5:
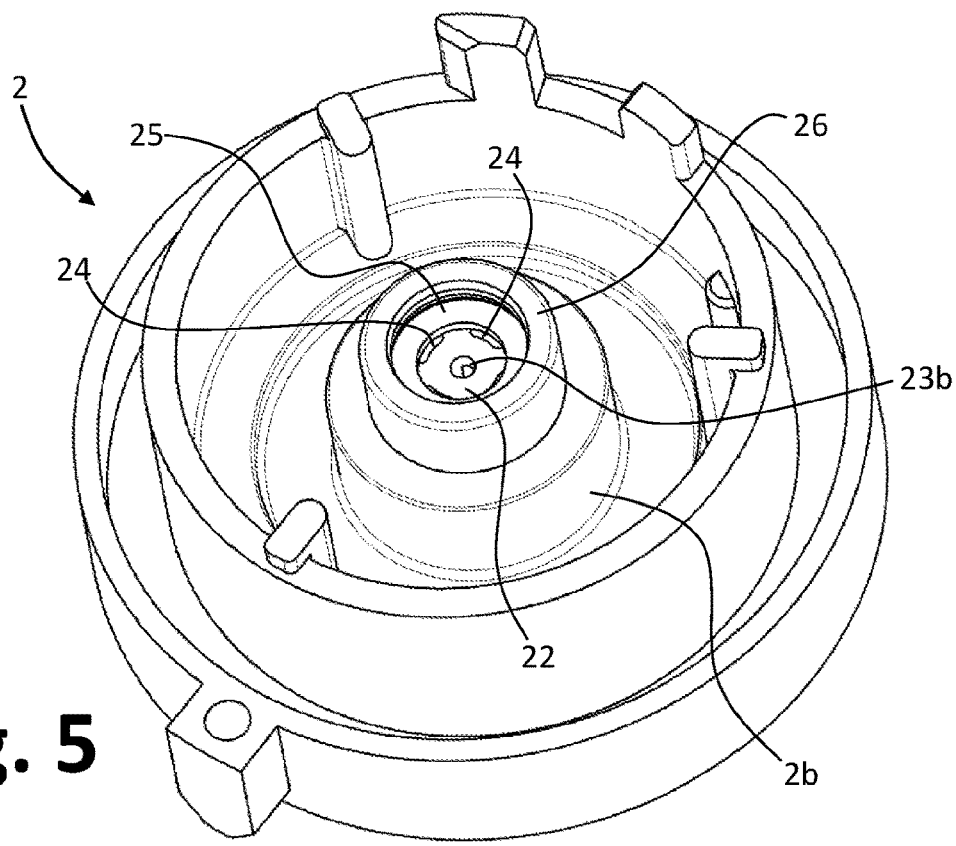
Figure 6:
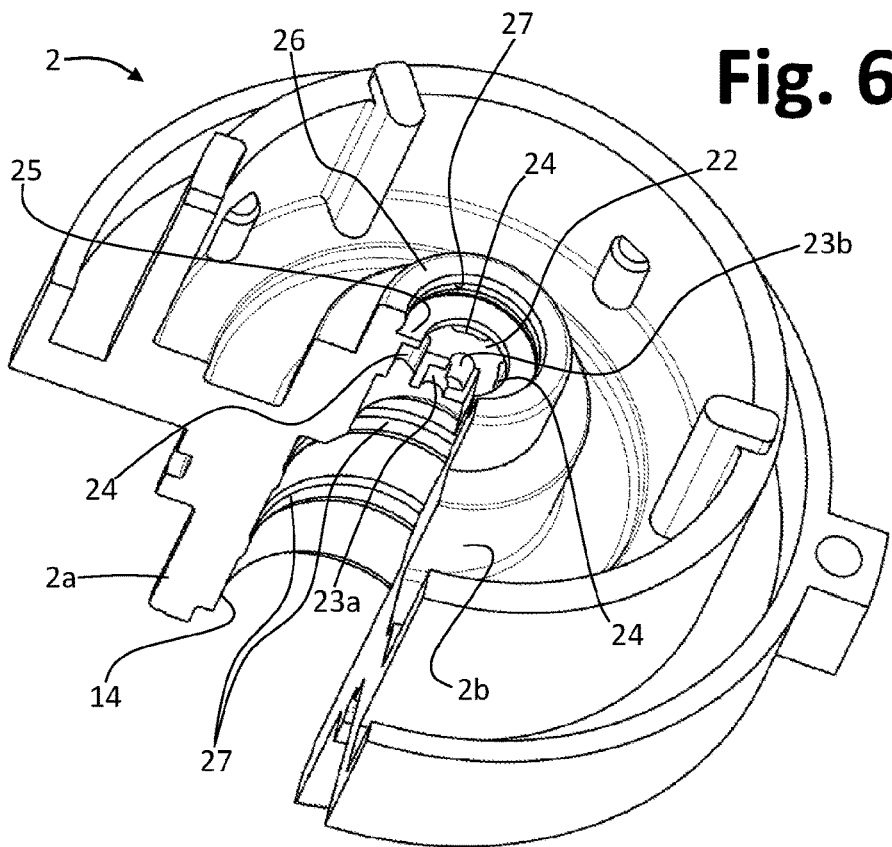

With reference, for example, to FIGS. 3, 4, and 7, designated by 27 are projecting annular reliefs of the peripheral surface of the through cavity 14, which may be provided in the part of the duct 14 that houses the compressible element 20 and/or in the part of the through cavity 14 that partially houses the compressible element 21, i.e., in the housing portion 26. As may be noted in particular in FIG. 7, these reliefs 27 are preferentially not very accentuated and have markedly flared radiusing surfaces so as to prevent the presence of undercuts that might hinder extraction of the body 2 from the corresponding manufacturing mould, when the aforesaid body 2 is obtained via moulding of plastic material. The reliefs 27 perform, as has been said, a function of retention of the elements 20 and/or 21, or of the single body 16 that constitutes them, for the purposes of countering the aforementioned phenomena of extrusion or displacement.

Represented schematically in FIGS. 14-17 is possible moulding equipment that can be used for overmoulding a deformable body 16 on a supporting body 2, for a device 1 of the type described previously with reference to FIGS. 1-13.

Figure 14:
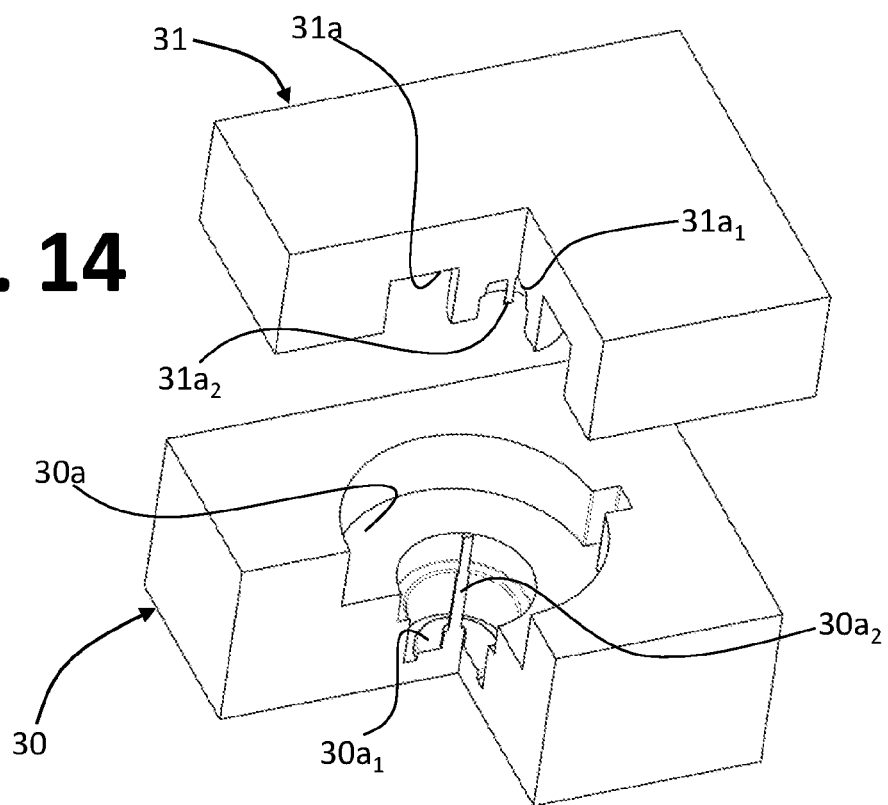
FIGS. 14-16 are exploded schematic perspective views of moulding equipment that can be used in a process for the production of a device according to the invention, in various operating steps.

With initial reference to FIG. 14, in the example the equipment comprises two mould parts 30 and 31. In the example, the mould parts 30 and 31 each define an impression 30a and 31a for positioning of the supporting body 2, previously obtained, as well as for definition of some internal and external profiles of the deformable body 16. In particular, the impression 30a includes a central base part $30a_1$ necessary for definition of the lower face of the body 16, from which there projects a columnar element $30a_2$ shaped so as to define the axial duct 20a of the element 20. On the other side, the impression 31a includes a central part $31a_1$ necessary for definition of the external profile of the portion $21_2$ (see FIGS. 8-9) of the compressible element 21, from which there projects a columnar element $31a_2$ shaped so as to define the axial duct 21a of the element 21.

Figure 15:
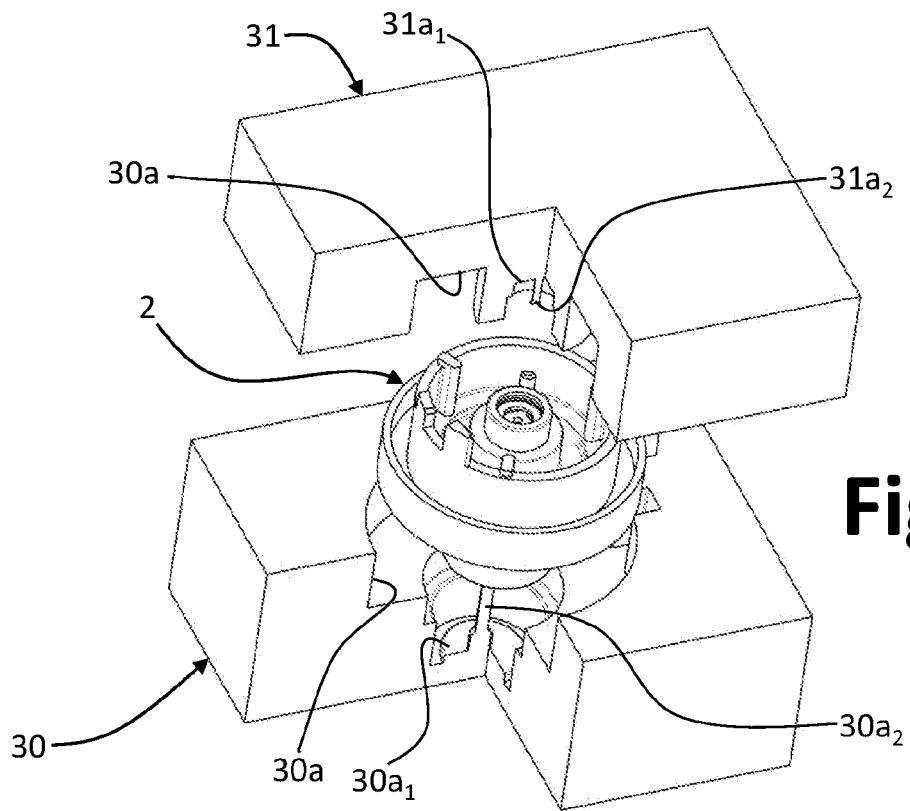
Figure 16:
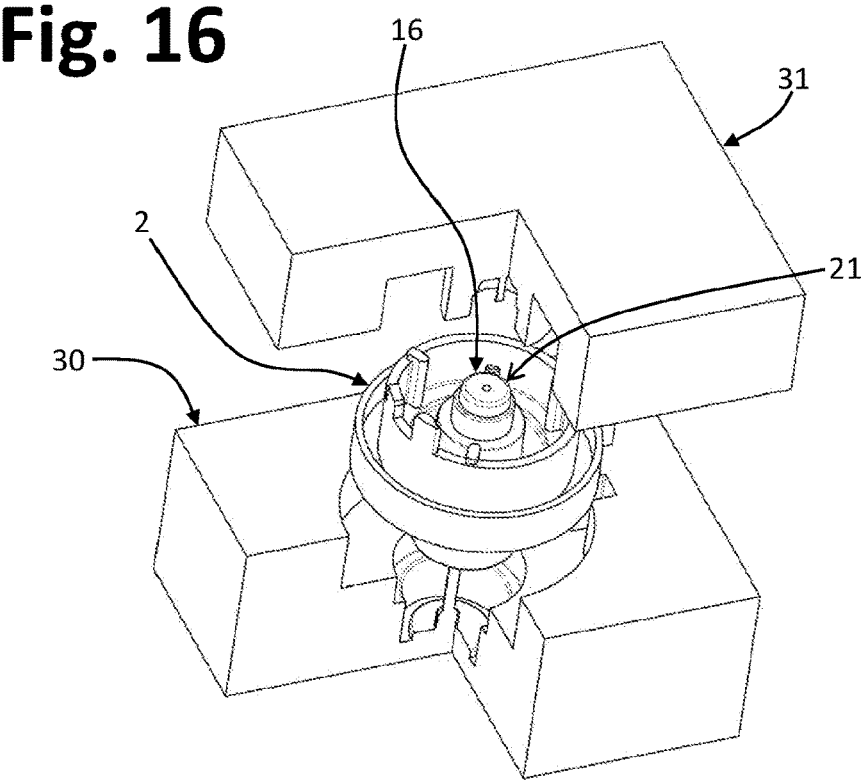

In FIG. 15, the equipment is represented in a condition where the mould is still open, after the body 2 previously formed has been positioned therein. After closing of the mould and start of injection of the material in the molten state, the latter occupies the free spaces defined between the parts 30, 31 and the body 2 (including the passages 24 of the body 2) so as to obtain the compressible body 16. It will hence be appreciated that, in an application of this type, one and the same supporting body 2 is to constitute a sort of "part of mould" necessary for definition of the final shape of the compressible body 16. After the necessary period of cooling and solidification of the overmoulded material, the mould parts 30 and 31 may be separated, as illustrated schematically in FIG. 16, with the body 16 by now formed on the body 2.

Figure 17:
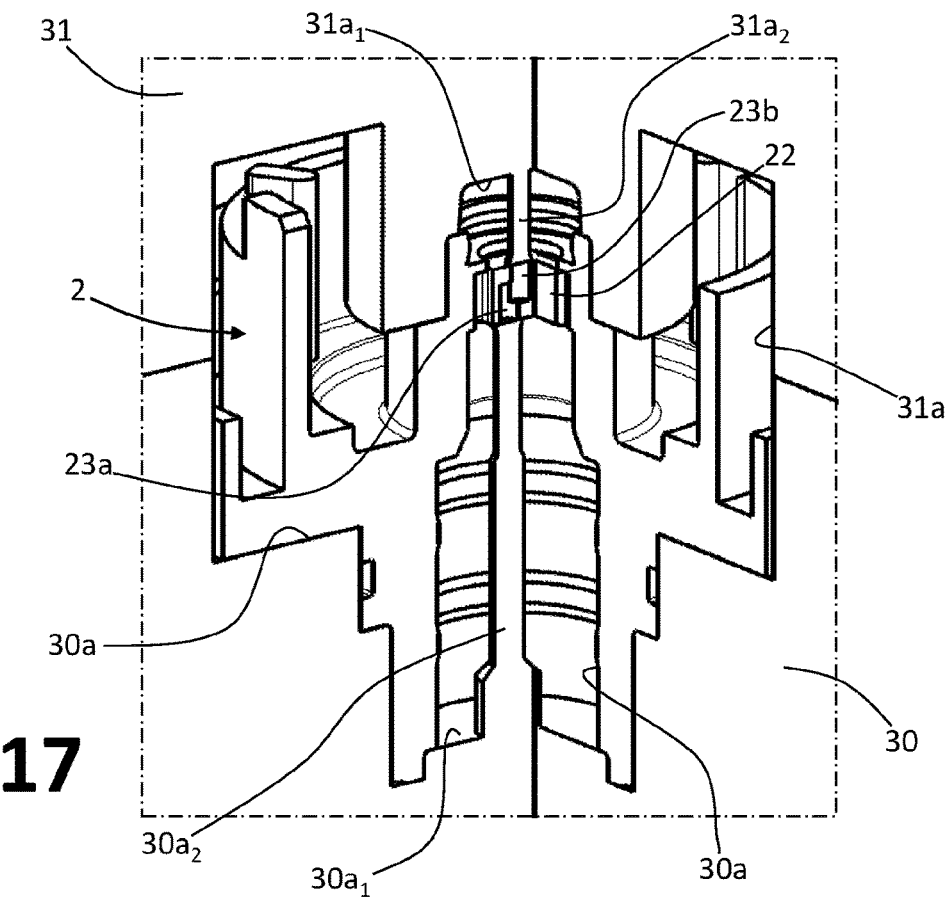
FIG. 17 is a partial and schematic sectioned view of the moulding equipment of FIGS. 14-16, with, inside it, a part of a body of a device according to the invention.

From the detail of FIG. 17—where the mould is represented in a closed condition, with the body 2 inside it and prior to injection of the material—it may be appreciated how the columnar elements $30a_2$ and $31a_2$ are in positions staggered in a lateral direction, in particular arranged so that the corresponding free ends obstruct the inlet 23a and the outlet 23b of the transverse wall 22, respectively, so as to prevent the material in the molten state from possibly penetrating into the aforesaid inlet and outlet.

Figure 18:
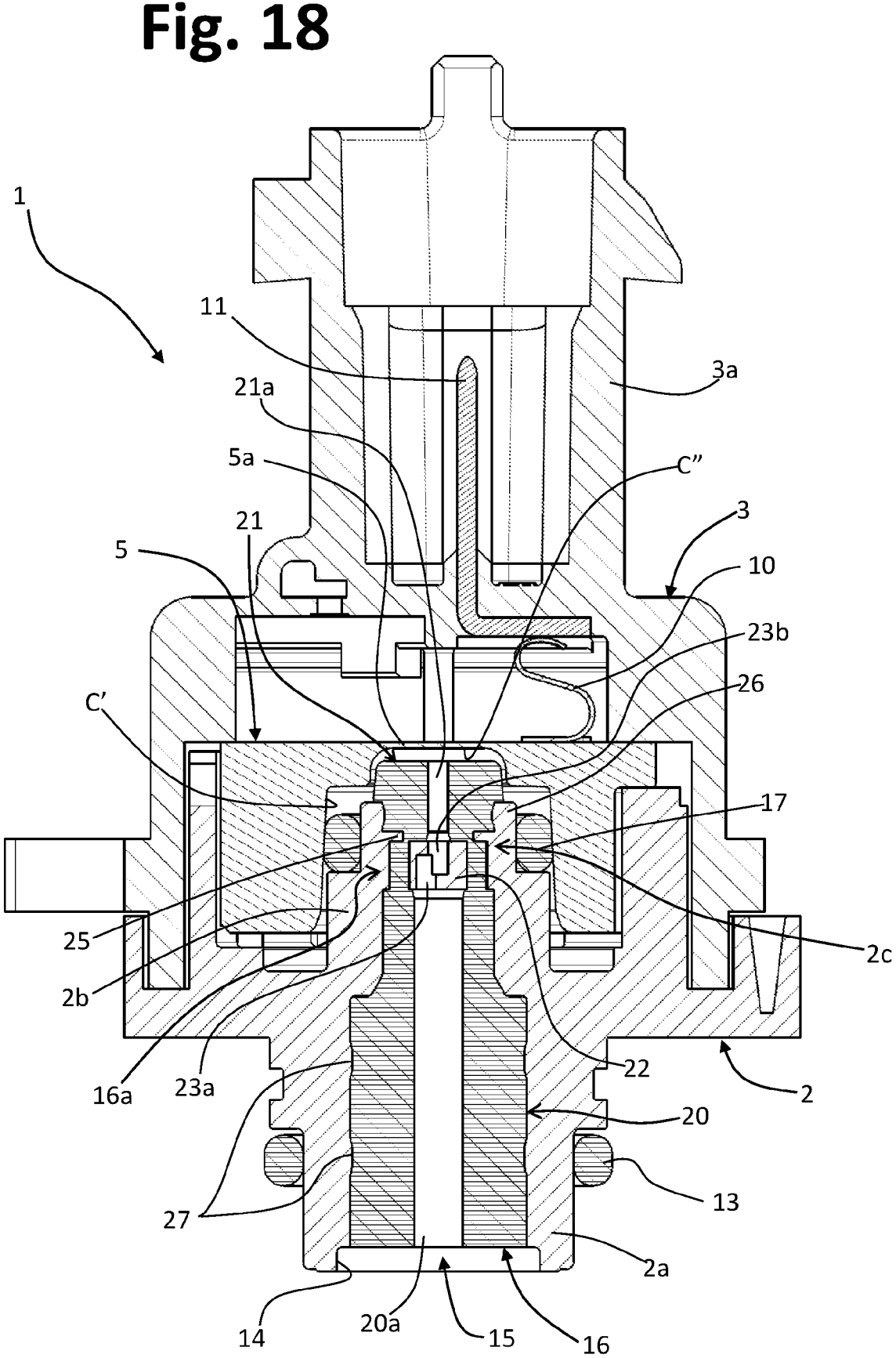
FIG. 18 is a view similar to that of FIG. 2, regarding a further embodiment of the invention.
Figure 19:
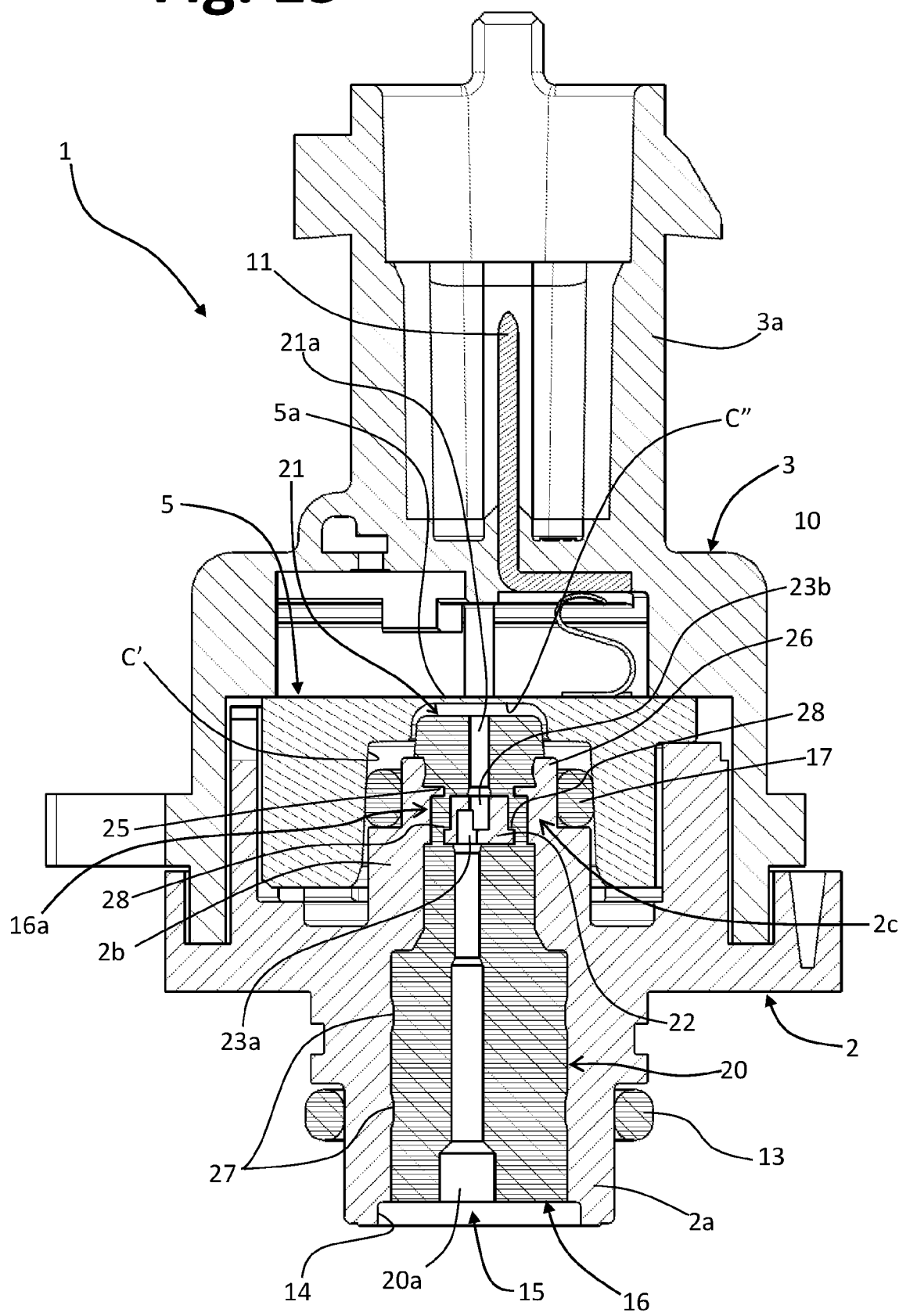
FIGS. 19-28 are views similar to those of FIGS. 2, 3, 6, 4, 5, 8, 10, 11-13, respectively, regarding a further embodiment of the invention.

FIG. 18 illustrates, in a view similar to that of FIG. 2, a variant embodiment according to which the axial duct 20a of the compressible element 20 extends in an axially central position of the element itself, i.e., in a position substantially coaxial with respect to the cavity 21a of the compensation element 21 and the outlet 23b defined in the transverse wall 22. The only substantial difference from the embodiment illustrated in FIGS. 1-13 is hence represented by the fact that the cross-sectional dimension or diameter of the duct 20a is greater than in the previous case so that the aforesaid duct is in a central position and in any case faces the inlet 23a of the transverse wall 22. For the rest, production and operation of the device 1 of FIG. 18 are similar to those already described above.

FIGS. 19-28 illustrate, in views similar to those of FIGS. 2, 3, 6, 4, 5, 8, and 10-13, respectively, a further embodiment of a device according to the invention. In this case, the portion 2c of the body 2 is shaped so as to define at least one step (or radial or transverse projection or relief) at a lower end region of a second passage 24, or of each second passage 24. More in particular, in the case illustrated, the portion 2c of the body 2 is shaped so as to define at least two steps or projections or reliefs in opposite end regions of a second passage 24, or of each second passage 24.

Figure 20:
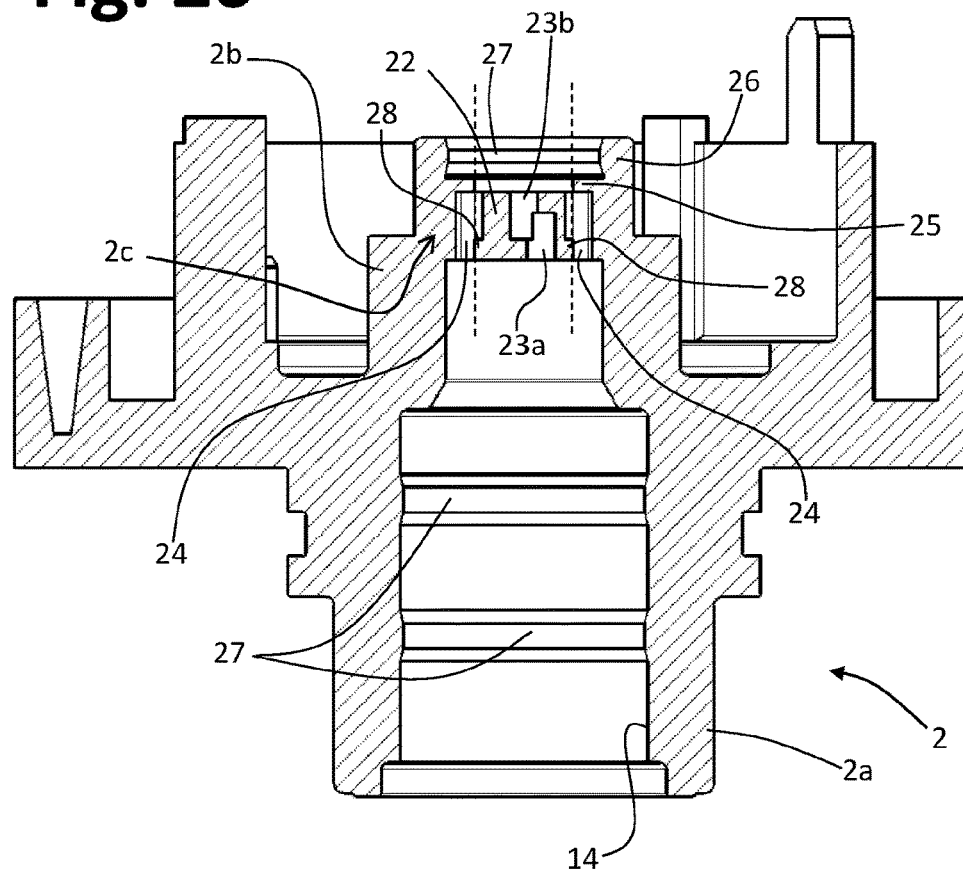
Figure 21:
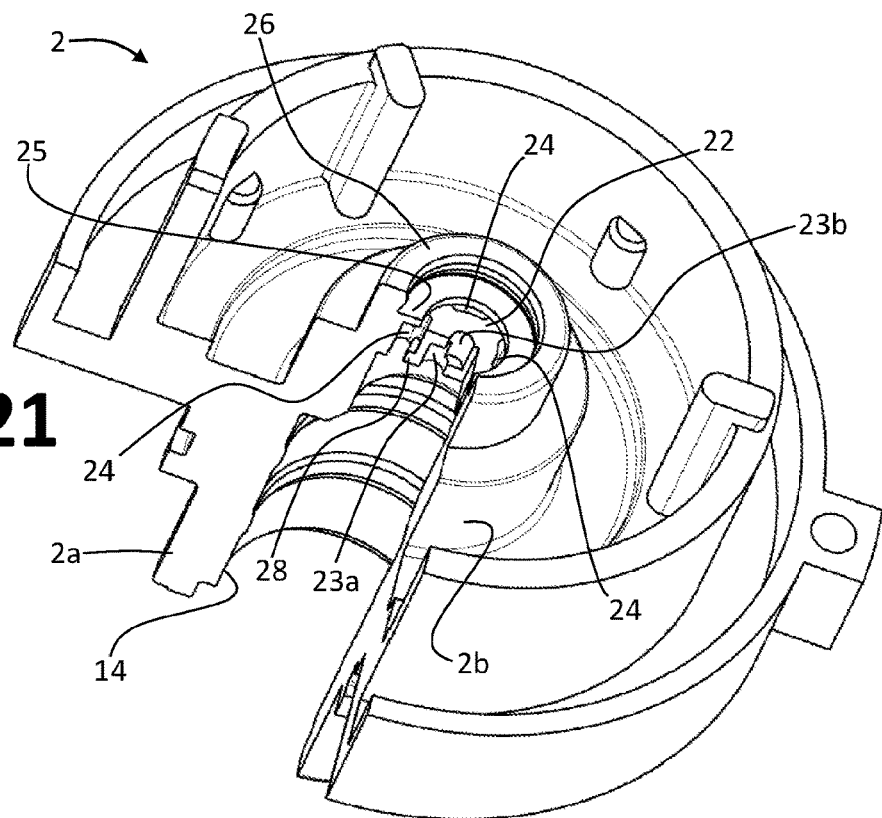
Figure 22:
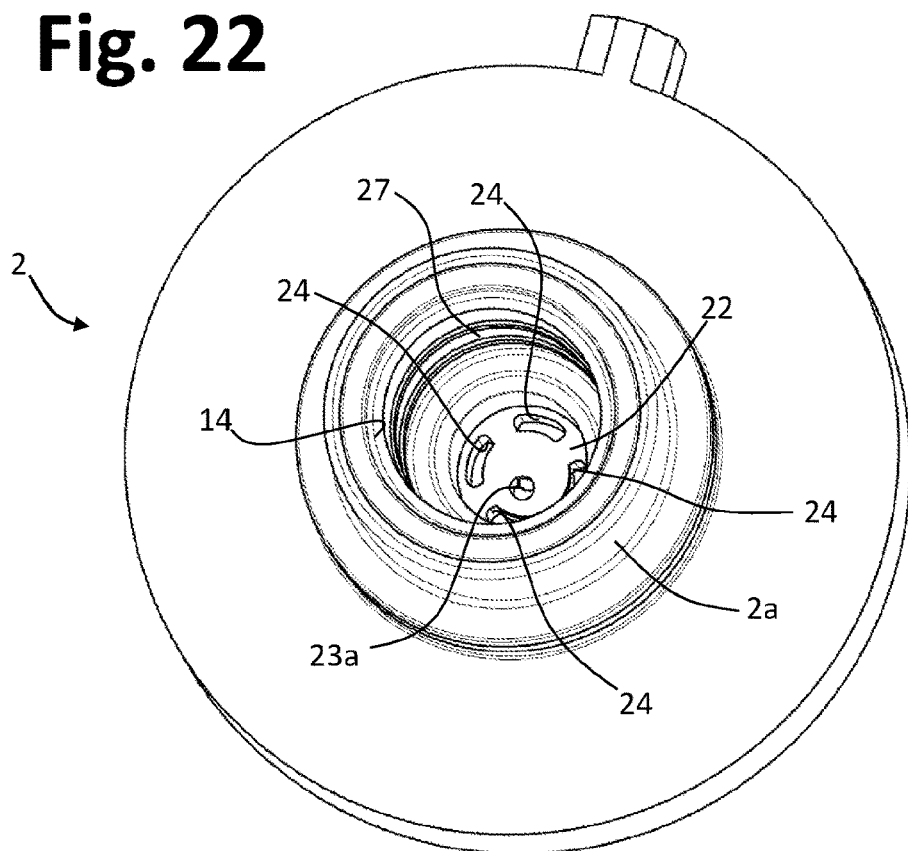
Figure 23:
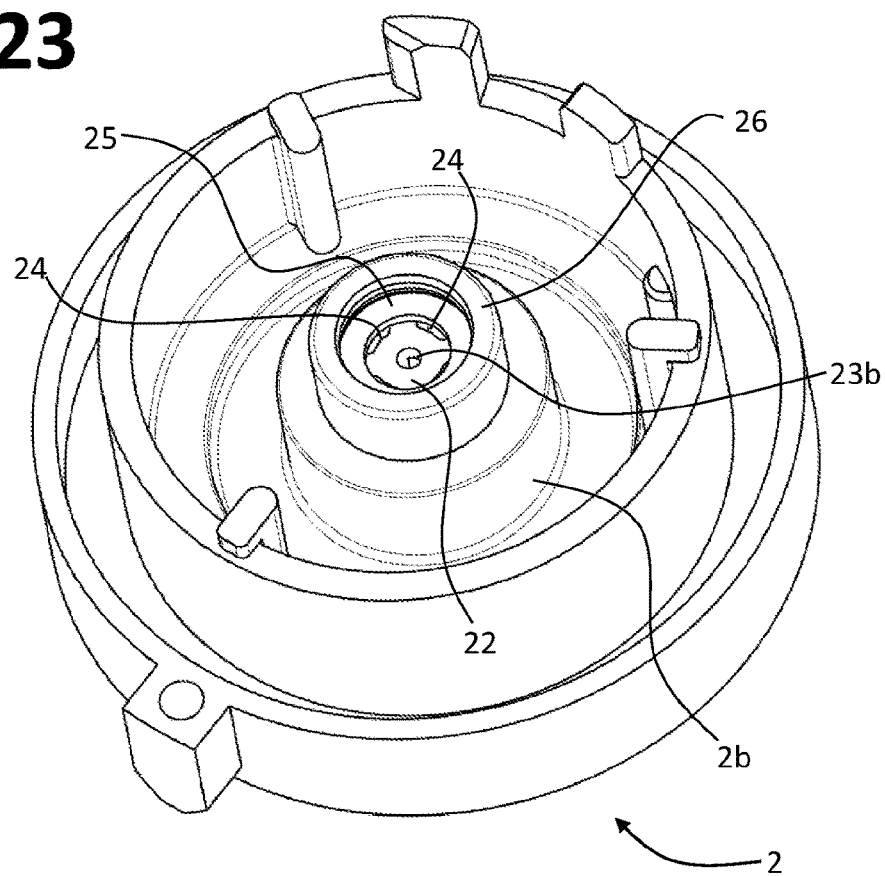

The characteristic in question may be appreciated in particular from FIGS. 20 and 21, where it may be noted how the transverse wall 22 is shaped so as to define—at the bottom end of a respective second passage 24—a respective step (or projection, or relief) designated by 28, projecting towards the inside of the second passage itself.

Advantageously, the extent (dimension) of projection of the steps 28 and the extent (dimension) of projection of the steps or reliefs determined by the projecting wall 25 are chosen so as to prevent the presence of undercuts, as intuitively highlighted by the dashed lines of FIG. 20. This simplifies considerably the production of the body 2 when this is made of a single piece of moulded plastic material, with evident advantages also in relation to simplification of the moulding equipment.

As may be seen in FIGS. 24-28, the presence of the steps 28 and of the projecting wall 25 enables in practice determination of the presence of two restrictions in section of the second passages 24, at their two ends, thereby bestowing upon the connection portions 16a of the compressible body 16 a substantially tortuous development, in particular comprising a number of stretches substantially staggered or angled with respect to one another.

Figure 24:
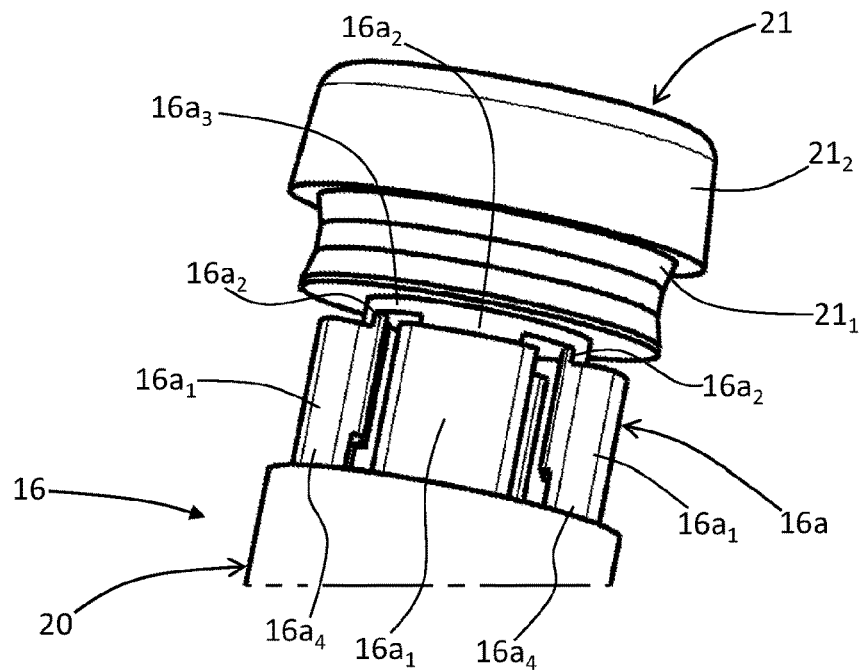
Figure 25:
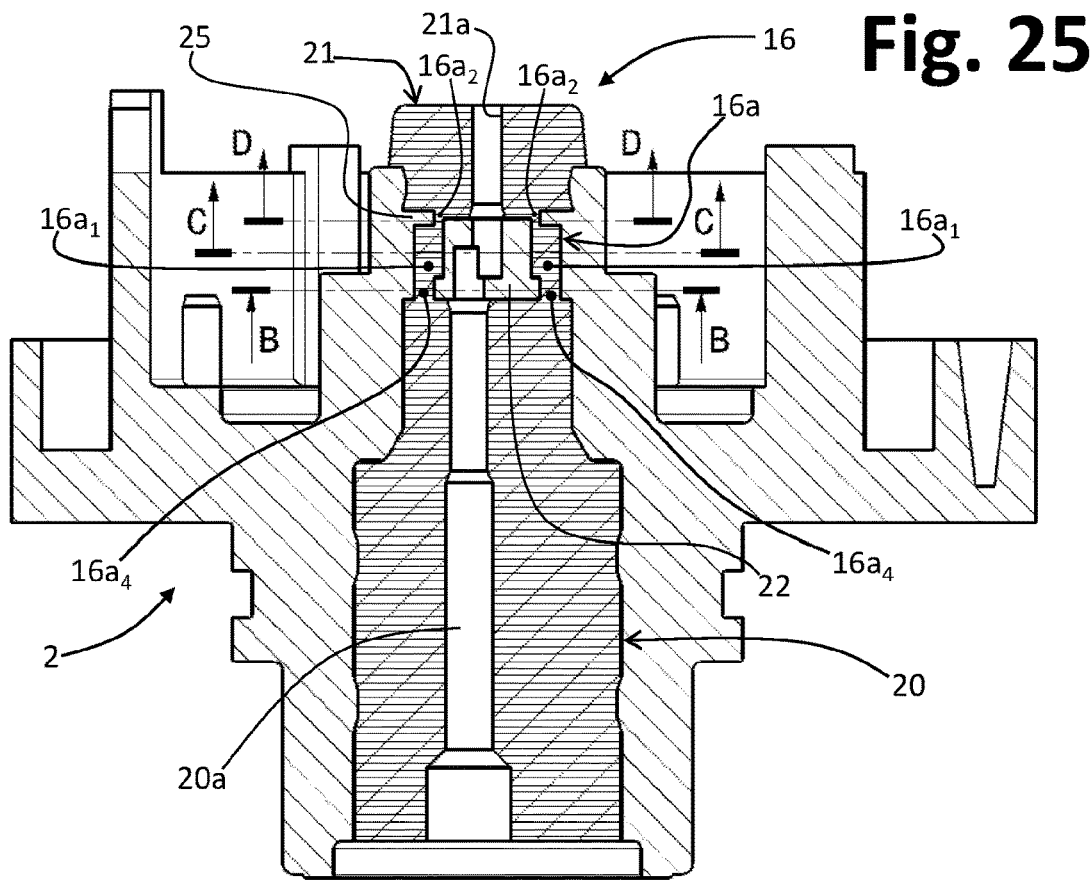
Figure 26:
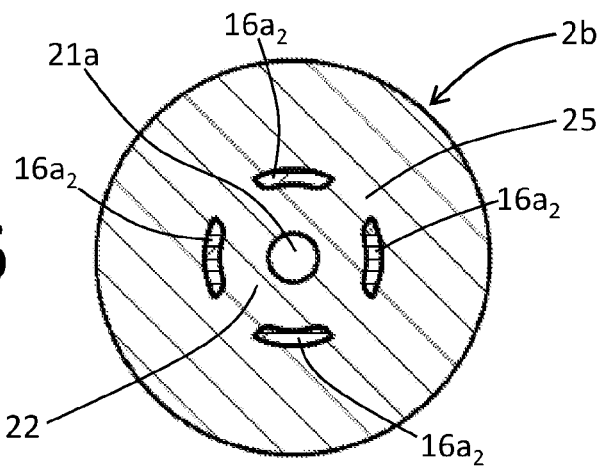
Figure 27:
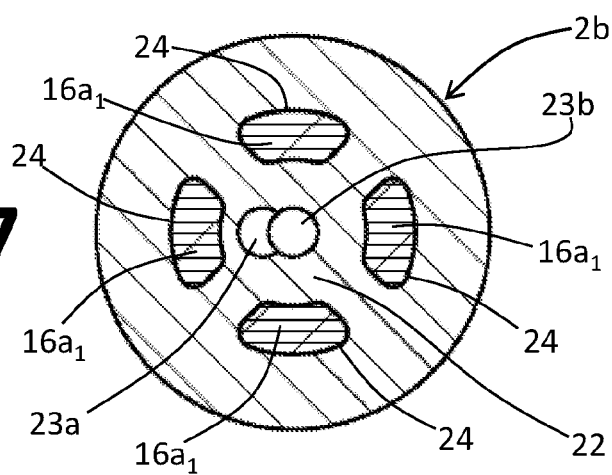
Figure 28:
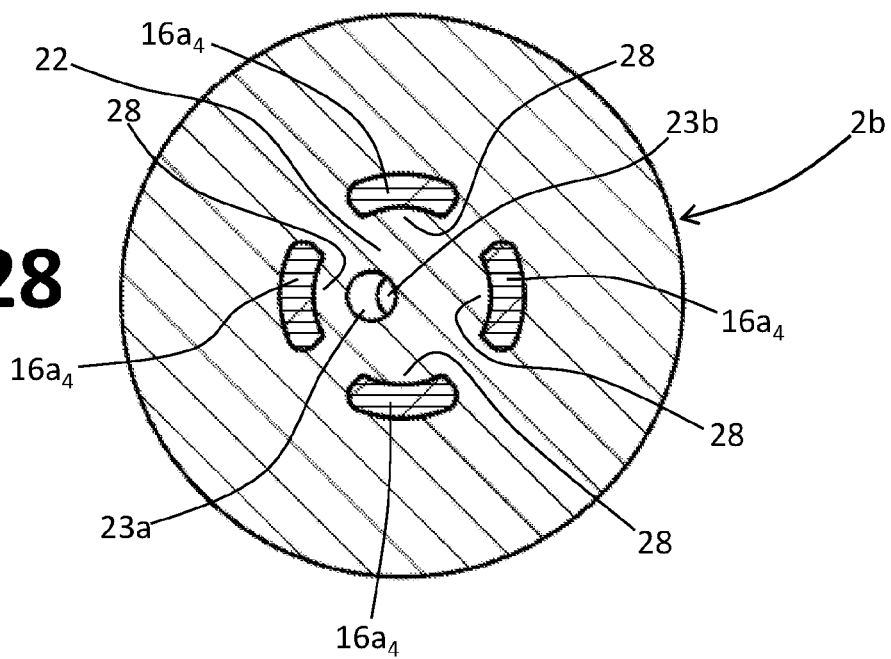
Figure 29:
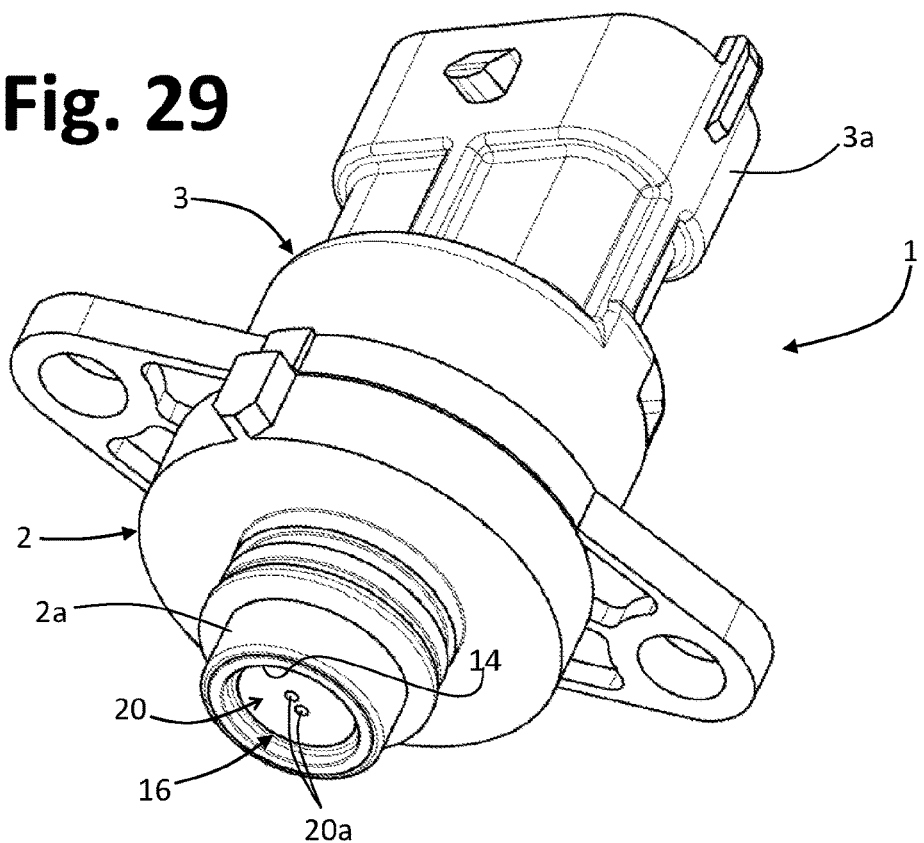
FIGS. 29-35 are views similar to those of FIGS. 1-6, regarding a further embodiment of the invention.
Figure 31:
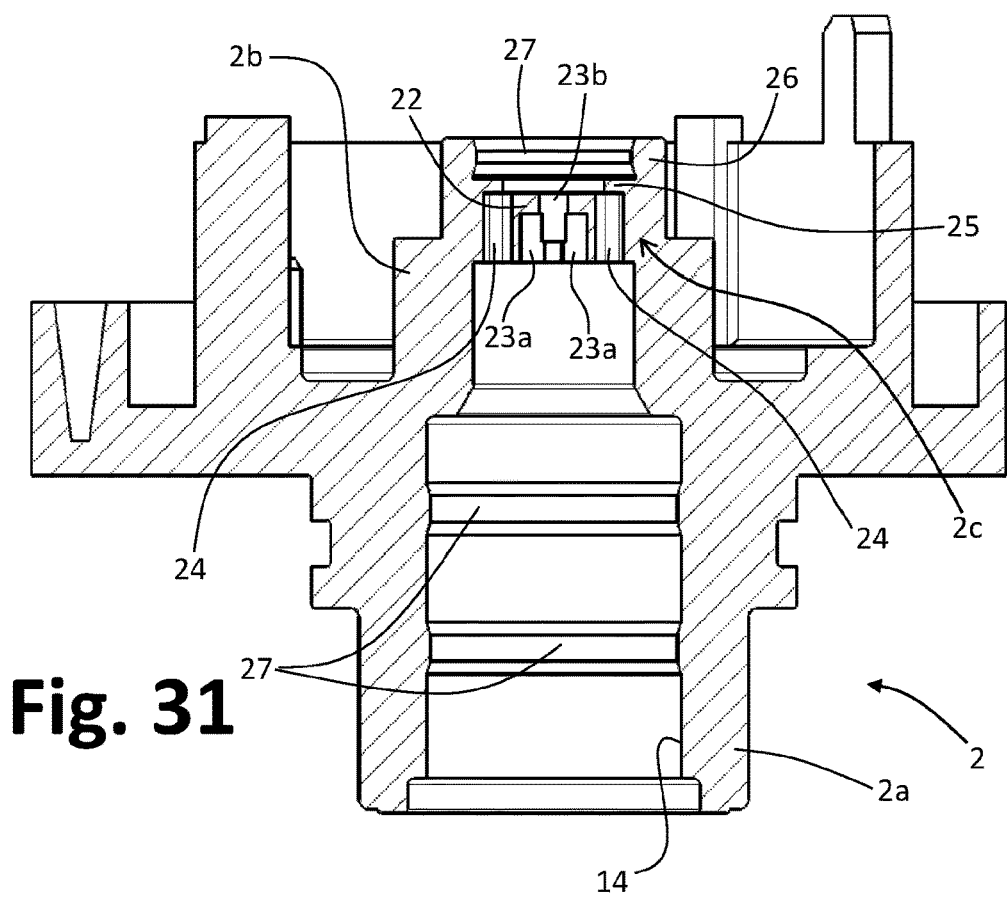

As may be appreciated in particular from FIGS. 24 and 25, the steps 28 enable definition of reduced sections $16a_4$ of each of the portions 16a also at their area of connection to the compressible element 20. The aforesaid reduced sections $16a_4$ preferably have dimensions larger than the reduced sections $16a_2$ determined by the projecting wall 25 (see FIGS. 26 and 28), but enable further reduction of the risks deriving from possible extrusion of the material constituting the compressible body 16.

Production and operation of the device 1 of FIGS. 19-28 are similar to what has already been described above.

FIGS. 29-35 illustrate, in views similar to those of FIGS. 1-6, a further embodiment of a device according to the invention. In this case, the first passage for the fluid that traverses the transverse wall 22 has two generally parallel inlets 23a, in fluid communication with one and the same outlet 23b, which is staggered with respect to the two inlets 23a.

Preferentially, the two inlets 23a are formed by two blind cavities (i.e., with a respective bottom), which are defined at the lower side of the wall 22, open downwards, and are substantially parallel to one another, preferably symmetrical with respect to the axis of the device and/or of the outlet 23b. The outlet 23b is formed by a blind cavity defined at the upper side of the wall 22, which opens upwards. The aforesaid three cavities are preferably substantially cylindrical or a section at least in part curved and, very preferably, their axes are substantially parallel to one another. Preferably, the sum of the sections of passage of the two inlet stretches 23a is equal or close to the section of the outlet stretch 23b.

The two inlets 23a are arranged so as to intersect the outlet 23b in a lateral direction in order to be in fluid communication therewith and thus define a substantially tortuous path for the fluid. Solutions of this type enable reduction of the risks deriving from the increase in volume of the fluid in an axial direction, in the case of freezing, as explained previously. In these embodiments, the staggered arrangement between the inlets and the outlet in any case determines the presence, in the duct portion 23a-23b of the through cavity 14, of two parallel axial stretches, determined by the intersections of each inlet with the outlet.

Advantageously, the cross-sectional dimensions of the aforesaid two axial stretches may each be smaller than the single axial stretch present in the case of the embodiments described previously, in particular in order to have a smaller volume and hence a smaller expansion and/or a lower thrust by the icy fluid in the direction of the membrane, thereby increasing the function of protection in regard to the membrane of the sensitive element.

Figure 30:
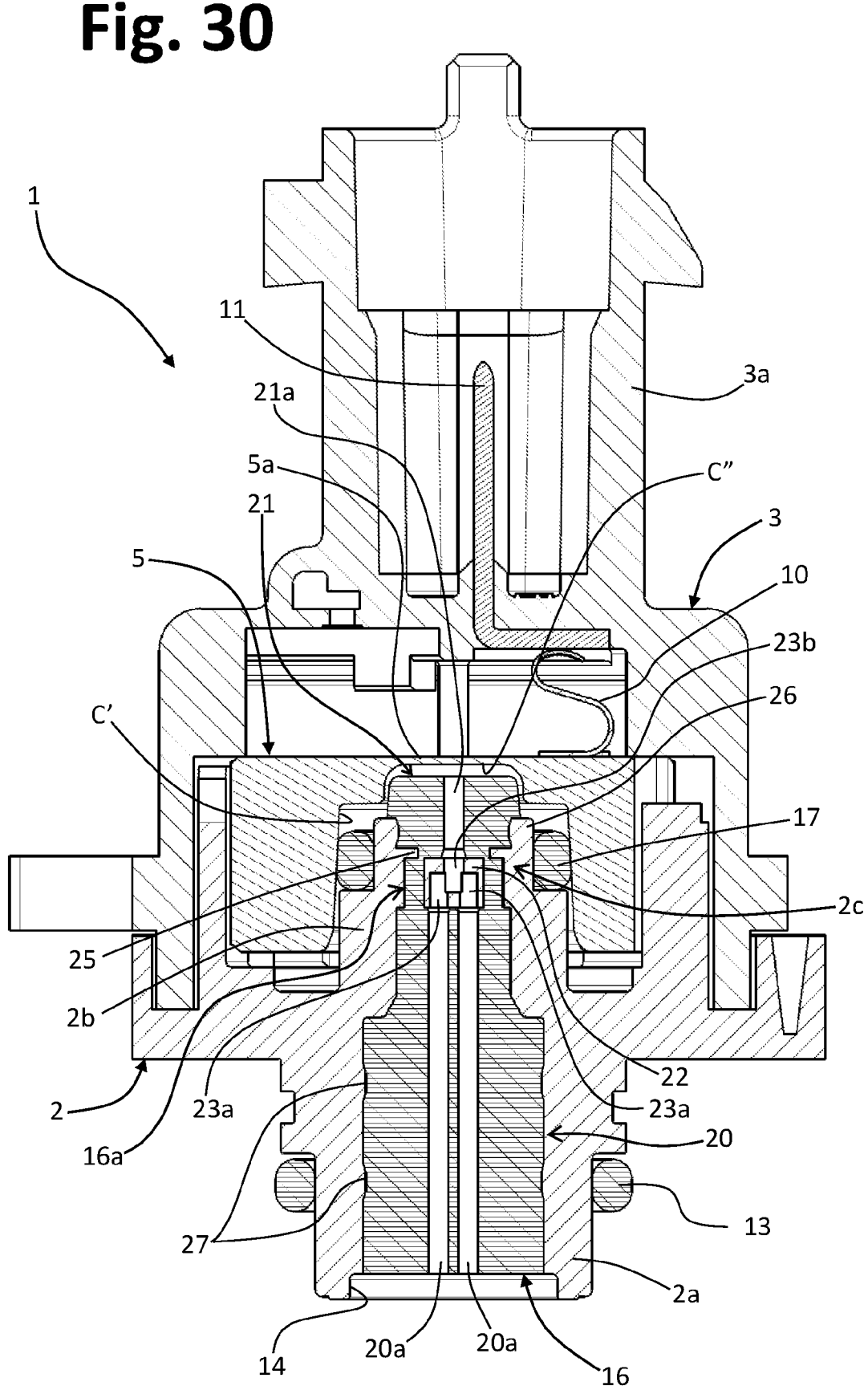
Figure 32:
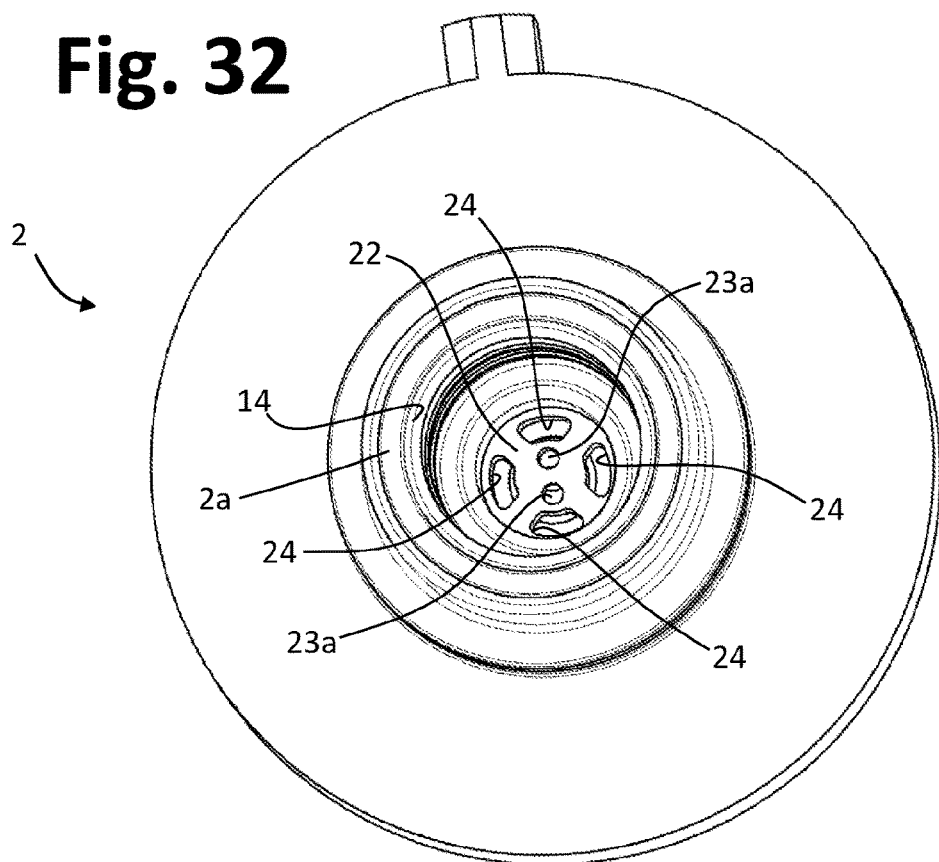
Figure 33:
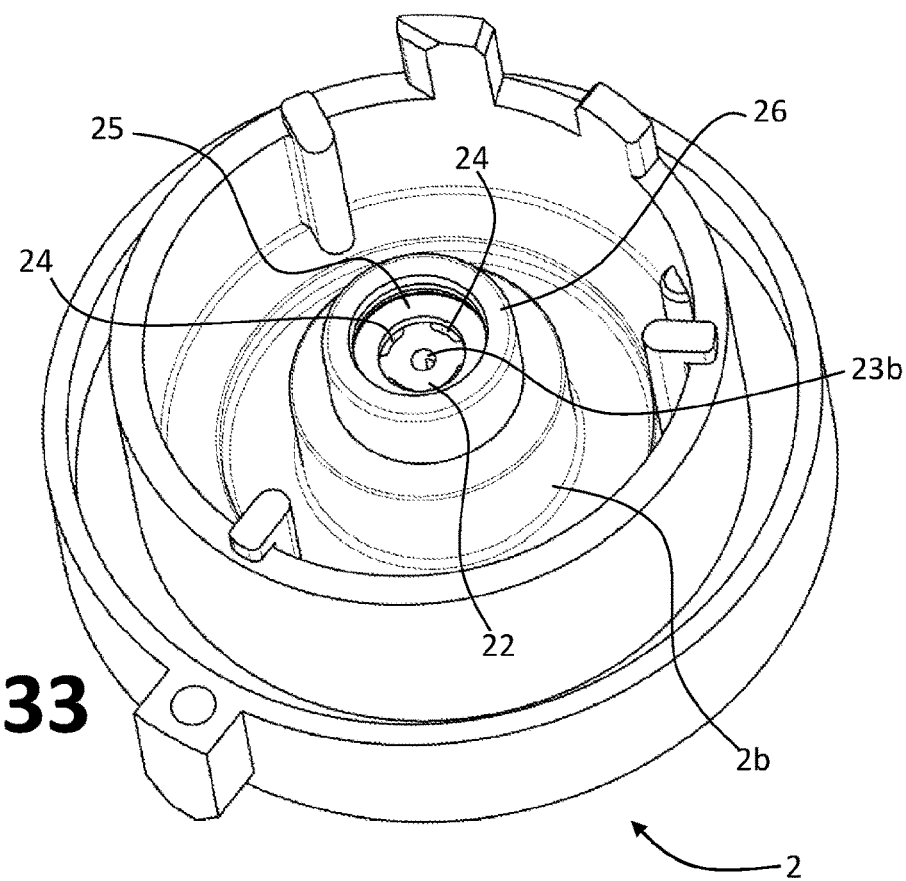
Figure 34:
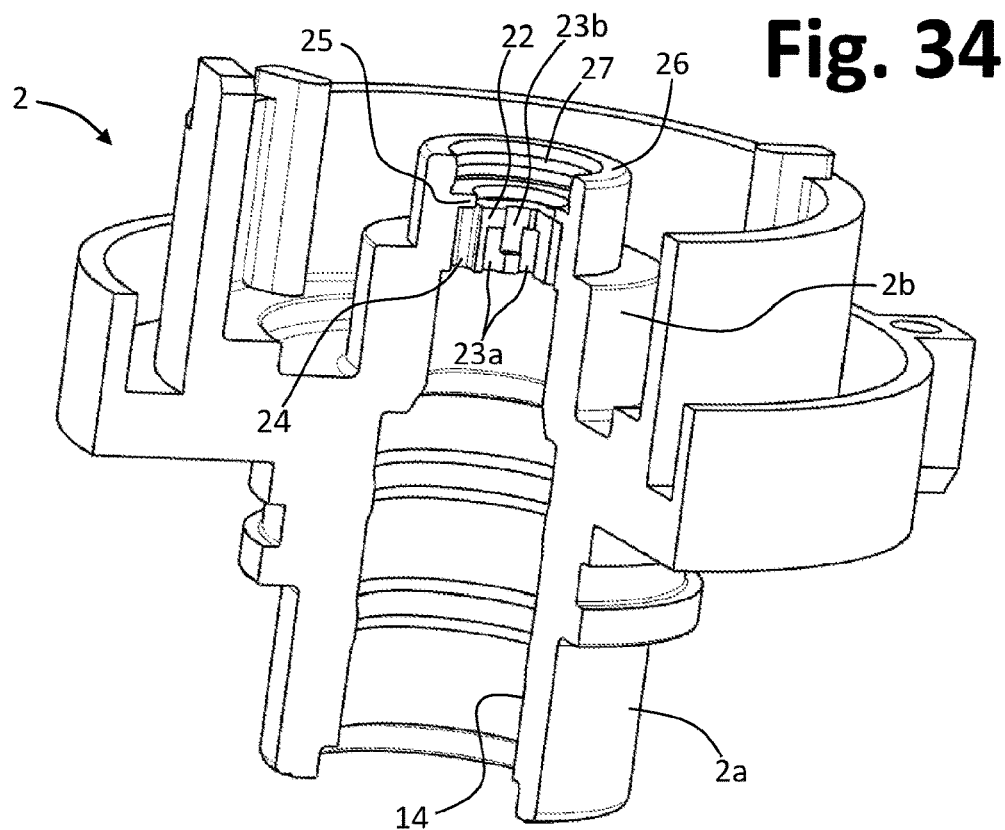
Figure 35:
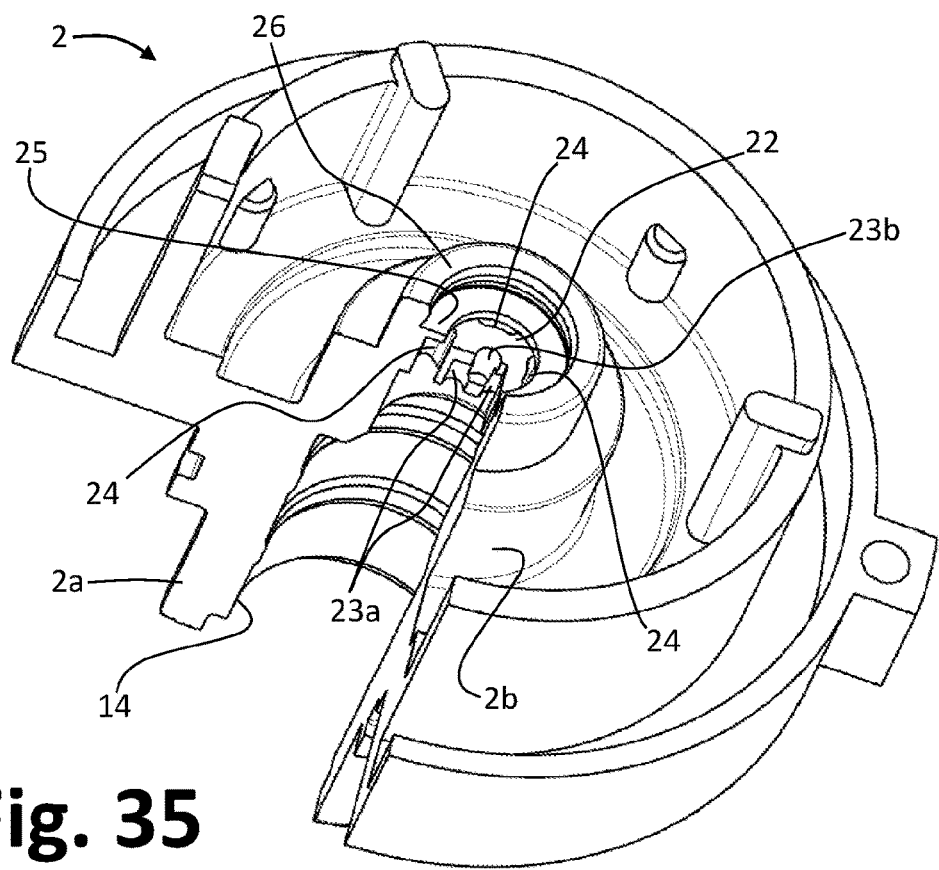
Figure 36:
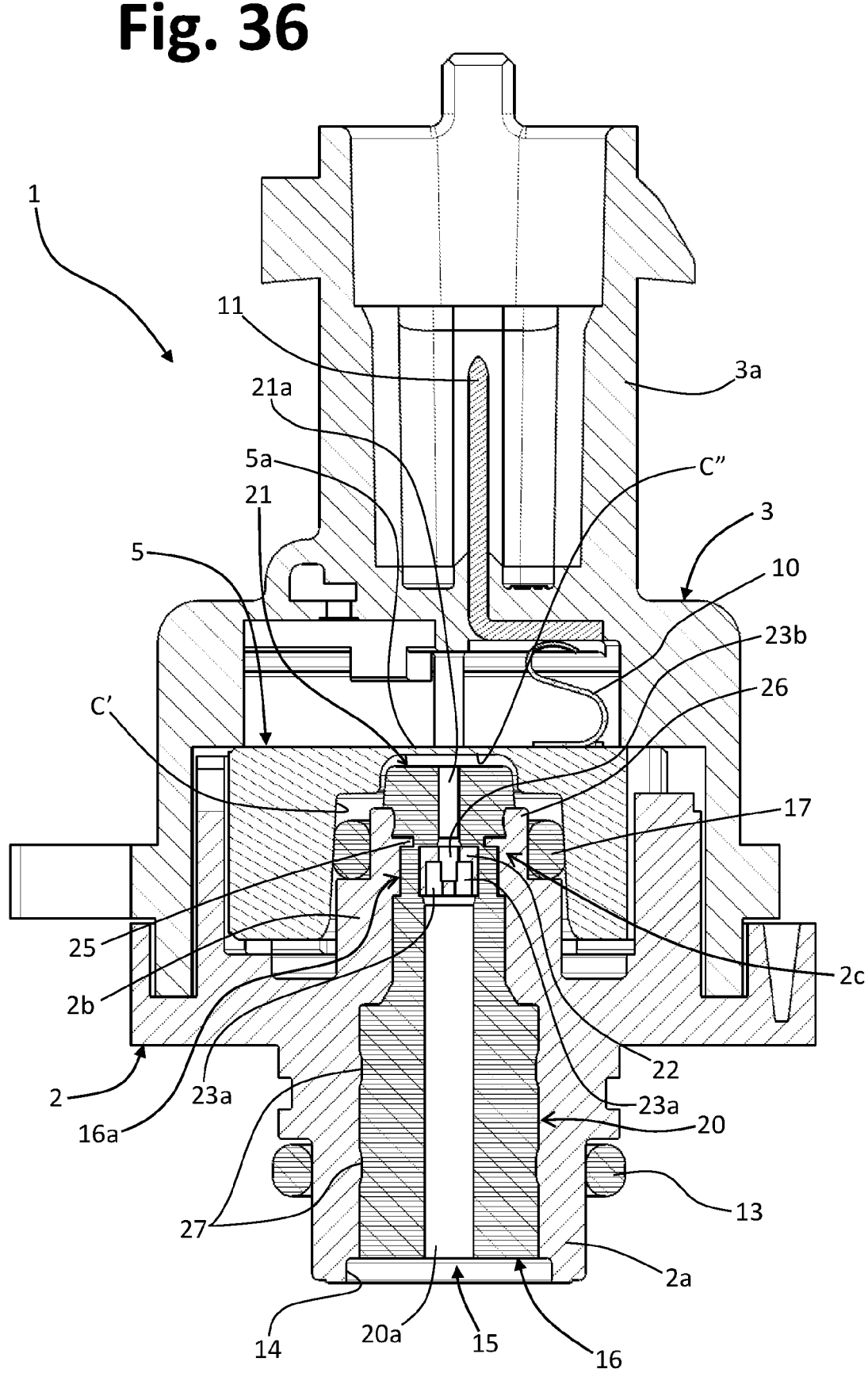
FIG. 36 is a view similar to that of FIG. 30, regarding a further embodiment of the invention.

In embodiments of this type, the internal compressible element 20 may be shaped so as to present two mutually parallel through ducts 20a, as represented in FIG. 30, the outlet ends of which are in fluid communication with the two inlets 23a. On the other hand, the external compressible element 21 may have a structure similar to those described previously, and hence with the inlet end of the corresponding through duct 21a in fluid communication with the outlet 23b. Of course, instead of two axial ducts 20a, the internal compressible element 20 may be provided with a single axial duct 20a, having increased cross-sectional dimensions, or in any case dimensions such that both of the inlets 23a of the transverse wall 22 face its outlet end. Such a case is exemplified in FIG. 36, where, albeit in the presence of a larger section of the duct 20a, the possible thrust due to the icy fluid is countered by the lower part without passages of the transverse wall 22, which opposes expansion and thrust in the direction of the membrane of the icy fluid in the duct 20a.

Preferably, the sum of the cross-sectional dimensions of the aforesaid axial stretches is equal to or greater than the size of the single axial stretch present in the case of the embodiments described previously. Preferably, moreover, the sum of the sections of passage of the two inlets 23a and/or of the corresponding ducts 20a is equal to or greater than the cross section of the outlet 23b and/or of the corresponding duct 21a.

For the rest, production and operation of the devices 1 of FIGS. 29-35 and 36, respectively, are similar to the ones already described above.

FIGS. 37-41 illustrate, in views similar to those of FIGS. 2-6, a further embodiment of a device according to the invention. In this case, the first passage for the fluid that traverses the transverse wall 22 has two generally parallel outlets 23b, in fluid communication with one and the same inlet 23a, which is staggered with respect to the two outlets 23b.

Preferentially, the two outlets 23b are formed by two blind cavities, which are defined at the upper side of the wall 22, open upwards, and are substantially parallel to one another. The inlet 23a is formed by a blind cavity defined at the lower side of the wall 22, which opens downwards. Also in this case, the aforesaid three cavities are preferably substantially cylindrical or at least in part curved and, very preferably, their axes are substantially parallel to one another.

The two outlets 23b are arranged so as to intersect in a lateral direction the inlet 23a in order to be in fluid communication therewith and define the substantially tortuous path for the fluid. Solutions of this type afford substantially the same advantages described with reference to the embodiments of FIGS. 29-35.

Figure 37:
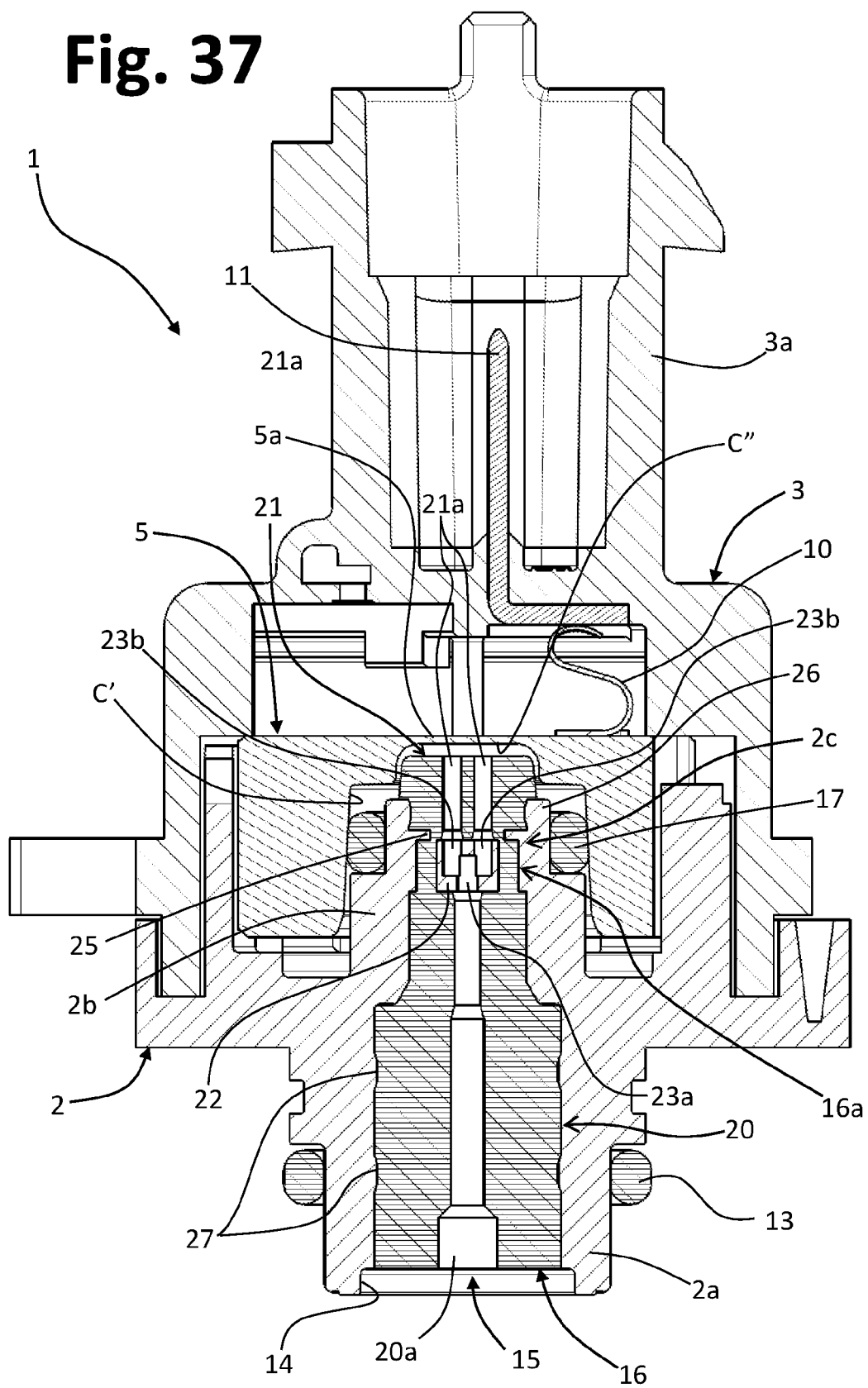
FIGS. 37-41 are views similar to those of FIGS. 2, 3, 6, 4, and 5, respectively, regarding a further embodiment of the invention.
Figure 38:
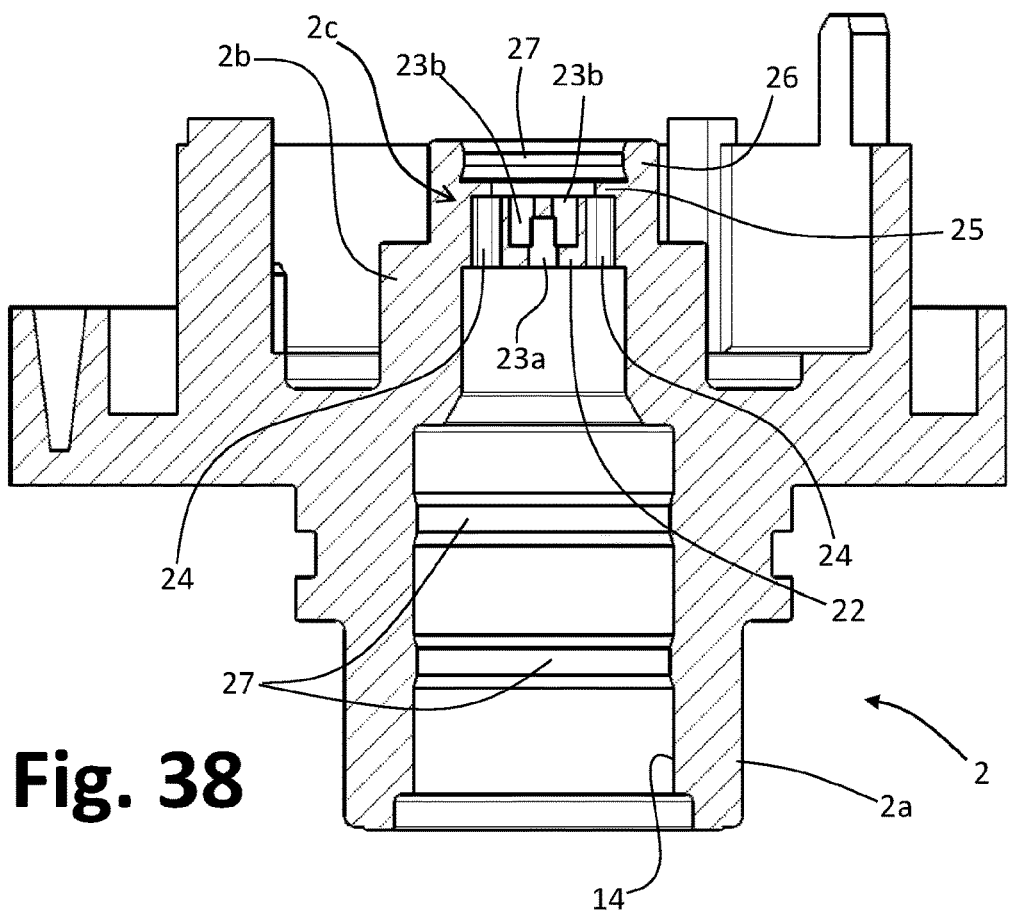
Figure 39:
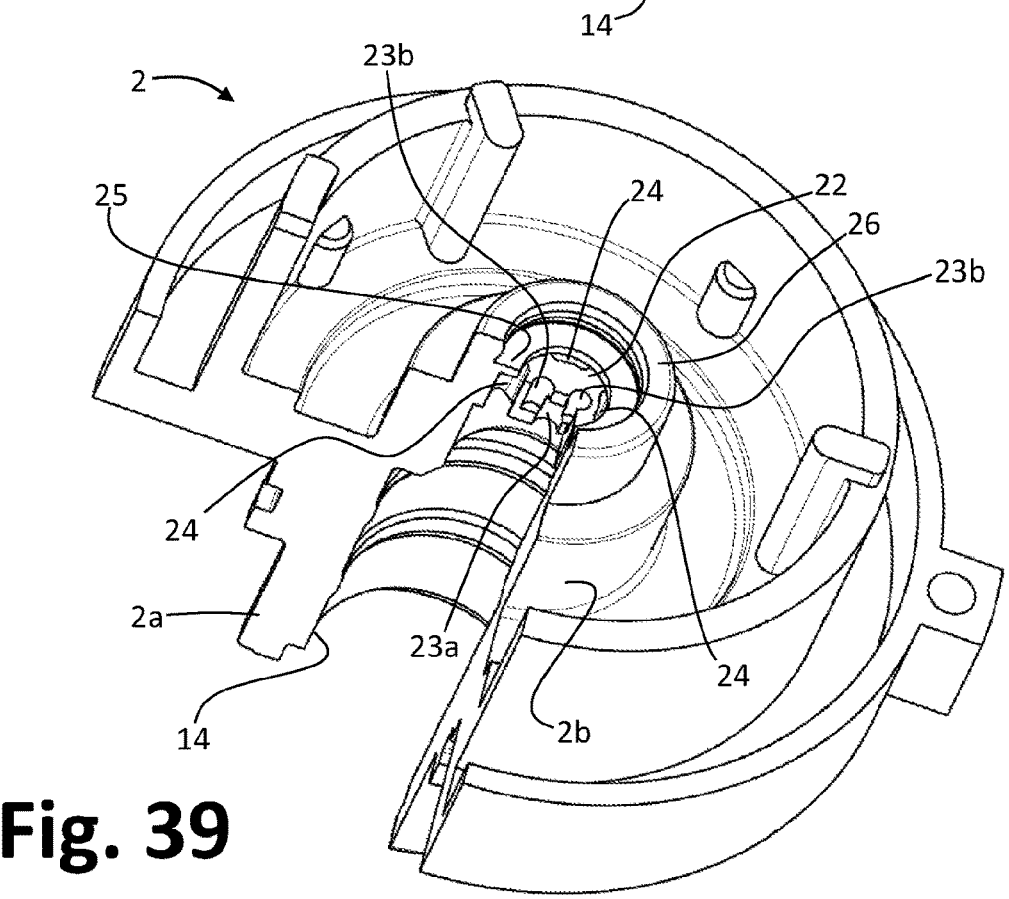
Figure 40:
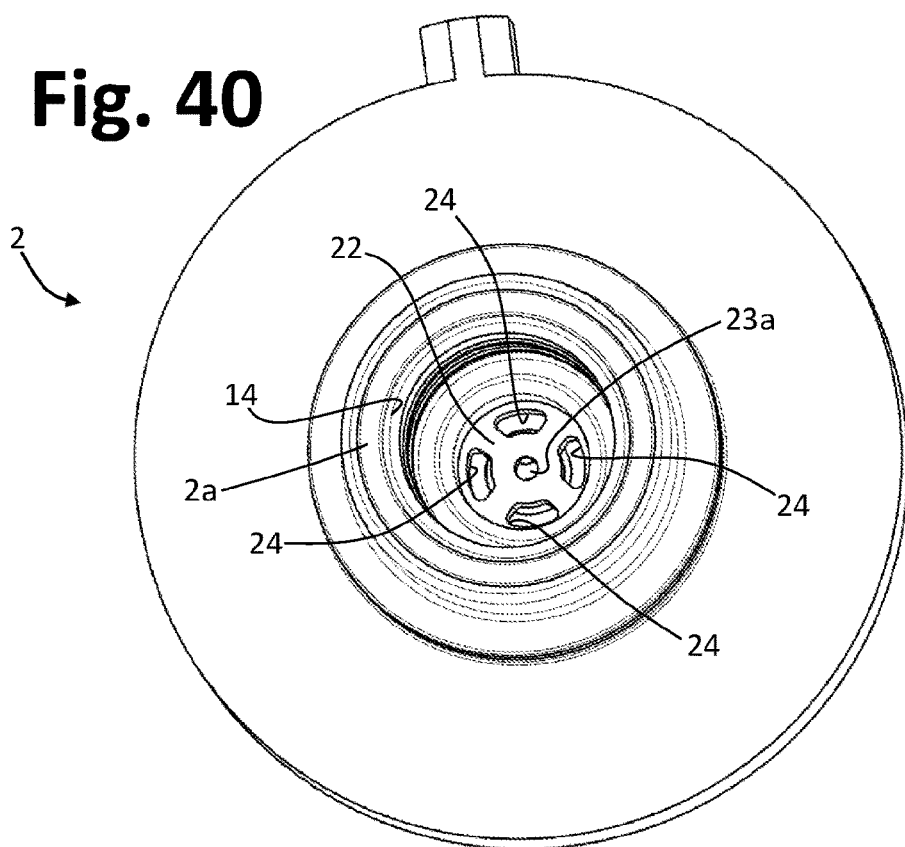
Figure 41:
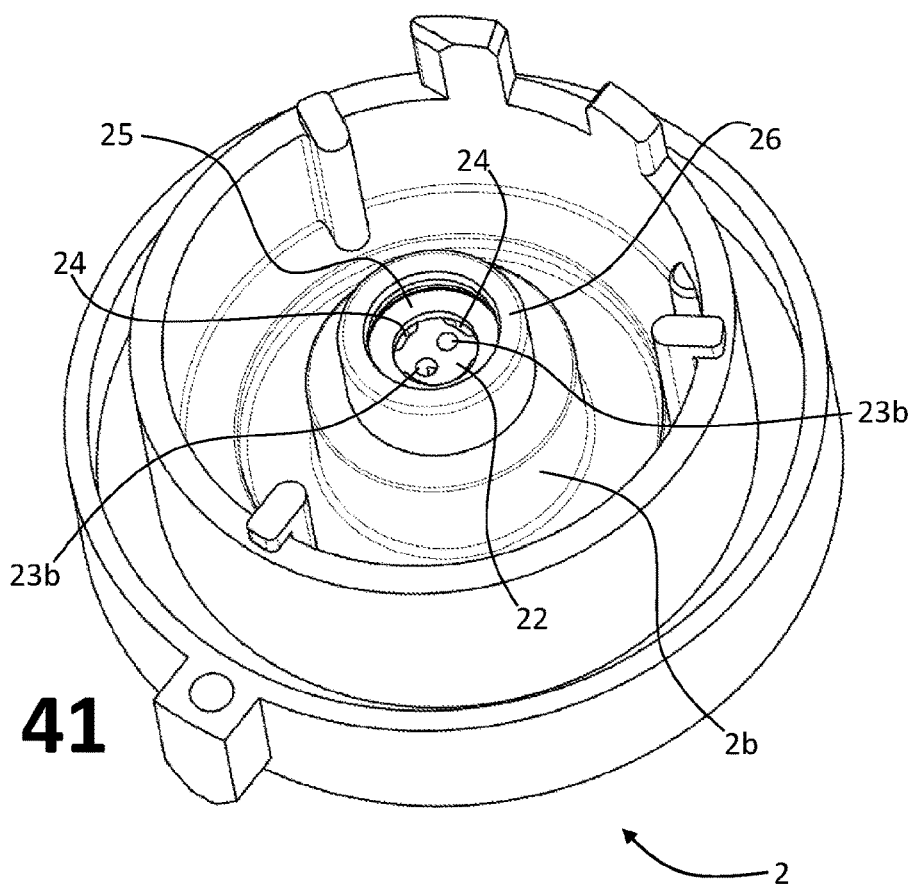
Figure 42:
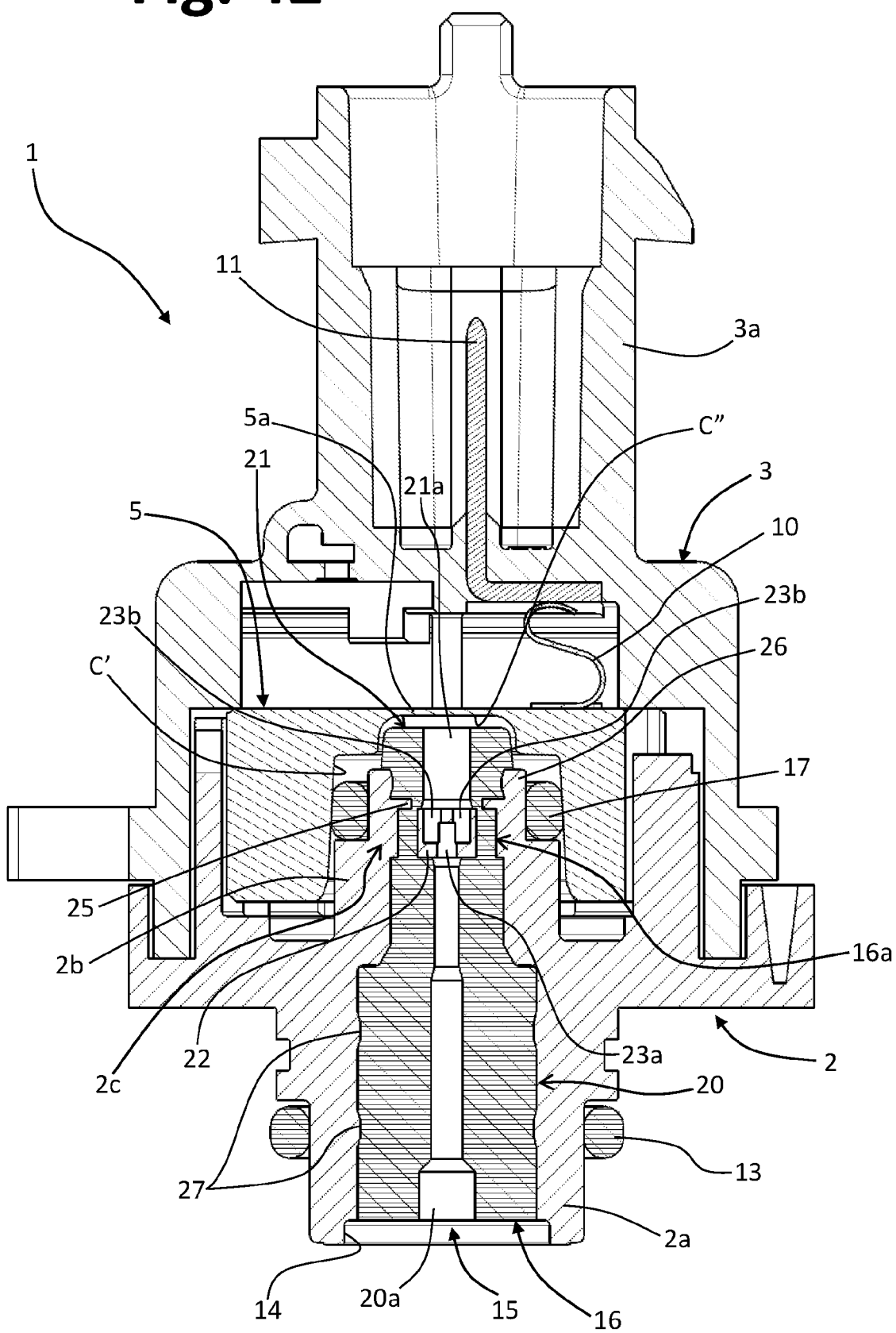
FIG. 42 is a view similar to that of FIG. 37, regarding a further embodiment of the invention.
Figure 43:
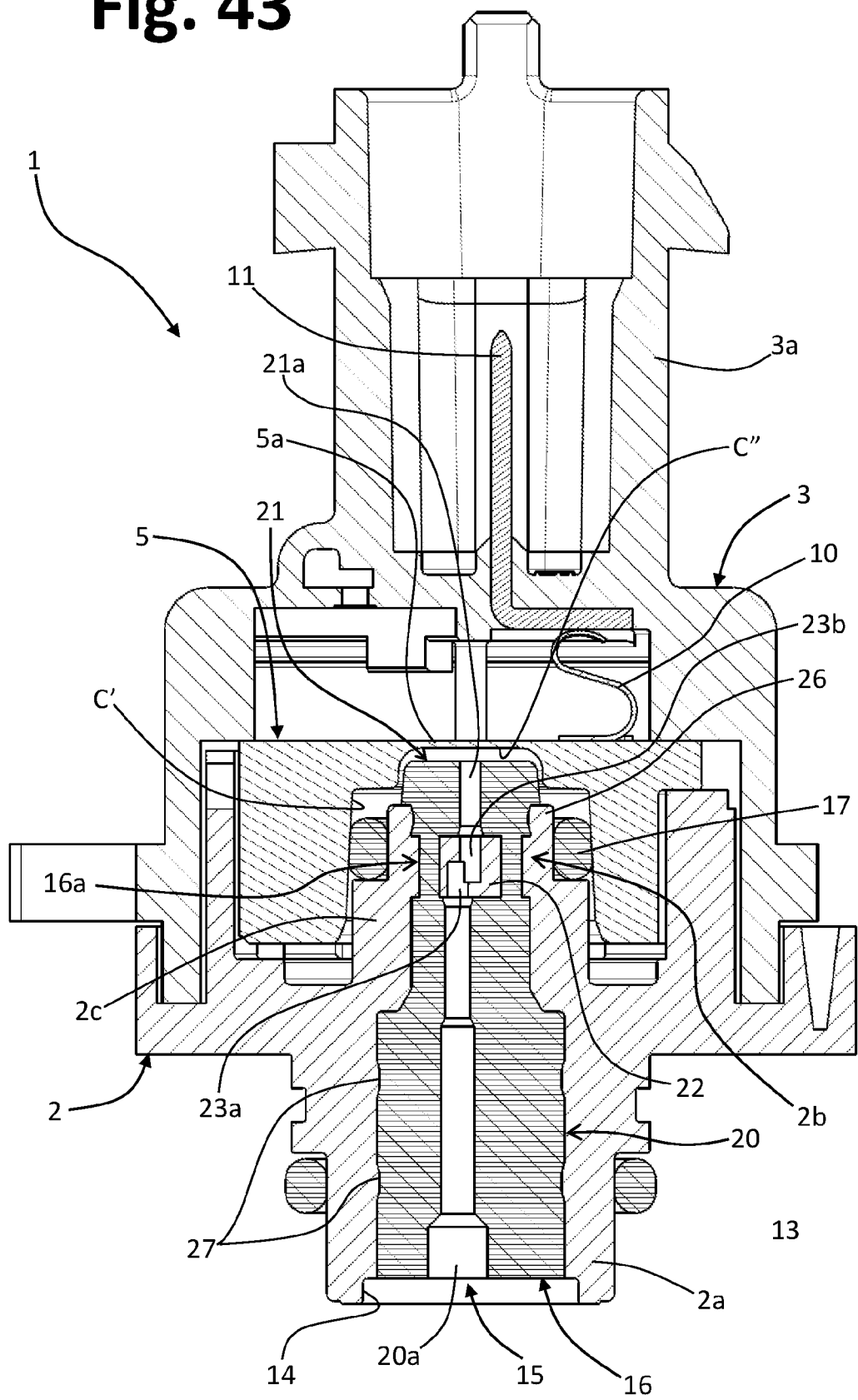

In embodiments of this type, the external compressible element 21 may be shaped so as to present two mutually parallel through ducts 21a, as represented in FIG. 37, the inlet ends of which are in fluid communication with the two outlets 23b. On the other side, the internal compressible element 20 may have a structure similar to those described previously, and hence with the outlet end of the corresponding through duct 20a in fluid communication with the inlet 23a. Of course, instead of two axial ducts 21a, the external compressible element 21 may be provided with a single axial duct 21a, having increased cross-sectional dimensions, or in any case dimensions such that both of the outlets 23b of the transverse wall 22 face its inlet end. Such a case is exemplified in FIG. 42, where preferably the section and/or height of the axial duct 21a is predefined so as to limit linear expansion of the icy fluid and prevent of damage to the membrane.

For the rest, production and operation of the devices 1 of FIGS. 37-41 and 42, respectively, are similar to what has already been described above.

It will be appreciated, with reference to the embodiments of FIGS. 29-35 and 37-41, that the first passage for the fluid that traverses the transverse wall 22 could have more than two inlets 23a in fluid communication with at least one outlet 23a (in which case also the element 20 could have a number of ducts corresponding to the number of inlets 23a) or else more than two outlets 23b in fluid communication with at least one inlet 23a (in which case also the element 21 could have a number of ducts corresponding to the number of inlets 23a).

FIGS. 43-54 illustrate, in views similar to those of FIGS. 2, 3, 6, 4, 5, 8, 9 and 10-13, a further embodiment of a device according to the invention.

In this case, the first portion 2c of the body 2 is without a projecting annular wall (of the type previously designated by 25) but the second passages of the transverse wall 22, which are to receive through them the connection portions 16a of the compressible body 16, are in any case shaped so as to define a tortuous path.

In embodiments of this type, the second passages may advantageously be obtained using the same technique employed for providing the inlet 23a and the outlet 23b of the transverse wall 22, for example as described with reference to FIGS. 1-7.

Figure 44:
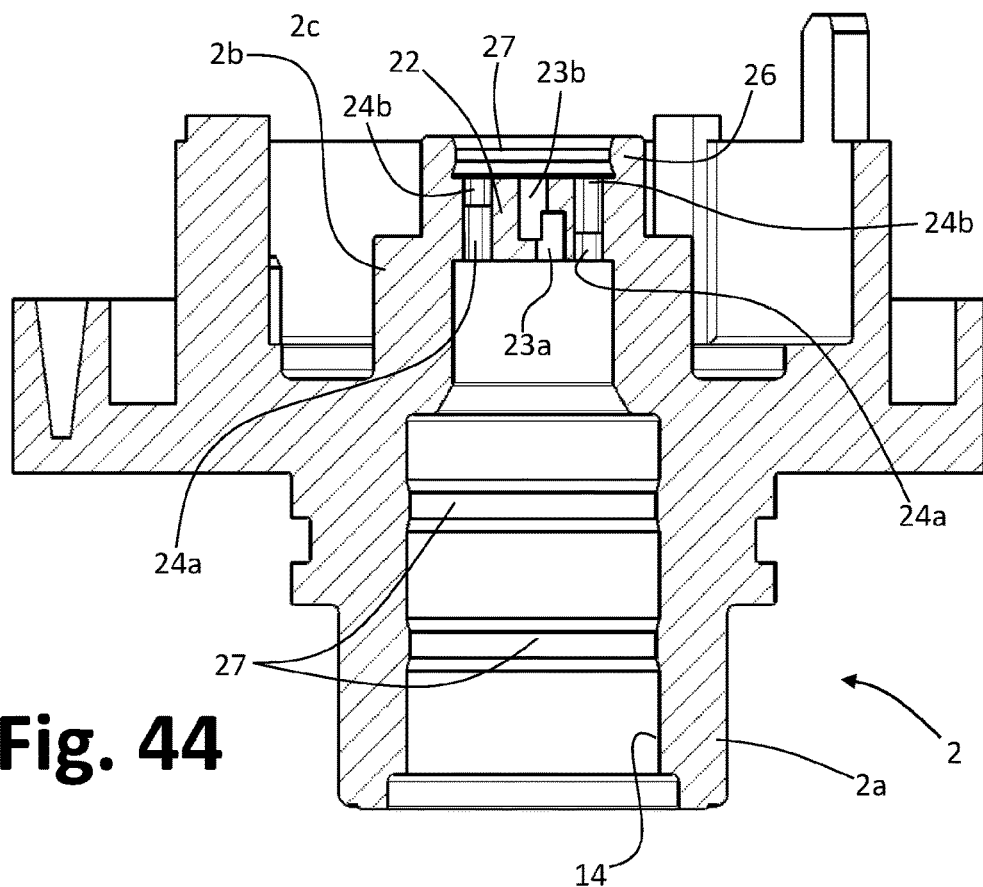
Figure 45:
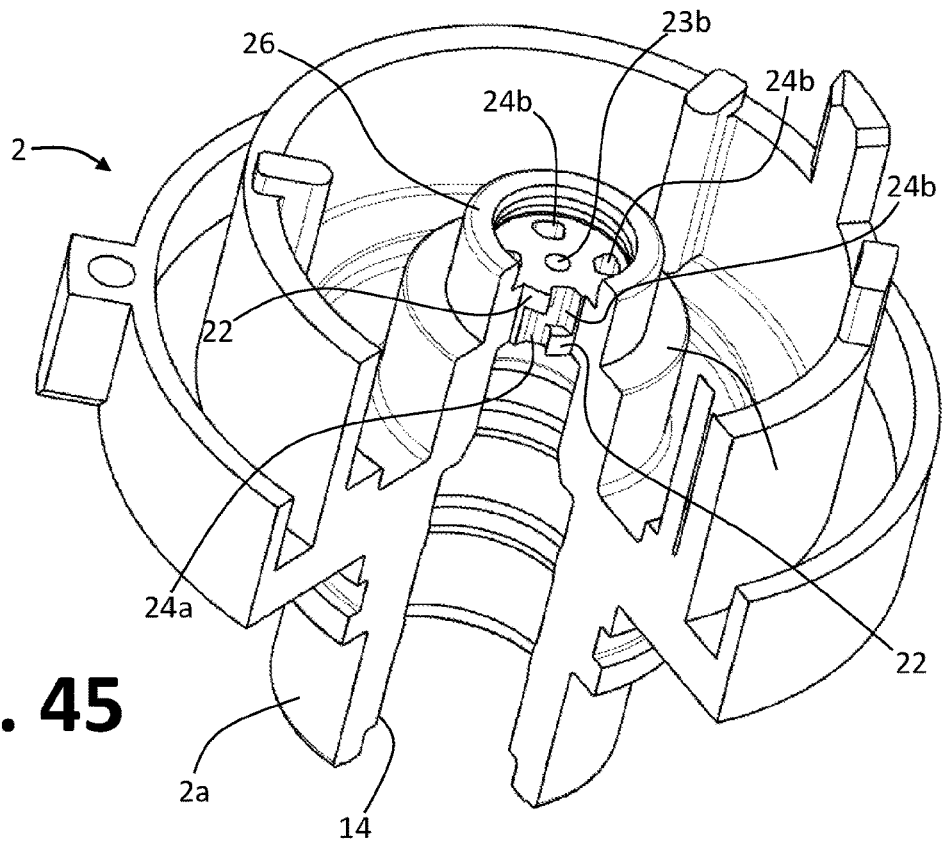
Figure 46:
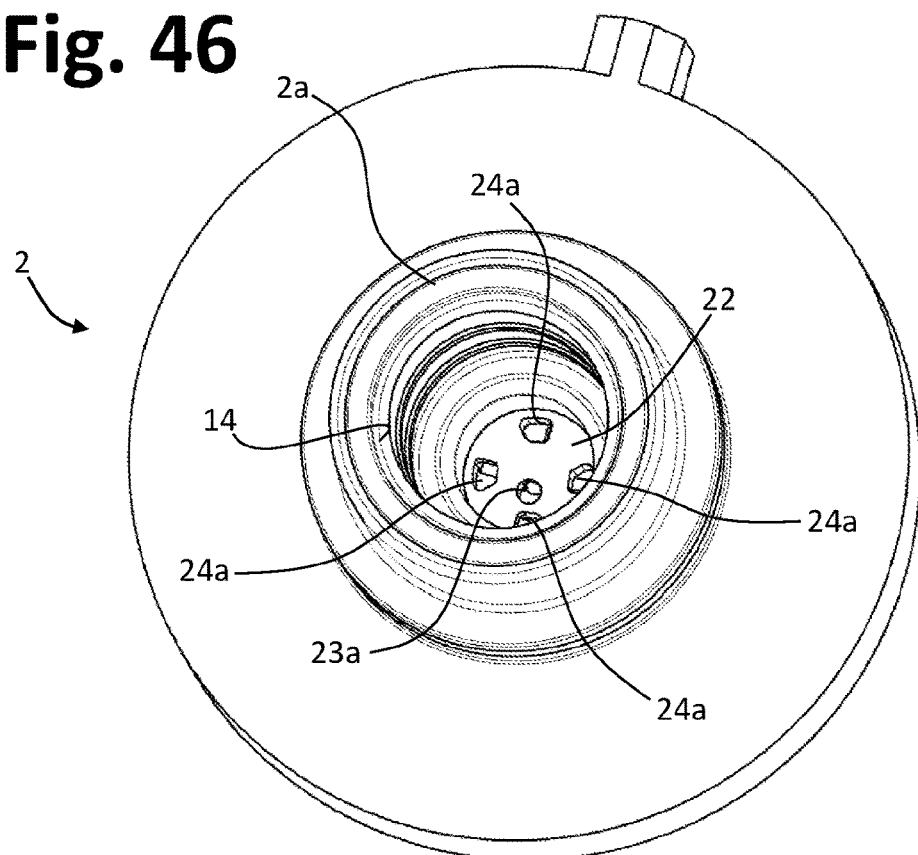
Figure 47:
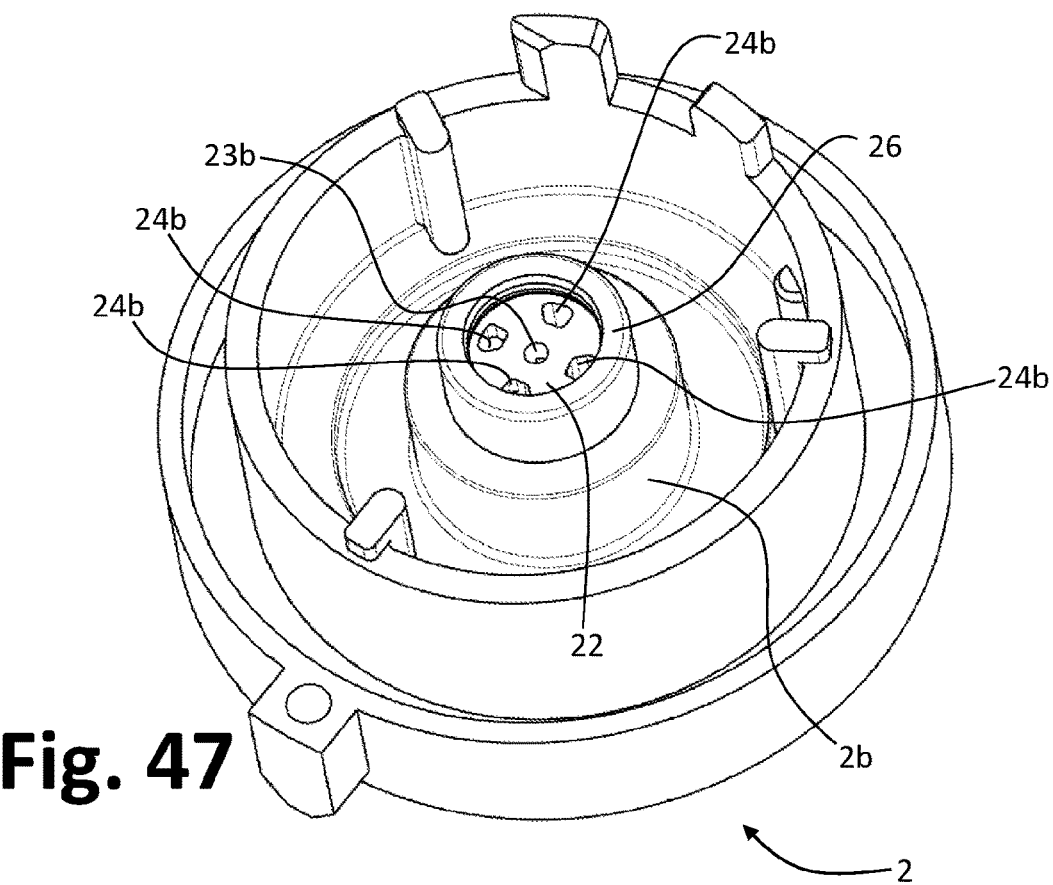
Figure 51:
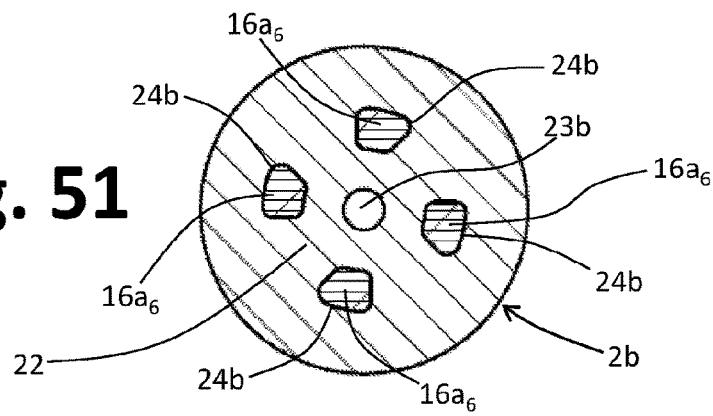
FIGS. 51-54 are cross-sectional views according to the lines E-E, D-D, C-C, and B-B of FIG. 50, respectively.
Figure 52:
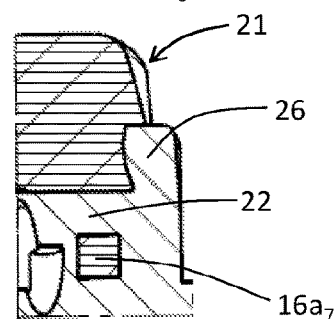
Figure 53:
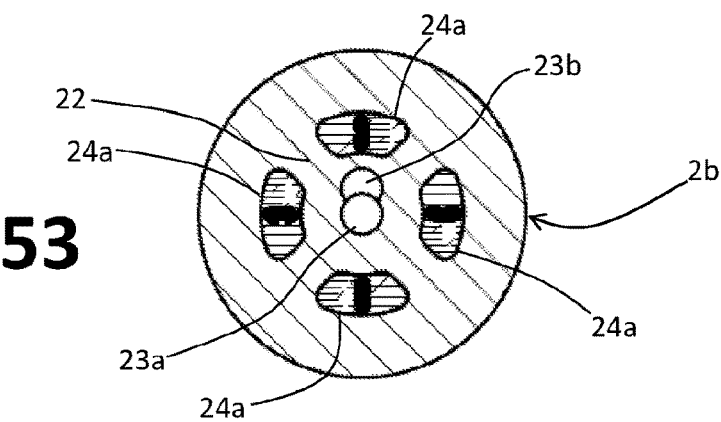
Figure 54:
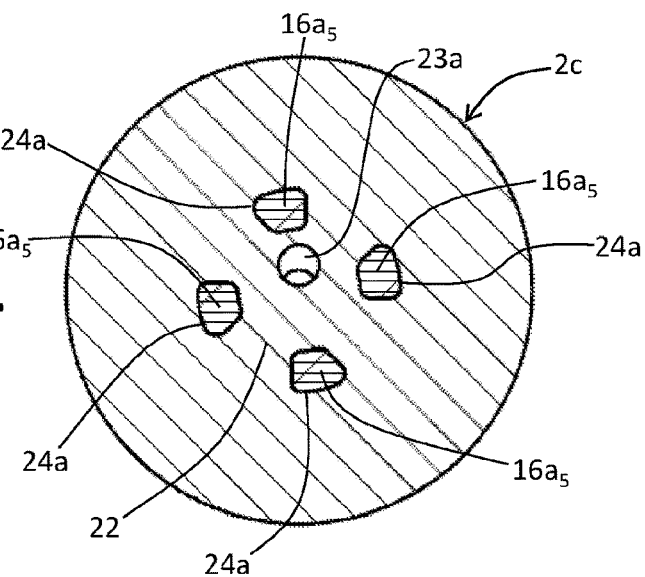

In various embodiments, and as may be appreciated in particular from FIGS. 44 and 45, each second passage includes two blind cavities 24a and 24b (i.e., with respective bottom) staggered with respect to one another, with the respective axes that are preferably substantially parallel to one another. The two cavities 24a and 24b are defined at opposite sides of the transverse wall 22, and hence open downwards and upwards, respectively. The aforesaid blind cavities, which are not necessarily cylindrical, are arranged so as to intersect in a lateral direction in order to be connected directly together. As may be appreciated, also this embodiment proves advantageous when the supporting body 2 is made of a single piece of moulded plastic material, given the absence of undercuts or recesses.

The second passages 24a-24b thus obtained determine a development of the corresponding connection portion 16a of the body 16 that comprises a tortuous path or a number of stretches angled with respect to one another.

This characteristic may be particularly appreciated from FIGS. 48-50, where it may be noted how the connection portions 16a basically include two axial stretches $16a_5$ and $16a_6$ that are substantially parallel, but joined together in an intermediate area $16a_7$ (it may be noted how in FIGS. 48-50 the corresponding planes of section are staggered with respect to the axes of the body 16 and of the body 2). The structure of the passages 24a-24b and of the corresponding intermediate portions of the body 16 may be appreciated also in the sections presented in FIGS. 51-54.

As has been said, in various embodiments, the cavities provided with a bottom that constitute the at least one inlet 23a and the at least one outlet 23b of the transverse wall 22 are staggered with respect to one another, but intersect laterally, thereby defining prevalently lateral communication passages, which enable passage of the fluid that is being measured between the two cavities in question. Preferentially, the aforesaid lateral passages have cross-sectional dimensions close to or larger than the cross-sectional dimensions of each of the staggered cavities, in particular in order to guarantee an appropriate lateral section of passage for the fluid, such as a section that will not cause any choking in regard to the sections of passage of the staggered cavities and/or in regard to the entire path. Similar considerations apply to the passages that are to house the material of the connection portions 16a, in particular when also these passages are defined by staggered cavities of the type designated by 24a and 24b.

As may be evinced, also embodiments of this type enable a considerable reduction of the aforesaid risks deriving from possible extrusions or displacements of the material constituting the compressible body 16.

Figure 55:
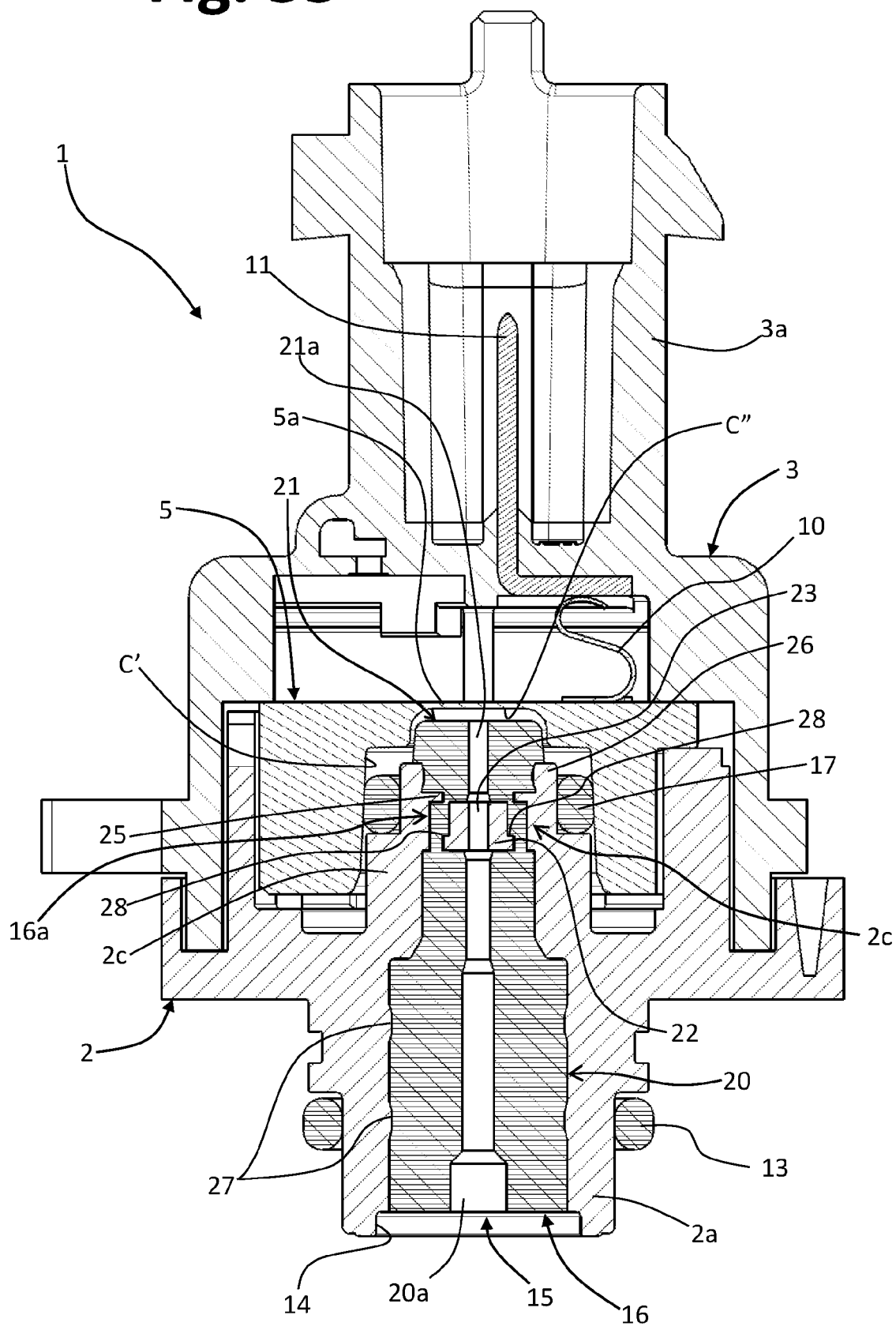
FIGS. 55-58 are views similar to those of FIG. 2, regarding as many further possible embodiments of the invention.

The invention may be applied also to the case of pressure-sensor devices wherein the transverse wall 22 includes a passage 23 for the fluid in a position generally coaxial to the ducts 20a and 21a of the compensation element 20 and 21, respectively, as exemplified in FIG. 55. In said FIG. 55 the passages for the connection portions 16a of the single body 16 have steps at both end regions, and in particular an upper step defined by the projecting wall 25 and a lower step defined by a transverse, or radial, relief or projection at the lower end of said passage. Clearly, in accordance with embodiments not represented herein, the presence is not ruled out of a single step, preferably the step defined by the projecting wall 25.

Figure 56:
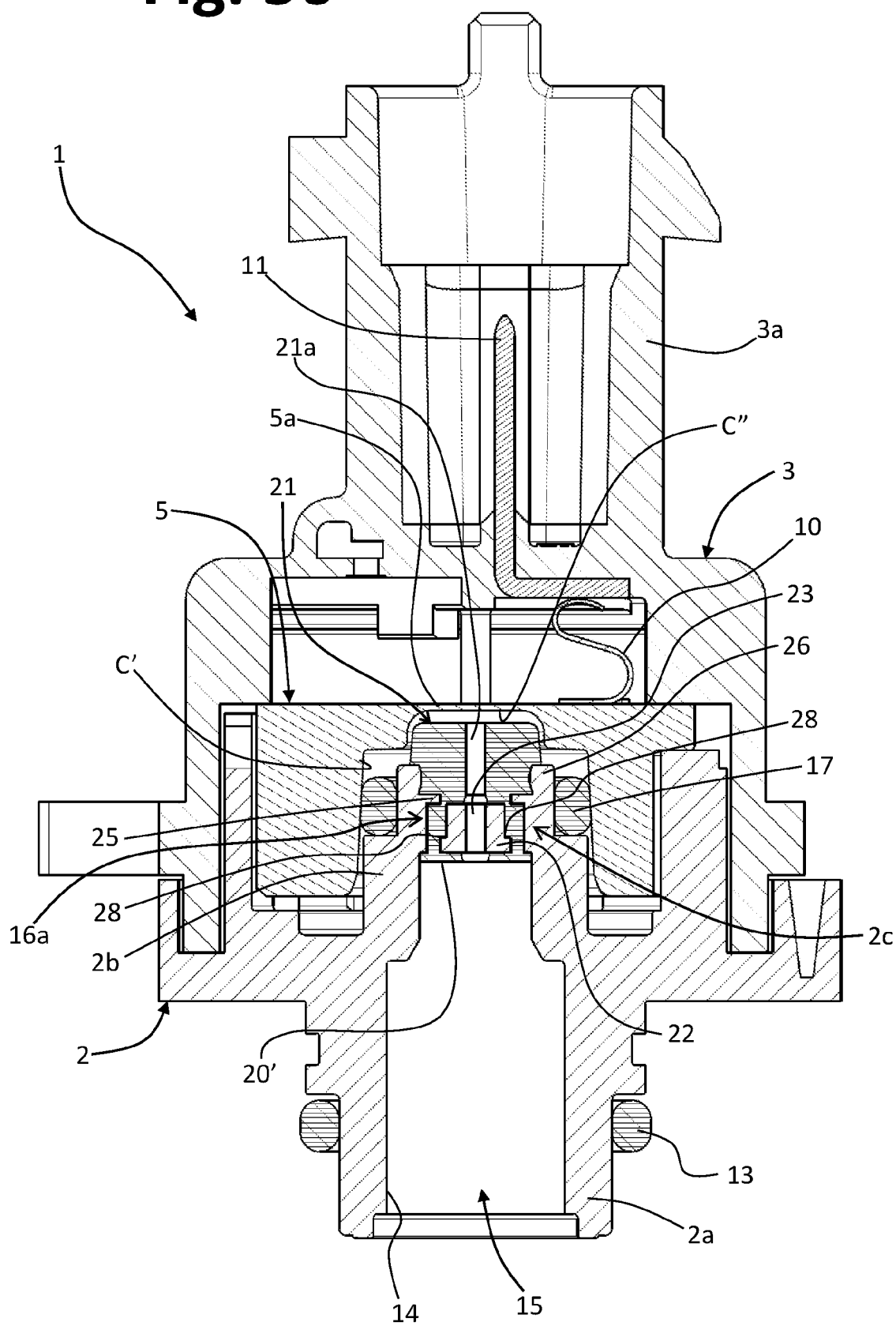
Figure 57:
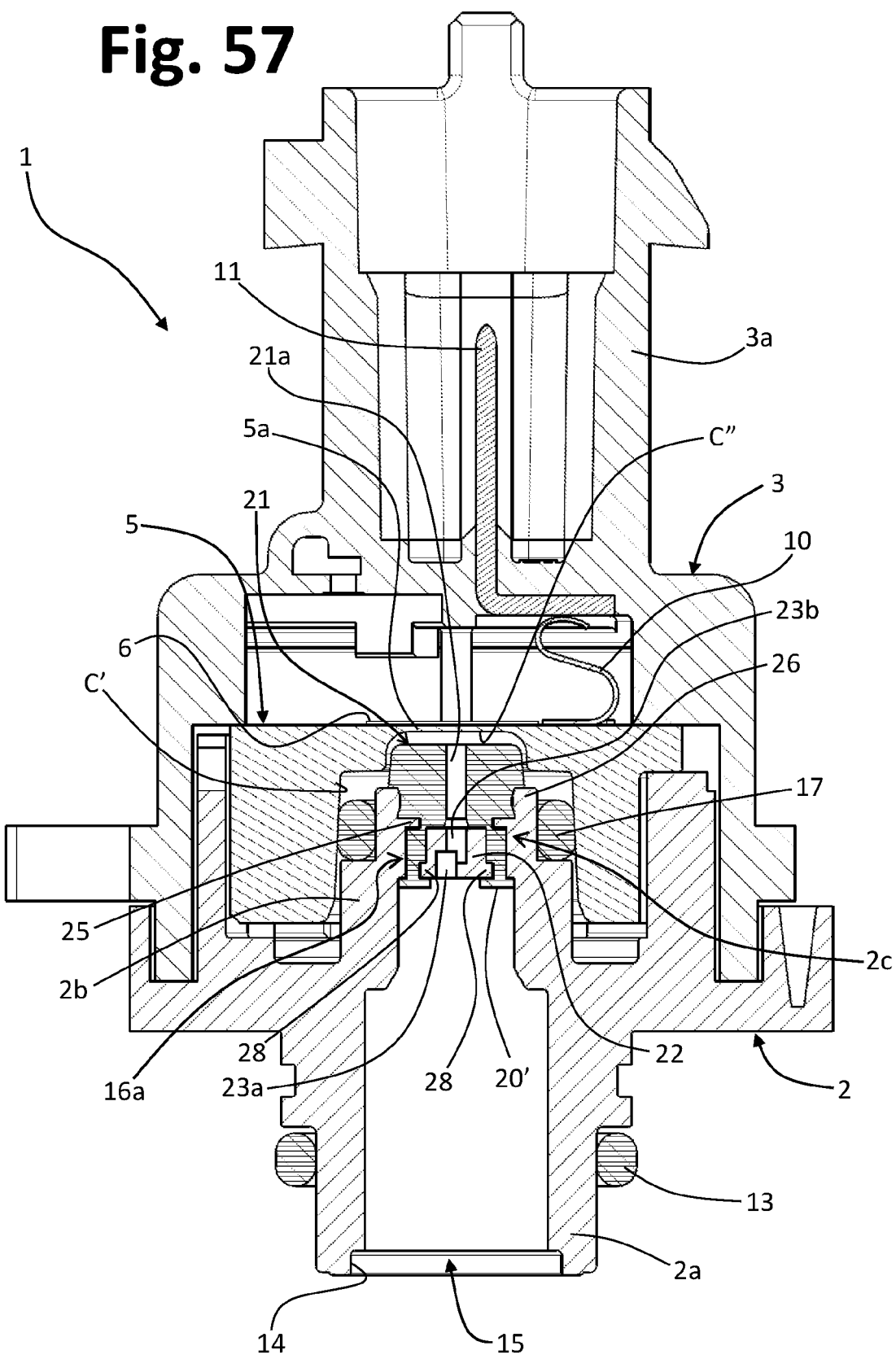

On the other hand, only one compensation element, for example the external element 21, could be overmoulded on the body 2, as exemplified in FIGS. 56 and 57. As may be noted, in this case, it is preferable for at least a part 20' of the overmoulded material to extend also at the side of the transverse wall 22 that is opposite to that from which the compressible element (here the element 21) extends, so as to improve anchorage to the body 2. For this reason, it is, however, convenient to envisage passages such as the ones designated previously by 24 or 24a-24b. In the case of FIG. 55 the wall 22 defines a passage 23 axially aligned with the through ducts 20a and 21a of the compressible elements 20 and 21, whereas in the case of FIG. 57 the wall 22 has a passage defined by two cavities with bottom 23a, 23b which are staggered with respect to one another, as in previously described embodiments.

As mentioned previously, instead of a projecting wall 25, the corresponding step may be defined by a corresponding narrowing or reduction of the section of the through cavity 14 downstream of the transverse wall 22. An embodiment of this sort is exemplified in FIG. 58, where the aforesaid reduction in section, i.e., the corresponding step, is designated by 25'. Also in this case, the step 25' overlies the second passages 24 and is sized so as to prevent the presence of undercuts, as described above with reference to the projecting wall 25. Also in the embodiments of FIGS. 55-58, at the lower end of at least one second passage 24, a respective step (or projection or relief) is present, designated by 28, which projects towards the inside of the second passage itself. In various embodiments, such as the embodiments of FIGS. 55-58, at least one first step or relief 25, 25' is present, staggered and opposite with respect to at least one second step or relief 28, set towards the inside of the second passage 24, and/or at least one inlet 23a and at least one outlet 23b are present, which are staggered and parallel to one another and intersect laterally.

Figure 58:
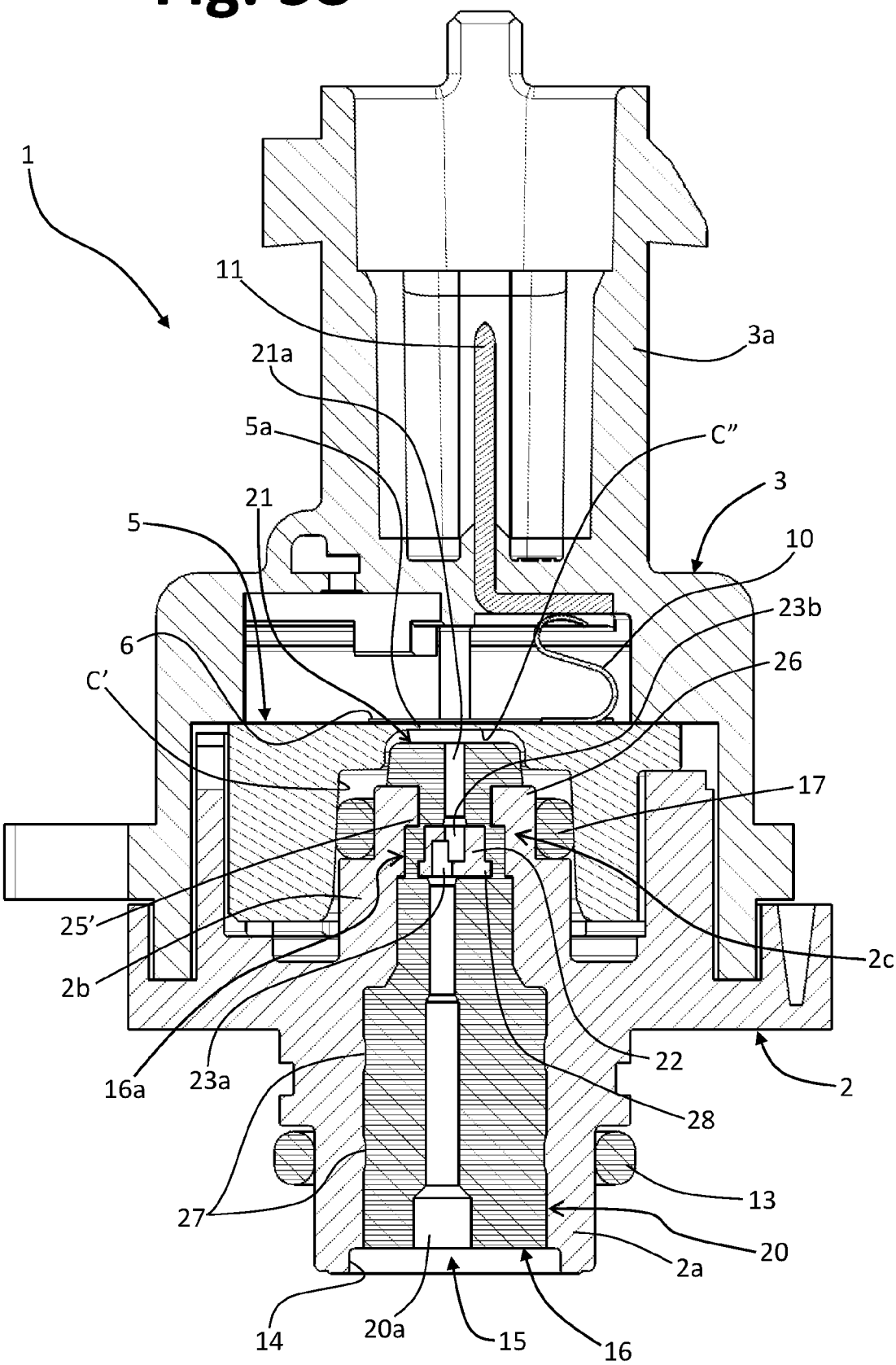

In FIGS. 1-58, the invention has been exemplified with reference to devices that use a sensitive element shaped so as to define a sensor body made of a single piece and/or having a blind cavity, the bottom of which is formed by a membrane part associated to which is at least one sensing element. The invention may in any case be used also in devices provided with a sensitive element of different conformation, for example having a sensor body made up of a number of parts and/or having a cavity defined by a main sensor body associated to which is a membrane part configured as distinct element delimiting a respective part of a cavity.

Figure 59:
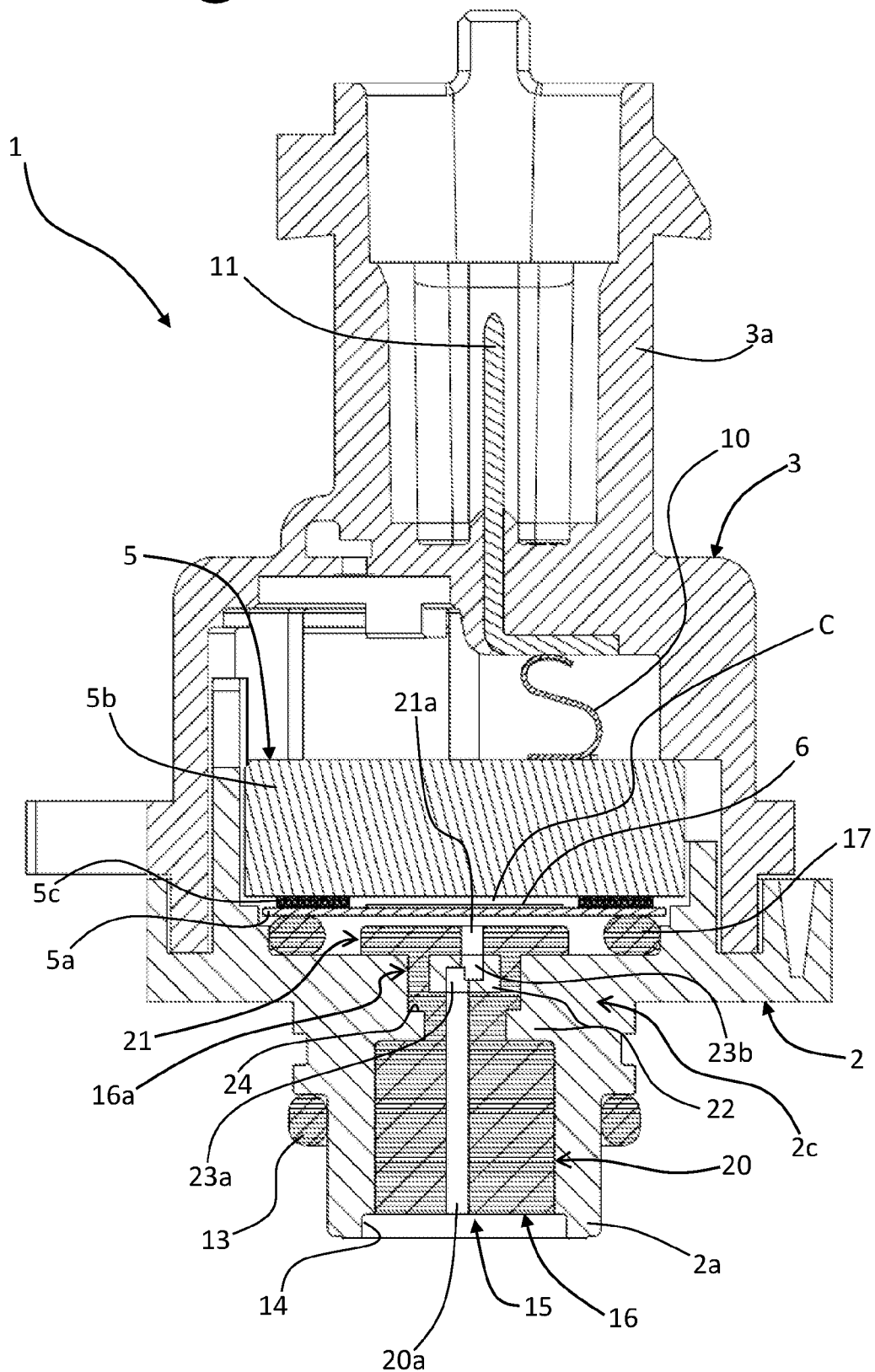
FIGS. 59 and 60 are schematic longitudinal sections of devices according to further possible embodiments of the invention.

FIG. 59 exemplifies an embodiment in which the sensitive component has a body consisting of two parts, comprising a membrane 5a, configured as distinct component, which is rigidly fixed to a main body 5b. In the example, the membrane 5a is fixed at a substantially plane end face of the body 5b, here the lower face, via an annular layer of a suitable adhesive material 5c, of a conception in itself known. In this way, defined between the body 5b, the layer of adhesive 5c, and the membrane 5a is a cavity C delimited both peripherally and at the two axial ends. Preferably, the part 5b of the body of the sensor is monolithic and/or substantially rigid, and the part 5a is at least in part flexible. In alternative embodiments, the lower face of the body 5b may present a respective recess, which delimits part of the cavity C, for example as described in WO 2010/134043, the teachings of which are considered as being incorporated herein; in such cases, the membrane may be welded to the body part 5b, or else a layer of adhesive 5c thinner than the one exemplified may be used.

The cavity C may be closed, as in the example illustrated, and sensitive elements having this configuration are used for the production of pressure sensors of an absolute type (in which case, in the closed cavity C a known positive or negative pressure, or else vacuum is present). In other embodiments, the cavity C may be in fluid communication with the environment via a small hole defined in the body part 5b.

In these configurations, the body of the sensitive element hence includes at least two body parts 5a, 5b glued or welded or rendered fixed with respect to one another, provided between which is the cavity C. In the sensitive elements of this type, the depth of the cavity C (whether this be defined by a small cavity of the body 5a or determined by the thickness of the annular layer 5c for gluing of the membrane 5a) is generally modest so that the thickness of the body part 5b on the side opposite to the membrane 5a may be such as to enable direct mounting of control and/or calibration and/or processing electrical and/or electronic components. The deformation-detection element 6 may be at least in part associated to the inner side of the membrane 5a, and hence in a position protected from the fluid. As in previous embodiments, also in this case, elastic contacts 10 may be used, which extend between portions of the terminals 11 and corresponding conductive pads or paths provided on the upper face of the body part 5b.

In various embodiments of this type, a sealing element 17 is set between the upper face of the supporting body 2 and the membrane 5a (or possibly between the upper face of the body 2 and the lower face of the body 5b, in the case of a membrane 5a having a diameter smaller than in the case of the example illustrated) so as to provide both an elastic support for the sensitive element and a seal of an axial type, between the aforesaid upper face of the body 2 and the membrane 5a. In various embodiments, the sealing element 17 circumscribes an area within which the external compensation element 21 is located.

The compensation element 21, in various embodiments of this type, constitutes a sort of disk or plate, the lower surface of which is preferentially set completely resting on the upper face of the body 2. From FIG. 59 it may likewise be noted how, in various embodiments, the sealing element 17 extends—with respect to the upper face of the supporting body 2—up to a height greater than the height of the compensation element 21: in this way, the upper face of the supporting body 2, the lower face of the sensitive element (here represented by the membrane 5a) and the sealing element 17 delimit the sensing chamber within which the element 21 is located, in a position generally facing the membrane 5a and set at a distance therefrom.

It will be appreciated that, in embodiments of this type, the sealing element 17 operates at least in part as elastic or compressible compensation element. Also in the solutions of the type exemplified with reference to FIG. 59, the characteristics described previously may be implemented in relation to the passages 23a-23b for the fluid and/or to the passages 24 for material of at least one part of connection 16a between the compensation elements 20 and 21.

For instance, also in this case, the supporting body 2a has a portion 2c distinguished by the presence of a wall 22 transverse to the through cavity 14, which is thicker than in the case of the embodiments illustrated in FIGS. 1-59, which here defines part of the upper face of the body 2 (it could, however, be in an intermediate position of the through cavity 14).

In the example illustrated, defined in a central area of the transverse wall 22 is at least one first passage for the fluid, with the corresponding inlet section 23a and outlet section 23b that can be obtained with any of the modalities described previously, in fluid communication with the through ducts 20a and 21a of the compensation elements 20 and 21, respectively. In addition and/or alternatively, in the wall 22 there may be defined the passages 24, which are to be occupied by the connection portions 16a of the overmoulded compressible body 16; also the aforesaid passages 24 and portions 16a can be obtained according to any one of the modalities described previously.

It will moreover be appreciated that the various characteristics and/or solutions proposed for providing the first passages, designed for the fluid undergoing detection, and of the second passages, designed to house the intermediate connection portions of the compressible body 16, may be variously combined together. For instance, a structure of the wall 22 that includes steps 28, as in FIGS. 19-28, may be used in all the embodiments described previously. Also a structure of the wall 22 with the second passages formed by two blind cavities 24a, 24b opposite and staggered, as in FIGS. 43-45, may be used in all the embodiments described previously.

The equipment of FIGS. 14-17 has been exemplified in combination with the embodiments of FIGS. 1-13, but it is clear that equipment of the same type may be used—with adaptations that are evident for the person skilled in the art—for producing pressure-sensor devices of various other embodiments described previously. Moreover, the aforesaid equipment has been described mainly in combination with processes of overmoulding in a strict sense, but, as has been said, the invention may be implemented also by co-moulding processes, using techniques and equipment of a conception in itself clear to the person skilled in the branch.

From the foregoing description, the characteristics and advantages of the present invention emerge clearly.

It is clear that numerous variations may be made by the person skilled in the branch to the devices described by way of example, without thereby departing from the scope of the invention. As already mentioned, for the purposes of implementation of the aforesaid further variants, one or more of the characteristics described previously with reference to different embodiments may be combined in any adequate way.

The compensation elements 20 and/or 21 preferentially have a substantially cylindrical or frustoconical shape or tubular or annular shape, but this does not constitute an indispensable characteristic in so far as at least one or both of the aforesaid elements 20, 21 could have a prismatic or polyhedral shape, such as a shape with a substantially triangular, or quadrangular, or pentagonal, or hexagonal cross section, and the like, possibly with rounded corners.

The duct 20a, 21a of one or both of the elements 20, 21 may be at least in part delimited between a surface profile of the compressible element and a surface profile of the supporting body 2 (instead of being formed by a through duct entirely defined by the compressible element). For instance, the compressible element 20 and/or 21 may have at least one surface groove that delimits, with a respective inner surface of the through cavity 14, at least part of the corresponding duct, or vice versa an inner surface of the through cavity 14 of the supporting body 2 may have at least one surface groove that delimits, with a respective surface of the compressible element 20 and/or 21, a corresponding duct, or else again both the compressible element 20 and/or 21 and the through cavity 14 may have respective grooves facing one another or coupled together to form at least part of a duct and/or of the passageway 15. An embodiment of this sort is illustrated schematically in FIG. 60: this figure illustrates a device 1 of the same type as the one illustrated in FIG. 59, but one or more of the characteristics described hereinafter may be applied also to the case of devices of the type illustrated with reference to FIGS. 1-58.

Figure 60:
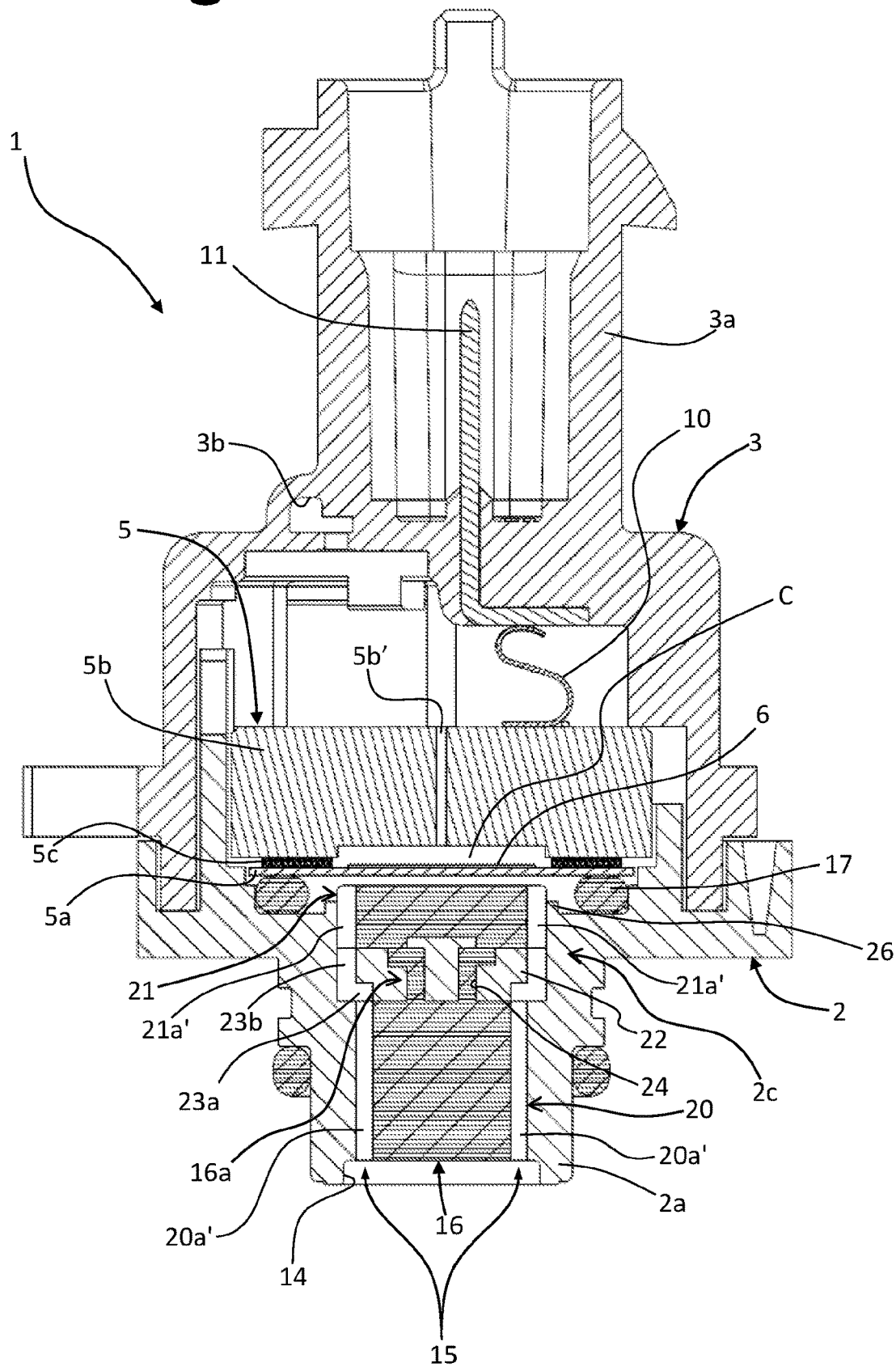

In the case illustrated in FIG. 60, the device 1 includes a compressible body defining the compensation elements 20 and 21, provided on the peripheral surface of which are one or more recesses, or grooves, or channels 20a' and 21a', respectively, which extend in a generally axial direction. The aforesaid grooves 20a' and 21a' delimit, with corresponding surface portions of the through cavity 14 of the body 2, respective parts of the passageway 15 for the fluid.

In this case, the wall 22 defines one or more first passages for the fluid, having respective inlets 23a and outlets 23b for the fluid, each of which is in fluid communication with the outlet end of a groove 20a' and the inlet end of a groove 21a', respectively. Also in this case, the inlet 23a and the outlet 23b are staggered with respect to one another, for the purposes already explained above.

The transverse wall 22 also defines one or more corresponding second passages 24, which are to house at least one intermediate portion 16a of the body 16, which connects together the two compressible elements 20 and 21. Preferentially, also in this case, the passage 24 or passages 24 are shaped so as to define a step, or projection, or relief, for the purposes already described previously.

As already mentioned, in embodiments alternative to that of FIG. 60, recesses or grooves or channels could be defined on the inner surface of the through cavity 14 of the body 2—for example, in positions corresponding to those of the grooves designated by 20a' and 21a' in FIG. 60—so as to delimit with an outer surface of the compressible element 20 and/or 21 a corresponding part of the passageway for the fluid.

FIG. 60 also illustrates how, in various embodiments, one or more first passages 23a-23b may be defined in the wall 22 in a position peripheral or eccentric with respect to one or more passages 24.

As may be noted, moreover, also in embodiments where the sensitive element 5 has a body made up of a number of parts 5a, 5b defining between them a cavity C, the through cavity 14 (i.e., the body 2 that defines it), may be advantageously shaped so as to present, downstream of the transverse wall 22, a housing portion 26 for at least part of the upper compressible element 21.

FIG. 60 likewise illustrates how, in possible embodiments, the cavity C of a sensitive component 5 that is defined between a main body 5b and a corresponding membrane 5b does not necessarily have to be isolated from the external environment (such as in the case of FIG. 59, which illustrates a pressure sensor of a type commonly referred to as "absolute" pressure sensor).

As may be noted, in fact, in the case exemplified in FIG. 60, the body 5b of the sensitive element 5 has a passage 5b', designed to set the inside of the cavity C in communication with the external environment so as to have available a reference pressure—here the ambient pressure—and thereby providing a pressure sensor of the type commonly referred to as "relative" pressure sensor. In the case exemplified, the passage 5b' sets the cavity C in communication with an environment internal to the housing structure 2-3, which is in turn in communication with the outside via a passage of the casing body 2-3: such a passage, present also in various other embodiments, is designated by 3b only in FIG. 60. It should moreover be noted that, in the case exemplified (and unlike the device exemplified in FIG. 59), the body 5b is shaped at its lower end so as to define a small recess (not represented), which hence determines the presence of a cavity C having a volume slightly larger than in the case of FIG. 59.

Of course, one or more of the characteristics described with reference to FIG. 60 may be applied also to the case of devices that include just one of the compressible element 20 and the compressible element 21, or else two elements 20 and 21 configured as separate components.

In various embodiments, which are autonomously inventive, i.e., even in the absence of a transverse wall of the type designated by 22, the pressure-sensor device comprises or envisages means suitable for formation of structural or chemical bonds, i.e., an improved adhesion, between at least a part of a casing body thereof (such as the supporting body 2) and an overmoulded or co-moulded compressible body (such as a body 16, or 20, or 21). The aforesaid improved adhesion is preferably obtained:

using for the two components in question materials that are chemically and/or structurally compatible with one another (e.g., a body of the type designated previously by 2 may be made at least in part of a polyamide PA or a polyphthalamide PPA, and a compressible body of the type designated by 16, or 20, or 21 may be made at least in part of a silicone, or a silicone elastomer, or a silicone rubber); and/or using a adhesion promoter (primer) integrated in or distributed at a surface part of at least one of the components (e.g., the body 2) prior to moulding thereon of the other component (e.g., the compressible body 16).

Figure 61:
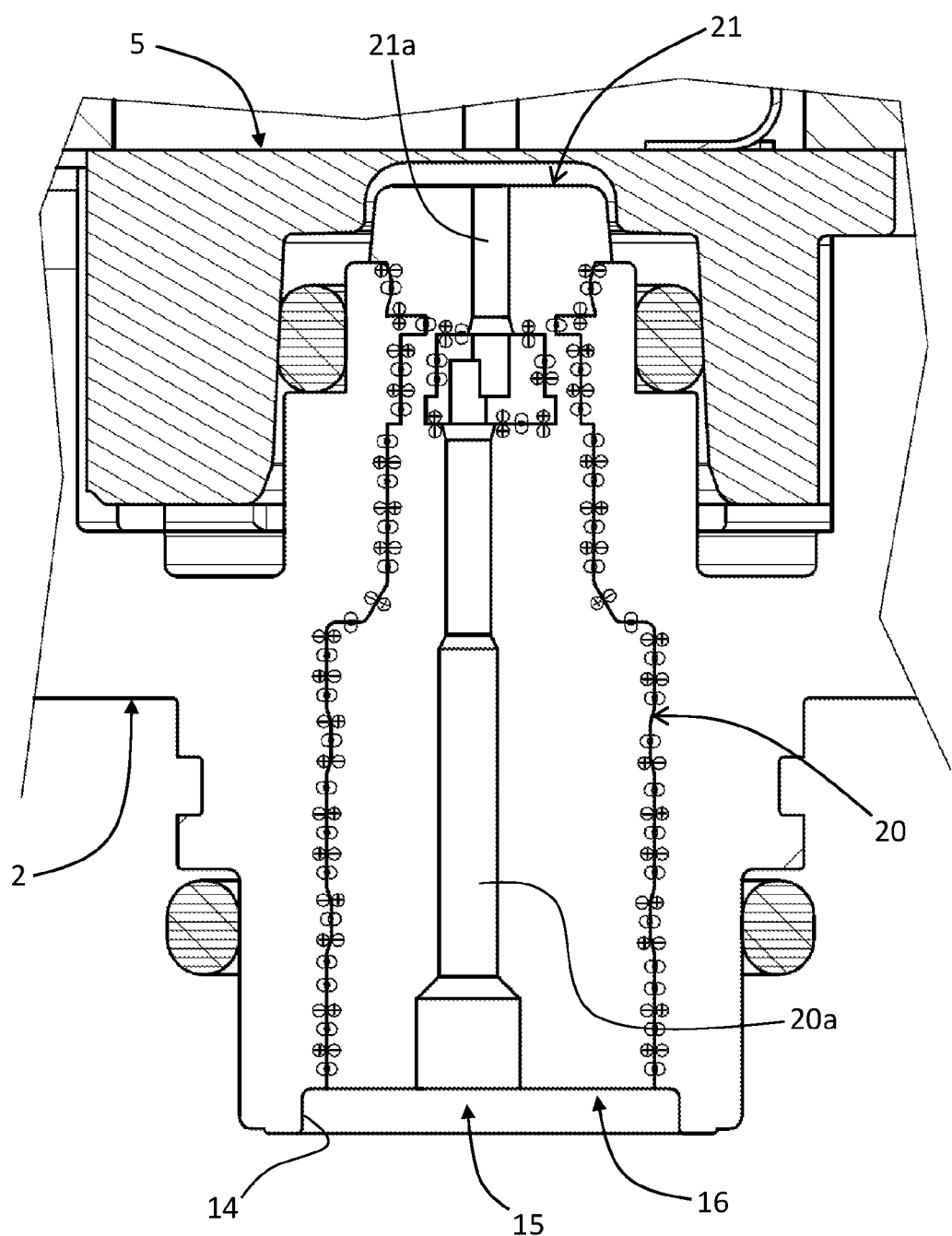
FIG. 61 is a partial and schematic cross-sectional view of a device according to possible further embodiments of the invention.
Figure 62:
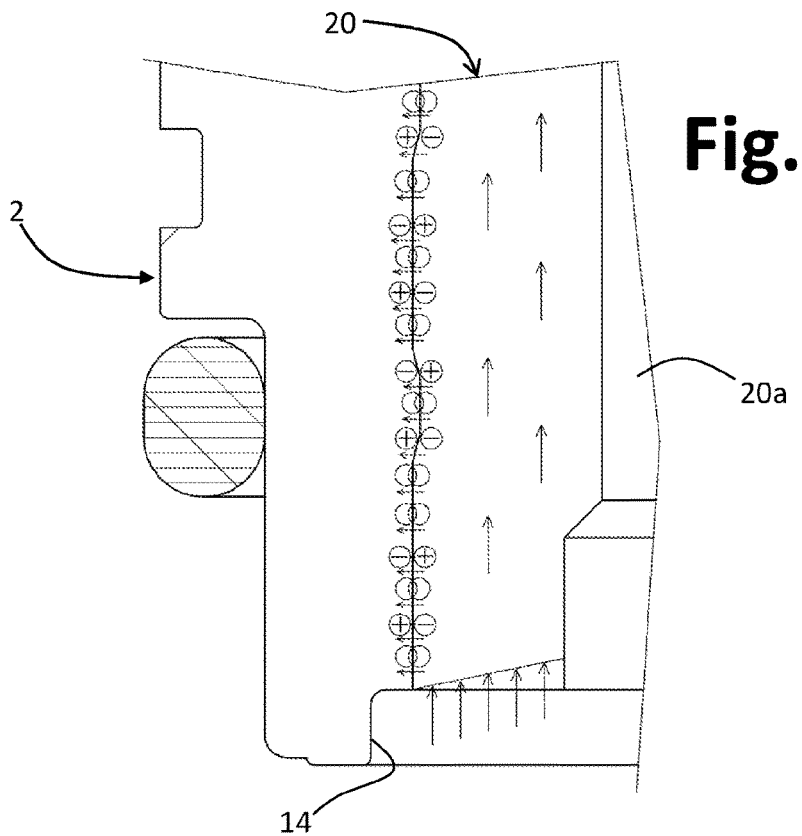
FIG. 62 is a detail at an enlarged scale of FIG. 61.

In various embodiments, which are in themselves inventive, the material itself of at least one of the supporting body 2 and the compressible body 16, or 20, or 21 comprises or integrates a promoter designed to favour adhesion or a chemical bond (such as a covalent or ionic or ion-bridge bond) with the material of the other one of the supporting body 2 and the compressible body 16, or 20, or 21. For example, a body of the type previously designated by 2 may be obtained at least in part with a polyamide PA or a polyphthalamide PPA, and a compressible body of the type of those indicated with 16 or 20 or 21 may be obtained at least in part with a silicone, or a silicone elastomer, or a silicone rubber. A configuration of this type is schematically illustrated in FIGS. 61 and 62, where the small circles represent the aforesaid possible chemical or structural bonds. In the example, pairs of circles that intersect represent possible covalent bonds and pairs of circles facing with opposite polarity represent possible ion and/or ion-bridge bonds. In the example illustrated, the surface of the through cavity 14—i.e., the interface surface between the body 2 and the body 16—presents chemical bonds with the body 16 (or the element 20, in the case of FIG. 62). FIG. 62 moreover highlights the case of a thrust on the compressible body 16 or 20 by the pressurized fluid, where:

the vectors represented by the vertical or axial arrows represent schematically the force of thrust of the fluid, which tends to move and deform the compressible element 16 (or 20) substantially in the axial direction of the cavity 14, towards the sensitive component 5; and the vectors represented by the horizontal arrows or arrows radial with respect to the interface between the bodies 2 and 16 (or 20) represent schematically the forces of the aforesaid chemical bonds, which tend to maintain surfaces of the bodies 2 and 16 (or 20) fixed with respect to one another, thus opposing the aforesaid axial force or shearing force, and hence opposing deformation and/or extrusion of the compressible body towards the sensitive element 5 under the thrust of the fluid.

In other embodiments in themselves inventive, set between the material of the supporting body 2 and the material of the compressible body 16, or 20, or 21 is an adhesion-promoter material or substance, which forms a thin intermediate layer, preferably comprised between 1 μm and 20 μm, which has the purpose of causing the two aforesaid materials to adhere together, i.e., creating a chemical bond (such as a covalent or ionic or ion-bridge bond), on one side with respect to the material of the supporting body 2 (e.g., a PA or a PPA) and on the other side with respect to the material of the compressible body 16, or 20, or 21 (e.g., a silicone, or a synthetic rubber, or an elastomer). A configuration of this type is schematically illustrated in FIG. 63, where the chemical or structural bonds, also in this case represented schematically by pairs of intersecting or facing small circles, are provided:

on one side, between the layer Pr of the adhesion promoter and the material of the body 2, and on the other side, between the layer Pr of the adhesion promoter and the body 16 (or 20).

(The thickness of the layer Pr has been deliberately increased for reasons of greater clarity of representation).

Figure 63:
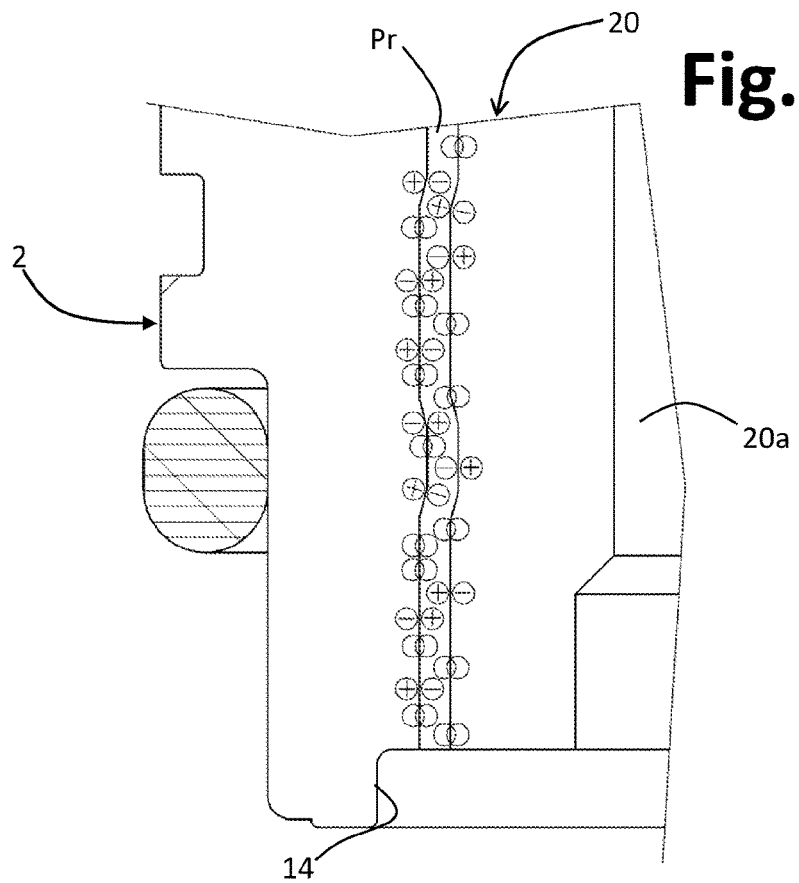
FIG. 63 is a view similar to that of FIG. 62, but regarding further possible embodiments of the invention.

In configurations of the type represented schematically in FIG. 63, the forces of the aforesaid chemical bonds tend to maintain fixed together a surface of the body 2 (in particular, of the through cavity 14) and a corresponding first surface of the layer of material Pr, as well as to maintain fixed together a second surface (opposite to the first surface) of the layer of material Pr and a surface of the body 16 (or 20), in this way opposing axial forces or shearing forces exerted by the fluid on the compressible body 16 (or 20), and hence opposing deformation and/or extrusion of the compressible body in the direction of the sensitive component 5, as represented schematically in FIG. 62.

Obviously, the inventive ideas just set forth above with reference to FIGS. 61-63 apply also in relation to surfaces of the transverse wall 22 and/or of the passage or passages 24 (including the projecting wall 25 or 25'), and/or to surfaces of the connection portion or portions 16a of the compressible body 16, and/or to surfaces of the housing portion 26 and/or of the corresponding compressible element 21.

According to variants not represented, the at least one inlet 23a and the at least one outlet 23b may comprise staggered passages and/or passages shaped so as to define a tortuous path that are obtained in parts of the supporting body 2 different from the ones exemplified in the drawings; for this purpose, what has been described previously at a preferential level with reference to the portion 2c of the body 2 and to the wall 22 is to be understood as referring also to other regions of the body 2.

In possible variant embodiments (not represented), the passages that are to house the material that forms the connection portion or portions between the internal and external compressible elements are defined in a substantially central region of a wall transverse with respect to the through cavity of the supporting body, relative to one or more first passages for the fluid.

Individual characteristics outlined with reference to embodiments described previously may be combined together in other embodiments. For instance, characteristics described with reference to the examples of FIGS. 1-58, regarding devices with a sensitive element having a monolithic sensor body, may be combined and/or adapted to obtain devices with a sensitive element having a sensor body comprising a number of parts, of the type described with reference to FIGS. 59-60.

The invention claimed is:
1. A pressure sensor device comprising:
   a pressure-sensitive component, having a sensor body that includes an elastically deformable membrane part and at least one detection element suitable for detecting a deformation of the elastically deformable membrane part;

a housing or supporting structure of the pressure-sensitive component, having at least one passageway for a fluid the pressure of which is to be detected, the housing or supporting structure comprising:

a housing or supporting body with respect to which the sensor body is positioned in such a way that its elastically deformable membrane part is exposed to the fluid exiting the at least one passageway, the housing or supporting body having at least one through-cavity, a compressible body, configured for compensating possible variations of volume of the fluid, wherein the housing or supporting body has a first body portion comprising a transverse wall of the through-cavity in which is defined at least one first passage belonging to the passageway for the fluid, wherein at least one second passage is defined in the transverse wall and the compressible body is an element over-moulded or co-moulded with respect to the housing or supporting body, that has respective opposite portions which extend in positions corresponding to opposite sides of the transverse wall, said opposite portions being connected to one another via at least one intermediate portion of the compressible body that that extends through the at least one second passage, wherein the first body portion is shaped to define at least one step or one projection or one relief which determines at least one of:

a cross-sectional narrowing of the at least one second passage, configured to define a corresponding cross-sectional reduction of the at least one intermediate portion of the compressible body, and a development of the at least one intermediate portion of the compressible body which is generally tortuous or comprises a number of stretches substantially angled to each other.

2. The device according to claim 1, wherein the first body portion comprises at least one of:

at least one projecting or cantilever wall of the through-cavity, downstream of the transverse wall, the at least one projecting or cantilever wall extending towards the inside of the through-cavity to define at least in part the at least one step, at least one cross-sectional narrowing of the through-cavity downstream of the transverse wall, which defines at least in part the at least one step.

3. The device according to claim 1, wherein the first body portion is shaped to define at least one of:

at least one step or projection or relief at at least one end region of the at least one second passage, at least two steps or projections or reliefs at opposite end regions of the at least one second passage.

4. The device according to claim 1, wherein the at least one second passage comprises a first cavity having a bottom and a second cavity having a bottom, which are defined at opposite sides of the transverse wall and are formed so as to intersect each other in a lateral direction.

5. The device according to claim 1, wherein the at least one first passage has at least one respective inlet and at least one respective outlet which comprise a first cavity and a second cavity each having a bottom, which are defined at opposite sides of the transverse wall and are formed so as to intersect each other in a lateral direction.

6. The device according to claim 1, wherein the transverse wall defines at least one of:

a plurality of said first passages for the fluid, a plurality of said second passages through which there extend respective intermediate portions of the compressible body.

7. The device according to claim 1, wherein the through-cavity has a peripheral surface shaped to define one or more reliefs performing a function of retention of the compressible body.

8. The device according to claim 1, comprising means for causing an adhesion or bond between at least one part of the housing or supporting body and at least one part of the compressible body.

9. The device according to claim 8, wherein:

a material of at least one surface part of at least one of the housing or supporting body and the at least one compressible element is chemically and/or structurally compatible with a material of at least one surface part of the other one of the housing or supporting body and the at least one compressible element, and/or a material of at least one surface part of at least one of the housing or supporting body and the at least one compressible element comprises or integrates a primer suitable for favouring said adhesion or bond with a material of at least one surface part of the other one of the housing or supporting body and the at least one compressible element, and/or between a material of the housing or supporting body and a material of the at least one compressible element is set a layer of a primer suitable for favouring said adhesion or bond.

10. The device according to claim 1, wherein the compressible body defines at least one of:

a first compressible element, set at least partially within the through-cavity of the housing or supporting body upstream of the transverse wall, which delimits at least in part at least one respective duct for the fluid having an inlet end and an outlet end, a second compressible element, set downstream of the transverse wall, the second compressible element having a top surface facing the elastically deformable membrane part of the sensor body and delimiting at least in part at least one respective duct for the fluid having an inlet end and an outlet end.

11. The device according to claim 10, wherein the compressible body defines in a single piece the first compressible element and the second compressible element, which are connected to one another via the at least one intermediate portion.

12. The device according to claim 10, comprising the second compressible element, wherein the through-cavity is shaped to define, downstream of the transverse wall, a housing portion within which the second compressible element is at least partially housed.

13. The device according to claim 10, wherein at least one of the first compressible element or the second compressible element is in contact with the transverse wall.

14. The device according to claim 10, wherein:

the passageway for the fluid comprises the at least one duct delimited at least in part by the at least one of the first compressible element or second compressible element, the at least one first passage has at least one respective inlet for the fluid and at least one respective outlet for the fluid, at least one of the at least one inlet and the at least one outlet being in fluid communication with the at least one duct delimited at least in part by the at least one of the first compressible element or second compressible element, and the at least one inlet and the at least one outlet of the at least one first passage are arranged to define a tortuous path for the fluid.

15. The device according to claim 14, wherein the at least one inlet and the at least one outlet of the at least one first passage are in staggered positions in a lateral direction.

16. The device according to claim 14, wherein:
the at least one inlet of the at least one first passage is in fluid communication with the outlet end of the at least one duct delimited at least in part by the first compressible element, and/or
the at least one outlet of the at least one first passage is in fluid communication with the inlet end of the at least one duct delimited at least in part by the second compressible element.

17. The device according to claim 14, wherein
the at least one inlet of the at least one first passage comprises a first inlet and a second inlet staggered to each other and in fluid communication with one and the same outlet of the at least one first passage, the outlet being staggered with respect to the first inlet and the second inlet, or else
the at least one outlet of the at least one first passage comprises a first outlet and a second outlet staggered to each other and in fluid communication with one and the same inlet of the at least one first passage, the inlet being staggered with respect to the first outlet and the second outlet.

18. The device according to claim 17, wherein:
the at least one duct of the first compressible element comprises two ducts, whose outlet ends are in fluid communication with the first inlet and the second inlet of the at least one first passage, respectively, or else
the at least one duct of the second compressible element comprises two ducts, whose inlet ends are in fluid communication with the first outlet and the second outlet of the at least one first passage, respectively.

* * * * *